(12) United States Patent
Cetin et al.

(10) Patent No.: US 11,634,363 B2
(45) Date of Patent: Apr. 25, 2023

(54) REFRACTORY OBJECT AND METHOD OF FORMING

(71) Applicant: SAINT-GOBAIN CERAMICS & PLASTICS, INC., Worcester, MA (US)

(72) Inventors: Deniz Cetin, Shrewsbury, MA (US); Julien P. Fourcade, Aix en Provence (FR); Olivier Citti, Villeneuve les Avignon (FR); Darren Rogers, Worcester, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 17/645,885

(22) Filed: Dec. 23, 2021

(65) Prior Publication Data

US 2022/0204408 A1  Jun. 30, 2022

Related U.S. Application Data

(60) Provisional application No. 63/131,616, filed on Dec. 29, 2020.

(51) Int. Cl.
    *C04B 35/48* (2006.01)
    *C04B 35/626* (2006.01)
    *C04B 35/645* (2006.01)

(52) U.S. Cl.
    CPC ...... *C04B 35/481* (2013.01); *C04B 35/62655* (2013.01); *C04B 35/62695* (2013.01);
    (Continued)

(58) Field of Classification Search
    CPC .......... C04B 35/481; C04B 2235/3208; C04B 2235/3213; C04B 2235/3215;
    (Continued)

(56) References Cited

U.S. PATENT DOCUMENTS

| 3,519,448 A | 7/1970 | Alper et al. |
| 3,899,341 A | 8/1975 | Schwarz |

(Continued)

FOREIGN PATENT DOCUMENTS

| CN | 105060902 B | 5/2017 |
| JP | H04193766 A | 7/1992 |

(Continued)

OTHER PUBLICATIONS

International Search Report and Written Opinion for PCT/US2021/073100, dated Apr. 20, 2022, 8 pages.

*Primary Examiner* — Noah S Wiese
(74) *Attorney, Agent, or Firm* — Abel Schillinger, LLP; Robert N Young

(57) ABSTRACT

A refractory object may include a zircon body that is intentionally doped with a dopant including an alkaline earth element and aluminum. The refractory object can have an improved creep deformation rate. In an embodiment, the refractory object can have a creep deformation rate of not greater than about 1.8 E-5 $h^{-1}$ at a temperature of 1350° C. and a stress of 2 MPa. In another embodiment, the zircon body may include an amorphous phase including an alkaline earth metal element.

20 Claims, 7 Drawing Sheets

(52) U.S. Cl.
CPC .... *C04B 35/645* (2013.01); *C04B 2235/3208* (2013.01); *C04B 2235/3213* (2013.01); *C04B 2235/3215* (2013.01); *C04B 2235/3217* (2013.01); *C04B 2235/3248* (2013.01); *C04B 2235/3251* (2013.01); *C04B 2235/3463* (2013.01); *C04B 2235/6565* (2013.01); *C04B 2235/6567* (2013.01); *C04B 2235/9669* (2013.01)

(58) Field of Classification Search
CPC .... C04B 2235/3217; C04B 2235/3248; C04B 2235/9669
See application file for complete search history.

(56) References Cited

U.S. PATENT DOCUMENTS

| | | |
|---|---|---|
| 3,972,722 A | 8/1976 | Holt et al. |
| 4,587,225 A | 5/1986 | Tsukuma et al. |
| 5,124,287 A | 6/1992 | Wehrenberg et al. |
| 5,679,612 A | 10/1997 | Endo et al. |
| 8,236,719 B2 | 8/2012 | Citti et al. |
| 8,258,068 B2 | 9/2012 | Citti et al. |
| 8,268,742 B2 | 9/2012 | Sato |
| 8,383,537 B2 * | 2/2013 | Godard ............... C04B 35/6262 65/374.13 |
| 9,475,735 B2 | 10/2016 | Kuboki et al. |
| 9,624,132 B2 | 4/2017 | Citti et al. |
| 9,809,500 B2 | 11/2017 | Fourcade et al. |
| 9,902,653 B2 | 2/2018 | Citti et al. |
| 10,308,556 B2 * | 6/2019 | Fourcade ............... C03B 17/064 |
| 2005/0130830 A1 | 6/2005 | Ames et al. |
| 2010/0028665 A1 * | 2/2010 | Lu ......................... C03B 17/064 428/338 |
| 2010/0089098 A1 | 4/2010 | Citti et al. |
| 2011/0107796 A1 | 5/2011 | Citti et al. |
| 2015/0274599 A1 | 10/2015 | Fourcade et al. |
| 2016/0340223 A1 | 11/2016 | Dejneka et al. |
| 2018/0093924 A1 | 4/2018 | Fourcade et al. |
| 2018/0105470 A1 | 4/2018 | Dejneka et al. |
| 2019/0367414 A1 | 12/2019 | Champion et al. |

FOREIGN PATENT DOCUMENTS

| | | |
|---|---|---|
| JP | H06144939 A | 5/1994 |
| TW | 201433559 A | 9/2014 |
| WO | 2013011436 A1 | 1/2013 |
| WO | 2022147419 A1 | 7/2022 |

\* cited by examiner

BLISTER CRUCIBLE TEST

| | LTPS Glass 1 1300°C-360h | LTPS Glass 2 1300°C-360h |
|---|---|---|
| CS2 | | |
| CS3 | | |
| S1 | | |
| S6 | | |

REFRACTORY OBJECT AND METHOD OF FORMING

CROSS-REFERENCE TO RELATED APPLICATION(S)

This application claims priority under 35 U.S.C. § 119(e) to U.S. Provisional Application No. 63/131,616, entitled "REFRACTORY OBJECT AND METHOD OF FORMING," by Deniz CETIN et al., filed Dec. 29, 2020, which is assigned to the current assignee hereof and incorporated herein by reference in its entirety.

FIELD OF THE DISCLOSURE

The present disclosure is generally directed to zircon refractory objects and methods of forming and using zircon refractory objects, and in particular, to sintered zircon refractory objects and methods of forming and using the same.

BACKGROUND

High strain point alkali free aluminosilicate glasses, such as, glasses for ultra-high-resolution Liquid Crystal Display (LCD) substrates using amorphous silicon or oxide thin film transistors (TFTs), or glasses for organic light emitting diode (OLED) substrates using low temperature polysilicon (LTPS) TFT deposition have been designed to allow high temperature processing of the TFT (up to 700° C.) while not suffering from deformation. These glasses can be formed using a fusion draw process where liquid glass flows over the lips of a glass overflow forming block made of zircon ($ZrSiO_4$) material and fuses at the bottom of the glass overflow forming block to form a sheet. Zircon forming blocks that come in contact with alkali free alumino-borosilicate glasses offer good corrosion resistance and mechanical properties at the forming temperature of glass. However, the forming of these higher strain point alkali free aluminosilicate glasses is more demanding on the forming blocks because of the higher forming temperature (between +30 and 120° C.). The higher forming temperature can increase the rate of reaction between the glass and the zircon materials leading to higher formation of bubbles in the glass with current zircon materials which is not acceptable for the ultra-high resolution TFT substrate applications. Secondly, the higher forming temperature activates the creep deformation rate of the zircon material leading to higher sag of the forming blocks (up to 10 times more deformation) that is not acceptable for the forming of these glasses. There is therefore a need for a new range of zircon materials with improved properties at high temperatures.

BRIEF DESCRIPTION OF THE DRAWINGS

The present disclosure may be better understood, and its numerous features and advantages made apparent to those skilled in the art by referencing the accompanying drawings. Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DESCRIPTION

The following is generally directed to a refractory object having a zircon body and a method of forming a refractory object having a zircon body. Notably, the refractory object can have improved properties and/or performance. For example, the refractory object can have improved creep resistance, such as improved creep deformation rate, reduced blistering phenomenon, or both, at high operation temperatures. The zircon body may be defined as the body of a refractory object formed according to embodiments described herein, such that a majority of the composition of the zircon body is a zircon material (i.e., the zircon body may include a content of zircon of at least 50 wt. % for a total weight of the zircon body), wherein the zircon material is intentionally doped with one or more alkaline earth oxide and with $Al_2O_3$.

According to a particular embodiment, the method of forming a refractory object having a zircon body in accordance with embodiments described herein may include particular heating and/or cooling features that facilitate formation of the zircon body of the refractory object having improved properties and/or performance.

Figure 1:
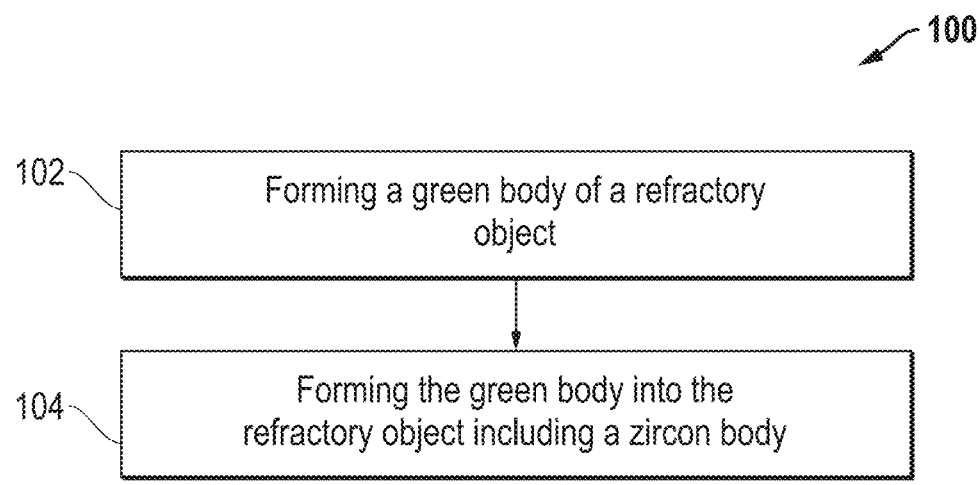
FIG. 1 includes a flow chart illustrating a forming process according to embodiments described herein.

Referring to FIG. 1, a process 100 is illustrated for forming a refractory object including a zircon body. The process 100 may start at block 102 forming a green body of the refractory object. A green body is a body that is unfinished and may undergo further processing before a finally-formed zircon body is formed. Forming the green body may include providing a zircon batch that may include a mixture of raw material powder used in forming the zircon body. This raw material powder may initially include an unprocessed raw material, for example, unprocessed zircon material (i.e., sand), alkaline earth metal containing material, $Al_2O_3$ containing material, and a $SiO_2$ containing material. The unprocessed raw material may be initially processed by separating undesired components (e.g., impurities) from the unprocessed raw material. The unprocessed raw material may be processed using classifying techniques, for example, particle size separation, vibration or gravity table separation, electrostatic separation, electromagnetic separation or any combination thereof. Particle size separation allows for separation of particles within a powder based on its size, which reduces impurity content. Vibration or gravity table separation can separate particles within a powder based on density, which can reduce the amount of alumina rich silicates as well as silica grains from the raw material powder. Electrostatic separation can separate particles within a powder based on electrical conductivity, which may allow the separation of titaniferous mineral particles, ilmenite and rutile. Electromagnetic separation can separate particles within a powder based on the magnetic properties of the particles. It will be appreciated that initial processing of the unprocessed raw material may include any combination of the separation methods noted above and may include multiple applications of any of the separation methods noted above. It will be further appreciated that initial processing of the unprocessed raw material may include application of the separation methods above in sequence or in parallel.

Providing the zircon batch may include combining or mixing the raw material powder and any additional materials (i.e., sintering aids, binders, other additives, etc.) by any suitable method. Mixing or batch preparation may be performed dry or wet. Mixing may include an addition step of granulation. The granulation step may be added to improve flowability of the batch and therefore increase apparent density of the green body. In one example embodiment, granulation may be performed using spray drying. The raw material powders may be mixed into a blunge tank and then spray dried.

Forming the green body may further include shaping the spray dried powder or batch to form a green body having a particular shape using isostatic pressing. The spray dried powder forms a highly flowable powder that can be used to fill large isostatic molding cans to minimize filling defects, such as, non-uniform compaction of green density, voids or cracks. The raw material powder is filled into a rubber mold maintained in a solid metallic can. The bag is then sealed and a vacuum is applied to the raw material powder. The can is then submerged into a pressure vessel filled with a fluid and then pressed. After pressing, the mold is removed from the pressure vessel and the green body is removed.

Shaping may occur at a particular pressure, for example, by isostatic pressing at a pressure at least 50 MPa, such as, at least 60 MPa, at least 70 MPa, at least 80 MPa, at least 90 MPa, at least 100 MPa, at least 110 MPa, at least 120 MPa, at least 130 MPa, at least 140 MPa or even at least 150 MPa. The pressure may be applied step by step to the green body using an isostatic pressing cycle lasting for about 10 minutes to about 120 minutes. These pressing cycles may limit formation of defects during the pressing stage. Shaping may also be performed using alternative techniques such as slip casting or unidirectional pressing.

The shape of the green body can be rectilinear, cylindrical, spherical, ellipsoidal or nearly any other shape. In a particular embodiment, the green body can be in the shape of a rectilinear block referred to as a blank that can subsequently be machined to form a glass overflow trough, a spout lip or a bushing block. In another particular embodiment, the green body may have at least one dimension larger than 100 mm, such as, larger than 200 mm, larger than 300 mm, larger than 400 mm, larger than 500 mm, larger than 600 mm, larger than 700 mm or even larger than 800 mm. In another embodiment, the green body can be structured in such a fashion to more closely match a final component, for example, a forming block, to limit post forming processes.

Figure 2:
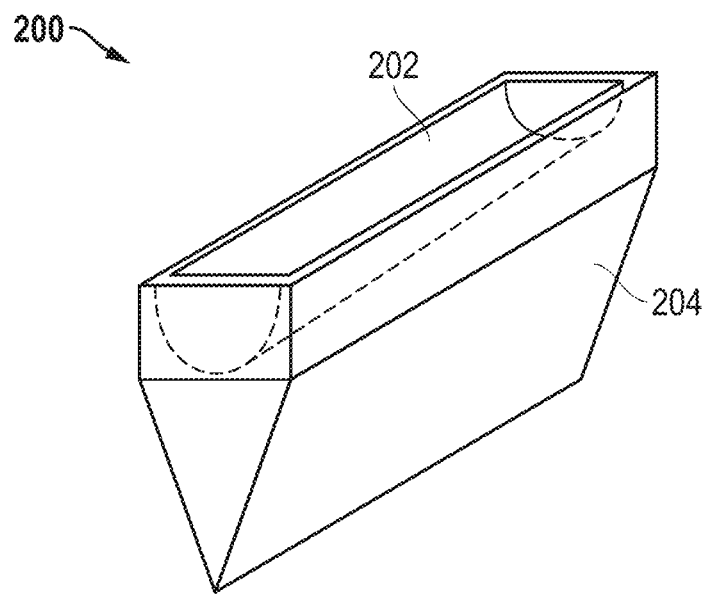
FIG. 2 includes a diagram illustrating a particular embodiment of a glass overflow forming block.
Figure 3:
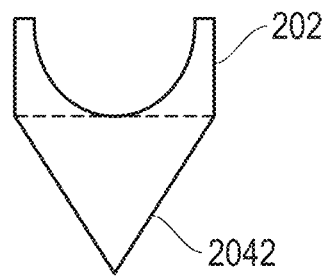
FIG. 3 includes a diagram illustrating a particular set of various cross-sectional perspectives of glass overflow forming blocks.
Figure 3:
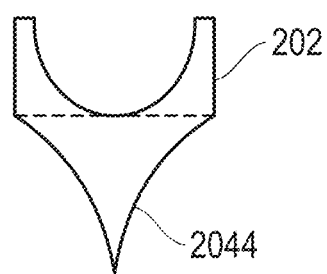
Figure 3:
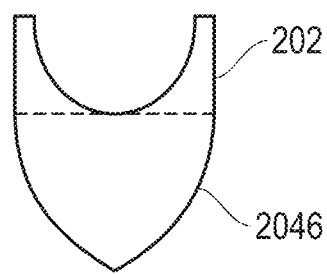

FIG. 2 illustrates a forming block 200. The forming block 200 can include an overflow trough portion 202 and a tapered portion 204. The overflow trough portion 202 can include a trough that has a depth that decreases along a length of the forming block 200. FIG. 3 includes a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

After the green body is formed, the process 100 can continue to block 104, forming the green body into the refractory object including the zircon body. The green body can be heated in an oven, heater, furnace, or the like to form the body that includes zircon material. The heating process can include an initial heating where moisture, a solvent, or another volatile component is evaporated, organic material is vaporized, or any combination thereof. The initial heating can be conducted at a temperature in a range of 100° C. to 300° C. for a time period in a range of 10 hours to 200 hours.

Following the initial heating, the green body can be heated to form a sintered zircon body. In an embodiment, heating the green body can include controlling the heating temperature, soaking period, ramping rate, or any combination thereof to facilitate formation of the refractory object having improved properties and/or performance. In an embodiment, heating the green body can include heating at one or more particular heating temperatures for a heating period of time. In a particular embodiment, sintering the green body can include heating the green body at a first temperature for a first period of time and heating the green body at a second temperature lower than the first temperature for a second period of time to form the refractory object including the zircon body. In an aspect, the first temperature can include a maximum heating temperature that may facilitate formation of the refractory object having improved properties and/or performance. For example, the first temperature can be at least 1500° C., at least 1550° C., or at least 1600° C. In another example, the first temperature may be not greater than 1700° C., not greater than 1650° C., or not greater than 1625° C. Moreover, the first temperature may be in a range including any of the maximum and minimum temperatures noted herein.

In another aspect, the first period of time may be at least 2 hours, at least 4 hours, at least 6 hours, at least 8 hours, or at least 10 hours. In a further aspect, the first period of time may be not greater than 5 days, not greater than 4 days, not greater than 3 days, not greater than 2 days, not greater than 24 hours, not greater than 20 hours, not greater than 18 hours, not greater than 16 hours, not greater than 14 hours, or not greater than 12 hours. Moreover, the first period of time may be in a range including any of the minimum and maximum times noted herein. For example, the green body may be heated at the first temperature for at least 6 hours to 5 days.

In an aspect, the second temperature may include a sintering temperature of the zircon batch that can facilitate formation of the refractory object having improved properties and/or performance. For example, the second temperature can be at least 1250° C., at least 1300° C., at least 1350° C., at least 1400° C., or at least 1425° C. In another example, the second temperature may be not greater than 1525° C., not greater than 1500° C., not greater than 1475° C., or not greater than 1450° C. Moreover, the second temperature can be in a range including any of the minimum and maximum temperatures noted herein.

In a further aspect, the second period of time may be at least 10 hours, at least 14 hours, at least 18 hours, at least 20 hours, at least 24 hours, at least 30 hours, at least 36 hours, or at least 2 days. In another aspect, the second period of time may be not greater than 6 days, not greater than 5 days, not greater than 4 days, not greater than 3 days, not greater than 60 hours, not greater than 50 hours, not greater than 48 hours, not greater than 44 hours, not greater than 40 hours, not greater than 36 hours, or not greater than 30 hours. Moreover, the second period of time may be in a range including any of the minimum or maximum times noted herein.

According to an embodiment, heating the green body can include heating the green body up at a particular heating rate that can facilitate formation of the refractory object having improved performance and properties. In an aspect, the heating rate may be at least 1° C./h, such as, at least 3° C./h, at least 5° C./h, at least 8° C./h, at least 10° C./h, at least 13° C./h, at least 15° C./h, at least 18° C./h, at least 20° C./h, at least 23° C./h, at least 25° C./h, at least 28° C./h or even at least 29° C./h. In another aspect, the heating rate may be not greater than 30° C./h, such as, not greater than 27° C./h, not greater than 25° C./h, not greater than 22° C./h, not greater than 20° C./h, not greater than 17° C./h, not greater than 15° C./h, not greater than 12° C./h, not greater than 10° C./h, not greater than 7° C./h, not greater than 5° C./h or even not greater than 3° C./h. It will be appreciated that the heating rate may be any value between any of the minimum and maximum values noted above. It will be further appreciated that the heating rate may be any value within a range between any of the maximum and minimum values noted above.

In an embodiment, heating the green body to form the zircon body can include a cooling rate that can facilitate formation of the refractory object having improved properties and/or performance. In an aspect, heating the green body can include reducing the heating temperature from the first temperature to the second temperature at a particular cooling rate. For example, the cooling rate may be less than 5° C./h, such as not greater than 4.5° C./h, not greater than 3.7° C./h, not greater than 3.1° C./h, not greater than 2.7° C./h, not greater than 1.8° C./h, not greater than 1.7° C./h, not greater than 1.6° C./h, not greater than 1.5° C./h, not greater than 1.4° C./h, not greater than 1.3° C./h, not greater than 1.2° C./h, not greater than 1° C./h, not greater than 0.8° C./h, not greater than 0.7° C./h, not greater than 0.6° C./h, not greater than 0.5° C./h, not greater than 0.4° C./h, not greater than 0.3° C./h, not greater than 0.2° C./h, or not greater than 0.1° C./h. In another example, the cooling rate may be at least 0.01° C./h, at least 0.02° C./h, at least 0.03° C./h, at least 0.04° C./h, at least 0.05° C./h, at least 0.06° C./h, at least 0.07° C./h, at least 0.08° C./h, at least 0.09° C./h, at least 0.1° C./h, at least 0.2° C./h, at least 0.3° C./h, at least 0.4° C./h, at least 0.5° C./h, at least 0.6° C./h, at least 0.7° C./h, at least 0.8° C./h, at least 0.9° C./h, at least 1° C./h, at least 1.1° C./h, at least 1.2° C./h, at least 1.3° C./h, at least 1.4° C./h, at least 1.5° C./h, at least 1.6° C./h, at least 1.7° C./h, or at least 1.8° C./h. Moreover, the cooling rate may be any value within a range including any of the maximum and minimum values noted herein.

After reading this disclosure, a skilled artisan will also appreciate heating the block may be performed at a faster rate at a lower temperature than higher temperature, and in instances, a soak in between those temperatures may not be performed.

In an embodiment, the process 100 can further include cooling the sintered body at a particular cooling rate to facilitate formation of the refractory object having improved properties and/or performance. In an aspect, the sintered body may be cooled from the second temperature to an ambient temperature. In an aspect, the sintered body may be cooled at a cooling rate including a rate of not greater than 35° C./h, not greater than 30° C./h, not greater than 25° C./h, not greater than 20° C./h, not greater than 10° C./h, not greater than 9° C./h, not greater than 8° C./h, not greater than 7° C./h, not greater than 6° C./h, not greater than 5° C./h, not greater than 4° C./h, not greater than 3° C./h, not greater than 2° C./h, not greater than 1° C./h, not greater than 0.9° C./h, or not greater than 0.8° C./h. In a further aspect, the sintered body may be cooled at a cooling rate of at least at least 0.03° C./h, at least 0.04° C./h, at least 0.05° C./h, at least 0.06° C./h, at least 0.07° C./h, at least 0.08° C./h, at least 0.09° C./h, at least 0.1° C./h, at least 0.2° C./h, at least 0.3° C./h, at least 0.4° C./h, at least 0.5° C./h, at least 0.6° C./h, at least 0.7° C./h, at least 0.8° C./h, at least 0.9° C./h, at least 1° C./h, at least 2° C./h, at least 3° C./h, at least 4° C./h, at least 5° C./h, at least 6° C./h, at least 7° C./h, at least 8° C./h, at least 9° C./h, at least 10° C./h, or at least 15° C./h. Moreover, the sintered body can be cooled at a cooling rate that may be any value in a range including any of the minimum and maximum values noted herein.

The shape of the body after sintering generally corresponds to the shape of the green body prior to sintering. Thus, the body may have any of the shapes as previously described with respect to the green body. During sintering, some shrinkage may occur, and the body may be smaller than the green body.

After initial processing and milling, the raw material powder in the zircon batch may include zircon grains that may have a particular median (D50) particle size. For example, the zircon grains may have a median (D50) particle size of not greater than 15 µm, such as, not greater than 14 µm, not greater than 12 µm, not greater than 10 µm, not greater than 9 µm, not greater than 8 µm, not greater than 7 µm, not greater than 6 µm, not greater than 5 µm, not greater than 4 µm, not greater than 3 µm or even not greater than 2 µm. According to still other examples, the zircon grains may have a median (D50) particle size of at least 1 µm, such as, at least 2 µm, at least 3, µm, at least 4 µm, at least 5 µm, at least 6 µm, at least 7 µm, at least 8 µm, at least 9 µm, at least 10 µm, at least 12 µm or even at least 14 µm. It will be appreciated that the zircon grains may have a median (D50) particle size of any value between any of the minimum and maximum values noted above. It will be further appreciated that the zircon grains may have a median (D50) particle size of any value within a range between any of the maximum and minimum values noted above. According to still other embodiments, the raw material powder in the zircon batch may have a particle size distribution controlled such that the zircon grains have a particular D90 particle size. For example, the zircon grains may have a D90 particle size of not greater than 40 µm, such as, not greater than 30 µm, not greater than 20 µm, not greater than 15 µm or even not greater than 10 µm. In still other instances, the zircon grains may have a D90 particle size of at least 5 µm, such as, at least 10 µm, at least 15 µm, at least 20 µm or even at least 30 µm. It will be appreciated that the zircon grains may have a D90 particle size of any value between any of the minimum and maximum values noted above. It will be further appreciated that the zircon grains may have a D90 particle size of any value within a range between any of the maximum and minimum values noted above.

According to still other embodiments, the raw material powder in the zircon batch may have a particle size distribution controlled such that the zircon grains have a particular D10 particle size. For example, the zircon grains may have a D10 particle size of at least 0.2 µm, such as, at least 0.5 µm, at least 0.8 µm or even at least 1.0 µm. In still other instances, the raw material powder may have a D10 particle size of not greater than 1.1 µm, such as, not greater than 1.0

µm, not greater than 0.8 µm or even not greater than 0.5 µm. It will be appreciated that the raw material powder may have a D10 particle size of any value within a range between any of the maximum and minimum values noted above. It will be further appreciated that the raw material powder may have a D10 particle size of any value within a range between any of the maximum and minimum values noted above.

According to still another embodiment, the raw material powder in the zircon batch may have a wide particle size distribution. According to still other embodiments, the raw material powder in the zircon batch may have a non-Gaussian particle size distribution. According to a particular embodiment, the non-Gaussian particle size distribution of the raw material powder may include distributions using at least two different average particle sizes. One such distribution can be a bimodal particle size distribution. In particular instances, it may be suitable to select at least one particle size that is significantly larger than another particle size. As will be further appreciated, a greater number of modes, such as, three, four, or more may be employed when forming the selected non-Gaussian particle size distribution for the raw material powder in the zircon batch. According to still other embodiments, the wide-particle size distribution may not necessarily include the selection and combining of two (or more) separate particle sizes, but the creation of a particular broad particle size distribution having a uniformity of representative particle sizes across the full range of the distribution.

The zircon batch may include a particular content of zircon. For example, zircon batch may include a content of zircon of at least 50 wt. % for a total weight of the zircon batch, such as, at least 52 wt. %, at least 53 wt. %, at least 54 wt. %, at least 55 wt. %, at least 56 wt. %, at least 57 wt. %, at least 57.5 wt. %, at least 58 wt. %, at least 58.5 wt. %, at least 59 wt. %, at least 59.5 wt. %, at least 60 wt. %, at least 60.5 wt. %, at least 61 wt. %, at least 61.5 wt. %, at least 62 wt. %, at least 62.5 wt. %, at least 63 wt. %, at least 62.5 wt. %, at least 64 wt. %, at least 64.5 wt. %, at least five wt. %, at least 65.5 wt. %, at least 66 wt. %, at least 66.5 wt. %, at least 67 wt. %, at least 68 wt. %, at least 69 wt. %, at least 70 wt. %, at least 75 wt. %, at least 80 wt. %, at least 85 wt. %, at least 90 wt. % or even at least 92 wt. %. According to still another embodiment, the zircon batch may include a content of zircon of not greater than 99 wt. % for total weight of the zircon batch, such as, not greater than 95 wt. %, not greater than 90 wt. %, not greater than 85 wt. %, not greater than 80 wt. %, not greater than 75 wt. %, not greater than 70 wt. %, not greater than 69 wt. %, not greater than 68 wt. %, not greater than 67 wt. %, not greater than 66.5 wt. %, not greater than 66 wt. %, at least 66.5 wt. %, not greater than 65 wt. %, not greater than 64.5 wt. %, not greater than 64 wt. %, not greater than 63.5 wt. %, not greater than 53 wt. %, not greater than 62.5 wt. %, not greater than 62 wt. %, not greater than 61.5 wt. %, not greater than 61 wt. %, not greater than 60.5 wt. %, not greater than 60 wt. %, not greater than 59.5 wt. %, not greater than 59 wt. %, not greater than 58 wt. %, not greater than 58 wt. %, not greater than 57 wt. %, not greater than 57 wt. %, not greater than 56 wt. %, not greater than 55 wt. %, not greater than 54 wt. %, not greater than 53 wt. %, not greater than 52 wt. % or even not greater than 51 wt. %. It will be appreciated that the content of zircon in wt. % for the total weight of the zircon batch may be any value between any of the minimum and maximum values noted above. It will be further appreciated that the content of zircon in wt. % for the total weight of the zircon batch may be within a range between any of the minimum and maximum values noted above. The contents of the components in the zircon batch can be determined by Inductively Coupled Plasma (ICP) analysis.

According to another particular embodiment, the zircon batch may include a particular content of $Al_2O_3$ containing component. For example, the zircon batch may include not greater than 10 wt. % of the $Al_2O_3$ containing component for a total weight of the zircon batch, such as, not greater than 9 wt. % of the $Al_2O_3$ containing component, not greater than 8 wt. % of the $Al_2O_3$ containing component, not greater than 7 wt. % of the $Al_2O_3$ containing component, not greater than 6.7 wt. % of the $Al_2O_3$ containing component, not greater than 6.5 wt. % of the $Al_2O_3$ containing component, not greater than 6.3 wt. % of the $Al_2O_3$ containing component, not greater than 6 wt. % of the $Al_2O_3$ containing component, not greater than 5.8 wt. % of the $Al_2O_3$ containing component, not greater than 5.5 wt. % of the $Al_2O_3$ containing component, not greater than 5.5 wt. % of the $Al_2O_3$ containing component, not greater than 5.2 wt. % of the $Al_2O_3$ containing component, not greater than 5 wt. % of the $Al_2O_3$ containing component, not greater than 4.8 wt. % of the $Al_2O_3$ containing component, not greater than 4.7 wt. % of the $Al_2O_3$ containing component, not greater than 4.5 wt. % of the $Al_2O_3$ containing component. According to still another embodiment, the zircon batch may include at least 0.2 wt. % of the $Al_2O_3$ containing component for a total weight of the zircon batch, such as, at least 0.5 wt. % of the $Al_2O_3$ containing component, at least 1.0 wt. % of the $Al_2O_3$ containing component, at least 1.5 wt. % of the $Al_2O_3$ containing component, at least 1.6 wt. % of the $Al_2O_3$ containing component, at least 1.7 wt. % of the $Al_2O_3$ containing component, at least 1.8 wt. % of the $Al_2O_3$ containing component, at least 1.9 wt. % of the $Al_2O_3$ containing component, at least 2.0 wt. % of the $Al_2O_3$ containing component, at least 2.1 wt. % of the $Al_2O_3$ containing component, at least 2.2 wt. % of the $Al_2O_3$ containing component, at least 2.3 wt. % of the $Al_2O_3$ containing component, at least 2.4 wt. % of the $Al_2O_3$ containing component, at least 2.5 wt. % of the $Al_2O_3$ containing component, at least 2.7 wt. % of the $Al_2O_3$ containing component, at least 2.9 wt. % of the $Al_2O_3$ containing component, at least 3.1 wt. % of the $Al_2O_3$ containing component, at least 3.3 wt. % of the $Al_2O_3$ containing component, at least 3.5 wt. % of the $Al_2O_3$ containing component, at least 3.8 wt. % of the $Al_2O_3$ containing component, at least 4 wt. % of the $Al_2O_3$ containing component, at least 4.2 wt. % of the $Al_2O_3$ containing component, at least 4.4 wt. % of the $Al_2O_3$ containing component, at least 4.5 wt. % of the $Al_2O_3$ containing component, at least 4.7 wt. % of the $Al_2O_3$ containing component, or even at least 5 wt. % of the $Al_2O_3$ containing component. It will be appreciated that the content of $Al_2O_3$ containing component in wt. % for the total weight of the zircon batch may be any value between any of the minimum and maximum values noted above. It will be further appreciated that the content of $Al_2O_3$ containing component in wt. % for the total weigh of the zircon batch may be within a range between any of the minimum and maximum values noted above.

According to another particular embodiment, the $Al_2O_3$ containing component in the zircon batch may include alumina. According to still another embodiment, the $Al_2O_3$ containing component in the zircon batch may include a particular content of alumina. For example, the $Al_2O_3$ containing component in the zircon batch may include at least 1 wt. % alumina for a total weight of the $Al_2O_3$ containing component, such as, at least 2 wt. % alumina, at least 5 wt. % alumina, at least 10 wt. % alumina, at least 15 wt. % alumina, at least 20 wt. % alumina, at least 25 wt. % alumina, at least 30 wt. % alumina, at least 35 wt. % alumina, at least 40 wt. % alumina, at least 45 wt. % alumina, at least 50 wt. % alumina, at least 55 wt. % alumina, at least 60 wt. % alumina, at least 65 wt. % alumina, at least 70 wt. % alumina, at least 75 wt. % alumina, at least 80 wt. % alumina, at least 85 wt. % alumina, at least 90 wt. % alumina, at least 95 wt. % alumina or the $Al_2O_3$ containing component may even consists essentially of alumina. It will be appreciated that content of alumina in the $Al_2O_3$ containing component in the zircon batch may be any value or at least any value between any of the values noted above.

According to another particular embodiment, the $Al_2O_3$ containing component in the zircon batch may include corundum. According to still another embodiment, the $Al_2O_3$ containing component in the zircon batch may include a particular content of corundum. For example, the $Al_2O_3$ containing component in the zircon batch may include at least 1 wt. % corundum for a total weight of the $Al_2O_3$ containing component, such as, at least 2 wt. % corundum, at least 5 wt. % corundum, at least 10 wt. % corundum, at least 15 wt. % corundum, at least 20 wt. % corundum, at least 25 wt. % corundum, at least 30 wt. % corundum, at least 35 wt. % corundum, at least 40 wt. % corundum, at least 45 wt. % corundum, at least 50 wt. % corundum, at least 55 wt. % corundum, at least 60 wt. % corundum, at least 65 wt. % corundum, at least 70 wt. % corundum, at least 75 wt. % corundum, at least 80 wt. % corundum, at least 85 wt. % corundum, at least 90 wt. % corundum, at least 95 wt. % corundum or the $Al_2O_3$ containing component may even consists essentially of corundum. It will be appreciated that content of corundum in the $Al_2O_3$ containing component in the zircon batch may be any value or at least any value between any of the values noted above.

According to still another embodiment, the $Al_2O_3$ containing component in the zircon batch may include a particular content of a crystallographic form of alumina (i.e., boehmite). For example, the $Al_2O_3$ containing component in the zircon batch may include at least 1 wt. % of a crystallographic form of alumina for a total weight of the $Al_2O_3$ containing component, such as, at least 2 wt. % of a crystallographic form of alumina, at least 5 wt. % of a crystallographic form of alumina, at least 10 wt. % of a crystallographic form of alumina, at least 15 wt. % of a crystallographic form of alumina, at least 20 wt. % of a crystallographic form of alumina, at least 25 wt. % of a crystallographic form of alumina, at least 30 wt. % of a crystallographic form of alumina, at least 35 wt. % of a crystallographic form of alumina, at least 40 wt. % of a crystallographic form of alumina, at least 45 wt. % of a crystallographic form of alumina, at least 50 wt. % of a crystallographic form of alumina, at least 55 wt. % of a crystallographic form of alumina, at least 60 wt. % of a crystallographic form of alumina, at least 65 wt. % of a crystallographic form of alumina, at least 70 wt. % of a crystallographic form of alumina, at least 75 wt. % of a crystallographic form of alumina, at least 80 wt. % of a crystallographic form of alumina, at least 85 wt. % of a crystallographic form of alumina, at least 90 wt. % of a crystallographic form of alumina, at least 95 wt. % of a crystallographic form of alumina or the $Al_2O_3$ containing component may even consists essentially of a crystallographic form of alumina. It will be appreciated that content of a crystallographic form of alumina in the $Al_2O_3$ containing component in the zircon batch may be any value or at least any value between any of the values noted above.

According to a particular embodiment, the $Al_2O_3$ containing component in the zircon batch may include mullite. According to still another embodiment, the $Al_2O_3$ containing component in the zircon batch may include a particular content of mullite. For example, the $Al_2O_3$ containing component in the zircon batch may include at least 1 wt. % mullite for a total weight of the $Al_2O_3$ containing component, such as, at least 2 wt. % mullite, at least 5 wt. % mullite, at least 10 wt. % mullite, at least 15 wt. % mullite, at least 20 wt. % mullite, at least 25 wt. % mullite, at least 30 wt. % mullite, at least 35 wt. % mullite, at least 40 wt. % mullite, at least 45 wt. % mullite, at least 50 wt. % mullite, at least 55 wt. % mullite, at least 60 wt. % mullite, at least 65 wt. % mullite, at least 70 wt. % mullite, at least 75 wt. % mullite, at least 80 wt. % mullite, at least 85 wt. % mullite, at least 90 wt. % mullite, at least 95 wt. % mullite or the $Al_2O_3$ containing component may even consists essentially of mullite. It will be appreciated that the content of mullite in the $Al_2O_3$ containing component in the zircon batch may be any value or may be at least any value between any of the values noted above.

According to still another embodiment, the mullite in the zircon batch may include $Al_6Si_2O_{13}$. According to still another embodiment, the mullite in the zircon batch may include a particular content of $Al_6Si_2O_{13}$. For example, the mullite in the zircon batch may include at least 1 wt. % $Al_6Si_2O_{13}$ for a total weight of the mullite, such as, at least 2 wt. % $Al_6Si_2O_{13}$, at least 2.5 wt % $Al_6Si_2O_{13}$, at least 2.9 wt % $Al_6Si_2O_{13}$, at least 5 wt. % $Al_6Si_2O_{13}$, at least 10 wt. % $Al_6Si_2O_{13}$, at least 15 wt. % $Al_6Si_2O_{13}$, at least 20 wt. % $Al_6Si_2O_{13}$, at least 25 wt. % $Al_6Si_2O_{13}$, at least 30 wt. % $Al_6Si_2O_{13}$, at least 35 wt. % $Al_6Si_2O_{13}$, at least 40 wt. % $Al_6Si_2O_{13}$, at least 45 wt. % $Al_6Si_2O_{13}$, at least 50 wt. % $Al_6Si_2O_{13}$, at least 55 wt. % $Al_6Si_2O_{13}$, at least 60 wt. % $Al_6Si_2O_{13}$, at least 65 wt. % $Al_6Si_2O_{13}$, at least 70 wt. % $Al_6Si_2O_{13}$, at least 75 wt. % $Al_6Si_2O_{13}$, at least 80 wt. % $Al_6Si_2O_{13}$, at least 85 wt. % $Al_6Si_2O_{13}$, at least 90 wt. % $Al_6Si_2O_{13}$, at least 95 wt. % $Al_6Si_2O_{13}$ or the mullite in the zircon batch may even consists essentially of $Al_6Si_2O_{13}$. It will be appreciated that the content of $Al_6Si_2O_{13}$ in mullite in the zircon batch may be any value or may be at least any value between any of the values noted above.

According to yet another particular embodiment, the $Al_2O_3$ containing component may include an aluminosilicate species. According to still another embodiment, the aluminosilicate species may include at least one of a non-stoichiometric mullite, stoichiometric mullite, and a combination thereof. According to still another embodiment, the $Al_2O_3$ containing component may include a combination of an aluminate species and an aluminosilicate species. According to yet another embodiment, the aluminosilicate species is present in a greater content than the aluminate species. According to another particular embodiment, the zircon batch may include a particular content a $SiO_2$ component. The $SiO_2$ component may include the combination of $SiO_2$ added to the zircon batch as part of the zircon material, $SiO_2$ added to the zircon batch as part of the $Al_2O_3$ containing component and the $SiO_2$ added to the zircon batch as free silica. Free silica may be defined as $SiO_2$ that is not bonded as part of the crystalline form of the zircon material or the $Al_2O_3$ containing component. For example, the zircon batch may include not greater than 34.5 wt. % of a $SiO_2$ component for a total weight of the zircon batch, not greater than 33 wt. % of a $SiO_2$ component, not greater than 32.5 wt. % of a $SiO_2$ component, not greater than 32 wt. % of a SiO$_2$ component, not greater than 31.5 wt. % of a SiO$_2$ component, not greater than 30 wt. % of a SiO$_2$ component, not greater than 29.5 wt. % of a SiO$_2$ component, not greater than 29 wt. % of a SiO$_2$ component, not greater than 28.5 wt. % of a SiO$_2$ component, not greater than 28 wt. % of a SiO$_2$ component, not greater than 27.5 wt. % of a SiO$_2$ component, not greater than 27 wt. % of a SiO$_2$ component or even greater than 26.5 wt. % of a SiO$_2$ component. According to still another embodiment, the zircon batch may include at least 25.5 wt. % of a SiO$_2$ component for a total weight of the zircon batch, at least 26 wt. % of a SiO$_2$ component, at least 26.5 wt. % of a SiO$_2$ component, at least 27 wt. % of a SiO$_2$ component, at least 27.5 wt. % of a SiO$_2$ component, at least 28 wt. % of a SiO$_2$ component, at least 28.5 wt. % of a SiO$_2$ component, at least 29 wt. % of a SiO$_2$ component, at least 29.5 wt. % of a SiO$_2$ component, at least 30 wt. % of a SiO$_2$ component, at least 30.5 wt. % of a SiO$_2$ component, at least 31 wt. % of a SiO$_2$ component, at least 31.5 wt. % of a SiO$_2$ component, at least 32 wt. % of a SiO$_2$ component, at least 32.5 wt. % of a SiO$_2$ component, at least 33 wt. % of a SiO$_2$ component, at least 33.5 wt. % of a SiO$_2$ component, about 34 wt. % of a SiO$_2$ component or even at least 34.5 wt. % of a SiO$_2$ component. It will be appreciated that the content of a SiO$_2$ component in wt. % for the total weight of the zircon batch may be any value between any of the minimum and maximum values noted above. It will be further appreciated that the content of a SiO$_2$ component in wt. % for the total weigh of the zircon batch may be within a range between any of the minimum and maximum values noted above.

According to still another embodiment, the zircon batch may include a particular content of free silica. For example, the zircon batch may include not greater than 4.5 wt. % of free silica for a total weight of the zircon batch, such as, not greater than 4.0 wt. % of free silica, not greater than 3.9 wt. % of free silica, not greater than 3.8 wt. % of free silica, not greater than 3.7 wt. % of free silica, not greater than 3.6 wt. % of free silica, not greater than 3.5 wt. % of free silica, not greater than 3.4 wt. % of free silica, not greater than 3.3 wt. % of free silica, not greater than 3.2 wt. % of free silica, not greater than 3.1 wt. % of free silica, not greater than 3.0 wt. % of free silica, not greater than 2.9 wt. % of free silica, not greater than 2.8 wt. % of free silica, not greater than 2.7 wt. % of free silica, not greater than 2.6 wt. % of free silica, not greater than 2.5 wt. % of free silica, not greater than 2.4 wt. % of free silica, not greater than 2.3 wt. % of free silica, not greater than 2.2 wt. % of free silica, not greater than 2.1 wt. % of free silica, not greater than 2.0 wt. % of free silica, not greater than 1.9 wt. % of free silica, not greater than 1.8 wt. % of free silica, not greater than 1.7 wt. % of free silica, not greater than 1.6 wt. % of free silica, not greater than 1.5 wt. % of free silica, not greater than 1.4 wt. % of free silica, not greater than 1.3 wt. % of free silica, not greater than 1.2 wt. % of free silica, not greater than 1.1 wt. % of free silica. According to another particular embodiment, the zircon batch may include at least 0.1 wt. % of free silica for a total weight of the zircon batch, such as, at least 0.5 wt. % of free silica, at least 0.6 wt. % of free silica, at least 0.7 wt. % of free silica, at least 0.8 wt. % of free silica, at least 0.9 wt. % of free silica, at least 1.0 wt. % of free silica, at least 1.1 wt. % of free silica, at least 1.1 wt. % of free silica, at least 1.2 wt. % of free silica, at least 1.3 wt. % of free silica, at least 1.4 wt. % of free silica, at least 1.5 wt. % of free silica, at least 1.6 wt. % of free silica, at least 1.7 wt. % of free silica, at least 1.8 wt. % of free silica, at least 1.9 wt. % of free silica, at least 2.0 wt. % of free silica, at least 2.1 wt. % of free silica, at least 2.2 wt. % of free silica, at least 2.3 wt. % of free silica, at least 2.4 wt. % of free silica, at least 2.5 wt. % of free silica, at least 2.6 wt. % of free silica, at least 2.7 wt. % of free silica, at least 2.8 wt. % of free silica, at least 2.9 wt. % of free silica, at least 3.0 wt. % of free silica, at least 3.1 wt. % of free silica, at least 3.2 wt. % of free silica, at least 3.3 wt. % of free silica, at least 3.4 wt. % of free silica, at least 3.5 wt. % of free silica, at least 3.6 wt. % of free silica, at least 3.7 wt. % of free silica, at least 3.8 wt. % of free silica, at least 3.9 wt. % of free silica, at least 4.0 wt. % of free silica or even at least 4.5 wt. % of free silica. It will be appreciated that the content of free silica in wt. % for the total weight of the zircon batch may be any value between any of the minimum and maximum values noted above. It will be further appreciated that the content of free silica in wt. % for the total weigh of the zircon batch may be within a range between any of the minimum and maximum values noted above.

According to still another embodiment, the zircon batch may include a particular ratio $CM_{SiO2}/CM_{AlC}$. $CM_{SiO2}$ may represent a content of the SiO$_2$ component in wt. % for a total weight of the zircon batch and $CM_{AlC}$ may represent a content of Al$_2$O$_3$ containing component in wt. % for a total weight of the zircon batch. For example, the zircon batch may have a ratio $CM_{SiO2}/CM_{AlC}$ of at least 5, such as, at least 8, at least 10, at least 13, at least 15, at least 18, at least 20, at least 23, at least 25, at least 28, at least 30, at least 33, at least 35, at least 38, at least 40, at least 43, at least 45 or even at least 48. According to another embodiment, the zircon batch may include a ratio a ratio $CM_{SiO2}/CM_{AlC}$ of not greater than 50, such as, not greater than 47, not greater than 45, not greater than 42, not greater than 40, not greater than 37, not greater than 35, not greater than 32, not greater than 30, not greater than 27, not greater than 20, not greater than 17, not greater than 12, not greater than 10 or even not greater than 7. It will be appreciated that the ratio $CM_{SiO2}/CM_{AlC}$ may be any value between any of the minimum and maximum values noted above. It will be further appreciated that the $CM_{SiO2}/CM_{AlC}$ may be within a range between any of the minimum and maximum values noted above.

According to still another embodiment, the zircon batch may include a particular ratio $CM_{FS}/CM_{AlC}$. $CM_{FS}$ may represent a content of free silica in wt. % for a total weight of the zircon batch and $CM_{AlC}$ may represent a content of Al$_2$O$_3$ containing component in wt. % for a total weight of the zircon batch. For example, the zircon batch may have a ratio $CM_{FS}/CM_{AlC}$ of at least 0.3, such as, at least 0.5, at least 0.7, at least 1.0, at least 1.3, at least 1.5, at least 1.7, at least 2.0, at least 2.3, at least 2.7, at least 3.0, at least 3.3, at least 3.5 or even at least 3.7. According to another embodiment, the zircon batch may include a ratio a ratio $CM_{FS}/CM_{AlC}$ of not greater than 3.8, such as, not greater than 3.5, not greater than 3.3, not greater than 3.0, not greater than 2.8, not greater than 2.5, not greater than 2.3, not greater than 2.0, not greater than 1.8, not greater than 1.5, not greater than 1.3, not greater than 1.0, not greater than 0.8 or even not greater than 0.5. It will be appreciated that the ratio $CM_{FS}/CM_{AlC}$ may be any value between any of the minimum and maximum values noted above. It will be further appreciated that the $CM_{FS}/CM_{AlC}$ may be within a range between any of the minimum and maximum values noted above.

According to still another embodiment, the zircon batch may include a particular ratio $CM_{AlC}/CM_{Z}$. $CM_{AlC}$ may represent a content of Al$_2$O$_3$ containing component in wt. % for a total weight of the zircon batch and $CM_{Z}$ may represent a content of zircon in wt. % for a total weight of the mixture. For example, the zircon batch may include a ratio $CM_{AlC}/$ $CM_Z$ of not greater than 0.08, such as, not greater than 0.075, not greater than 0.07, not greater than 0.065, not greater than 0.06, not greater than 0.055, not greater than 0.05, not greater than 0.045, not greater than 0.04, not greater than 0.035, not greater than 0.030, not greater than 0.025, not greater than 0.02, not greater than 0.015 or even not greater than 0.01. According to still another embodiment, the zircon batch may include a ratio of $CM_{AlC}/CM_Z$ of at least 0.002, such as, at least 0.005, at least 0.01, at least at least 0.02, at least 0.03, at least 0.035, at least 0.04, at least 0.045, at least 0.05, at least 0.055, at least 0.06, at least 0.065, at least 0.07, at least 0.075, at least 0.08, at least 0.085 or even at least 0.09. It will be appreciated that the ratio $CM_{AlC}/CM_Z$ may be any value between any of the minimum and maximum values noted above. It will be further appreciated that the $CM_{AlC}/CM_Z$ may be within a range between any of the minimum and maximum values noted above.

In another embodiment, the zircon batch can include an alkaline earth containing component including a compound, such as, an oxide, nitrate, sulfate, hydrated form thereof, or any combination thereof, an organic material, or any combinations thereof. In particular embodiments, the alkaline earth containing component can include an oxide including CaO, BaO, SrO, or any combination thereof. In another particular embodiment, the alkaline earth containing component can be intentionally added in a particular amount that can facilitate formation of the zircon body having improved properties and/or performance.

In another embodiment, the zircon batch can include a particular content of the alkaline earth containing component that can facilitate formation of the refractory object having improved properties and/or performance. For example, the zircon batch may include not greater than 14 wt. % of the alkaline earth containing component for a total weight of the zircon batch, such as, not greater than 13 wt. % of the alkaline earth containing component, not greater than 12 wt. % of the alkaline earth containing component, not greater than 11 wt. % of the alkaline earth containing component, not greater than 10 wt. % of the alkaline earth containing component, not greater than 9 wt. % of the alkaline earth containing component, not greater than 8 wt. % of the alkaline earth containing component, not greater than 7 wt. % of the alkaline earth containing component, not greater than 6 wt. % of the alkaline earth containing component, not greater than 5 wt. % of the alkaline earth containing component, not greater than 4.5 wt. % of the alkaline earth containing component, not greater than 4.2 wt. % of the alkaline earth containing component, not greater than 4 wt. % of the alkaline earth containing component, not greater than 3.5 wt. % of the alkaline earth containing component, not greater than 3 wt. % of the alkaline earth containing component, not greater than 2.5 wt. % of the alkaline earth containing component, or not greater than 2 wt. % of the alkaline earth containing component. In another example, the zircon batch may include at least 0.02 wt. % of the alkaline earth containing component for a total weight of the zircon body, such as, at least 0.05 wt. % of the alkaline earth containing component, at least 0.08 wt. % of the alkaline earth containing component, at least 0.1 wt. % of the alkaline earth containing component, at least 0.15 wt. % of the alkaline earth containing component, at least 0.2 wt. % of the alkaline earth containing component, at least 0.3 wt. % of the alkaline earth containing component, at least 0.4 wt. % of the alkaline earth containing component, at least 0.5 wt. % of the alkaline earth containing component, at least 0.6 wt. % of the alkaline earth containing component, at least 0.7 wt. % of the alkaline earth containing component, at least 0.8 wt. % of the alkaline earth containing component, at least 0.9 wt. % of the alkaline earth containing component, at least 1 wt. % of the alkaline earth containing component, at least 1.2 wt. % of the alkaline earth containing component, at least 1.4 wt. % of the alkaline earth containing component, at least 1.5 wt. % of the alkaline earth containing component, at least 1.8 wt. % of the alkaline earth containing component, at least 2 wt. % of the alkaline earth containing component, or even at least 2.3 wt. % of the alkaline earth containing component. It will be appreciated that the content of alkaline earth containing component in wt. % for the total weight of the zircon batch may be any value between any of the minimum and maximum values noted above. It will be further appreciated that the content of alkaline earth containing component in wt. % for the total weigh of the zircon batch may be within a range between any of the minimum and maximum values noted above.

According to a particular embodiment, the zircon batch may include a particular content of CaO that can facilitate formation of the refractory object having improved properties and/or performance. For example, the zircon batch may include not greater than 5 wt. % of CaO for a total weight of the zircon batch, such as, not greater than 4.5 wt. % of CaO, not greater than 4 wt. % of CaO, not greater than 3.8 wt. % of CaO, not greater than 3.6 wt. % of CaO, not greater than 3.5 wt. % of CaO, not greater than 3.2 wt. % of CaO, not greater than 3 wt. % of CaO, not greater than 2.8 wt. % of CaO, not greater than 2.6 wt. % of CaO, not greater than 2.5 wt. % of CaO, not greater than 2.3 wt. % of CaO, not greater than 2.1 wt. % of CaO, not greater than 2 wt. % of CaO, not greater than 1.8 wt. % of CaO, not greater than 1.6 wt. % of CaO, not greater than 1.4 wt. % of CaO, not greater than 1.2 wt. % of CaO, or not greater than 1 wt. % of CaO. In another example, the zircon batch may include greater than 0.07 wt. % of CaO for a total weight of the zircon batch, such as at least 0.1 wt. % of CaO, at least 0.12 wt. %. at least 0.15 wt. %, at least 0.18 wt. %, at least 0.2 wt. % of CaO, at least 0.25 wt. %, at least 0.29 wt. %, at least 0.3 wt. % of CaO, at least 0.31 wt. % of CaO, at least 0.33 wt. %, at least 0.4 wt. % of CaO, at least 0.43 wt. %, at least 0.45 wt. %, at least 0.47 wt. %, at least 0.5 wt. % of CaO, at least 0.6 wt. % of CaO, at least 0.62 wt. % of CaO, at least 0.7 wt. % of CaO, at least 0.8 wt. % of CaO, at least 0.9 wt. % of CaO, at least 1 wt. % of CaO, at least 1.2 wt. % of CaO, at least 1.4 wt. % of CaO, at least 1.5 wt. % of CaO, at least 1.8 wt. % of CaO, or at least 2 wt. % of CaO. Moreover, the content of CaO in wt. % for the total weight of the zircon batch may be any value between any of the minimum and maximum values noted above. It will be further appreciated that the content of CaO in wt. % for the total weigh of the zircon batch may be within a range between any of the minimum and maximum values noted above.

According to another particular embodiment, the zircon batch may include a particular content of MgO that can facilitate formation of the refractory object having improved properties and/or performance. For example, the zircon batch may include not greater than 4 wt. % of MgO for a total weight of the zircon batch, such as, not greater than 3.8 wt. % of MgO, not greater than 3.6 wt. % of MgO, not greater than 3.5 wt. % of MgO, not greater than 3.2 wt. % of MgO, not greater than 3 wt. % of MgO, not greater than 2.8 wt. % of MgO, not greater than 2.6 wt. % of MgO, not greater than 2.5 wt. % of MgO, not greater than 2.3 wt. % of MgO, not greater than 2.1 wt. % of MgO, not greater than 2 wt. % of MgO, not greater than 1.8 wt. % of MgO, not greater than 1.6 wt. % of MgO, not greater than 1.4 wt. % of MgO, not greater than 1.2 wt. % of MgO, not greater than 1.0 wt. % of MgO not greater than 0.8 wt. % of MgO, not greater than 0.5 wt. % of MgO, not greater than 0.4 wt. % of MgO, not greater than 0.3 wt. % of MgO, not greater than 0.2 wt. % of MgO, not greater than 0.1 wt. % of MgO, not greater than 0.05 wt. % of MgO, or not greater than 0.01 wt. % of MgO for a total weight of the zircon batch. In another example, the zircon batch may include at least 0.005 wt. % of MgO for a total weight of the zircon batch, such as, at least 0.01 wt. % of MgO, at least 0.02 wt. % of MgO, at least at least 0.03 wt. % of MgO, at least 0.04 wt. % of MgO, at least 0.05 wt. % of MgO, at least 0.06 wt. % of MgO, at least 0.07 wt. % of MgO, at least 0.08 wt. % of MgO, at least 0.09 wt. % of MgO, or at least 0.1 wt. % of MgO for a total weight of the zircon body. In a particular embodiment, the zircon batch may be essentially free of MgO. Moreover, the content of MgO in wt. % for the total weight of the zircon batch may be any value between any of the minimum and maximum values noted above. It will be further appreciated that the content of MgO in wt. % for the total weigh of the zircon batch may be within a range between any of the minimum and maximum values noted above.

According to a particular embodiment, the zircon batch may include a particular content of SrO that can facilitate formation of the refractory object having improved properties and/or performance. For example, the zircon batch may include not greater than 5 wt. % of SrO for a total weight of the zircon batch, such as, not greater than 4.5 wt. % of SrO, not greater than 4 wt. % of SrO, not greater than 3.8 wt. % of SrO, not greater than 3.6 wt. % of SrO, not greater than 3.5 wt. % of SrO, not greater than 3.2 wt. % of SrO, not greater than 3 wt. % of SrO, not greater than 2.8 wt. % of SrO, not greater than 2.6 wt. % of SrO, not greater than 2.5 wt. % of SrO, not greater than 2.3 wt. % of SrO, not greater than 2.1 wt. % of SrO, not greater than 2 wt. % of SrO, not greater than 1.8 wt. % of SrO, not greater than 1.6 wt. % of SrO, not greater than 1.4 wt. % of SrO, not greater than 1.2 wt. % of SrO, or not greater than 1 wt. % of SrO. In another example, the zircon batch may include greater than 0.04 wt. % of SrO for a total weight of the zircon batch, such as, at least 0.05 wt. %, at least 0.07 wt. %, at least 0.1 wt. %, at least 0.12 wt. %, at least 0.15 wt. % of SrO, at least 0.18 wt. %, at least 0.2 wt. % of SrO, at least 0.24 wt. % of SrO, at least 0.28 wt. % of SrO, at least at least 0.3 wt. % of SrO, at least 0.4 wt. % of SrO, at least 0.42 wt. % of SrO, at least 0.47 wt. % of SrO, at least 0.5 wt. % of SrO, at least 0.6 wt. % of SrO, at least 0.7 wt. % of SrO, at least 0.8 wt. % of SrO, at least 0.9 wt. % of SrO, at least 1 wt. % of SrO, at least 1.2 wt. % of SrO, at least 1.4 wt. % of SrO, at least 1.5 wt. % of SrO, at least 1.8 wt. % of SrO, or at least 2 wt. % of SrO. Moreover, the content of SrO in wt. % for the total weight of the zircon batch may be any value between any of the minimum and maximum values noted above. It will be further appreciated that the content of SrO in wt. % for the total weigh of the zircon batch may be within a range between any of the minimum and maximum values noted above.

According to a particular embodiment, the zircon batch may include a particular content of BaO that can facilitate formation of the refractory object having improved properties and/or performance. For example, the zircon batch may include not greater than 6.5 wt. % of BaO for a total weight of the zircon batch, such as, not greater than 6 wt. %, not greater than 5 wt. %, not greater than 4.5 wt. % of BaO, not greater than 4 wt. % of BaO, not greater than 3.8 wt. % of BaO, not greater than 3.6 wt. % of BaO, not greater than 3.5 wt. % of BaO, not greater than 3.2 wt. % of BaO, not greater than 3 wt. % of BaO, not greater than 2.8 wt. % of BaO, not greater than 2.6 wt. % of BaO, not greater than 2.5 wt. % of BaO, not greater than 2.3 wt. % of BaO, not greater than 2.1 wt. % of BaO, not greater than 2 wt. % of BaO, not greater than 1.8 wt. % of BaO, not greater than 1.6 wt. % of BaO, not greater than 1.4 wt. % of BaO, not greater than 1.2 wt. % of BaO, or not greater than 1 wt. % of BaO. In another example, the zircon batch may include greater than 0.09 wt. % of BaO for a total weight of the zircon batch, such as, at least 0.15 wt. % of BaO, at least 0.2 wt. % of BaO, at least 0.21 wt. % of BaO, at least 0.3 wt. % of BaO, at least 0.35 wt. % of BaO, at least 0.4 wt. % of BaO, at least 0.5 wt. % of BaO, at least 5.3 wt. % of BaO, at least 0.6 wt. % of BaO, at least 0.63 wt. % of BaO, at least 0.7 wt. % of BaO, at least 0.72 wt. % of BaO, at least 0.78 wt. % of BaO, at least 0.8 wt. % of BaO, at least 0.9 wt. % of BaO, at least 1 wt. % of BaO, at least 1.2 wt. % of BaO, at least 1.4 wt. % of BaO, at least 1.5 wt. % of BaO, at least 1.53 wt. % of BaO, at least 1.6 wt. % of BaO, at least 1.7 wt. % of BaO, at least 1.8 wt. % of BaO, at least 1.9 wt. % of BaO, or at least 2 wt. % of BaO. Moreover, the content of BaO in wt. % for the total weight of the zircon batch may be any value between any of the minimum and maximum values noted above. It will be further appreciated that the content of BaO in wt. % for the total weigh of the zircon batch may be within a range between any of the minimum and maximum values noted above.

According to yet another particular embodiment, the zircon batch may include a sintering aid, for example, $Ta_2O_5$ or $TiO_2$. According to still another particular embodiment, the zircon batch may include a particular content of a sintering aid. For example, the zircon batch may include not greater than 5.0 wt. % of a sintering aid for a total weight of the zircon batch, such as, not greater than 4.5 wt. % of a sintering aid, not greater than 4.0 wt. % of a sintering aid, not greater than 3.5 wt. % of a sintering aid, not greater than 3.0 wt. % of a sintering aid, not greater than 2.5 wt. % of a sintering aid, not greater than 2.0 wt. % of a sintering aid, not greater than 1.5 wt. % of a sintering aid, not greater than 1.0 wt. % of a sintering aid, not greater than 0.5 wt. % of a sintering aid, not greater than 0.1 wt. % of a sintering aid or the zircon batch may even be essentially free of a sintering aid. According to still another particular embodiment, the zircon batch may include at least 0.1 wt. % of a sintering aid a total weight of the zircon batch, at least 0.2 wt. % of a sintering aid, at least 0.3 wt. % of a sintering aid, at least 0.4 wt. % of a sintering aid, at least 0.5 wt. % of a sintering aid, at least 0.6 wt. % of a sintering aid, at least 0.7 wt. % of a sintering aid, at least 0.8 wt. % of a sintering aid or even at least 0.9 wt. % of a sintering aid. It will be appreciated that the content of a sintering aid in wt. % for the total weight of the zircon batch may be any value between any of the minimum and maximum values noted above. It will be further appreciated that the content of a sintering aid in wt. % for the total weigh of the zircon batch may be within a range between any of the minimum and maximum values noted above.

According to yet another embodiment, the zircon batch may include a particular ratio $CM_{SA}/CM_{SiO2}$. $CM_{SA}$ represents a content of a sintering aid in wt. % for a total weight of the zircon batch and $CM_{SiO2}$ represents a content of the $SiO_2$ component in wt. % for a total weight of the zircon batch. According to certain embodiments, the zircon batch may include a ratio $CM_{SA}/CM_{SiO2}$ of not greater than 0.5, such as, not greater than 0.1, not greater than 0.05, not greater than 0.04, not greater than 0.03 or even not greater than 0.02. According to another particular embodiment, the zircon batch may include a ratio $CM_{SA}/CM_{SiO2}$ of at least 0.001, such as, at least 0.005, at least 0.01, at least 0.02 or even at least 0.03. It will be appreciated that the ratio $CM_{SA}/CM_{SiO2}$ may be any value between any of the minimum and maximum values noted above. It will be further appreciated that the $CM_{SA}/CM_{SiO2}$ may be within a range between any of the minimum and maximum values noted above.

According to still another embodiment, the zircon batch may include a particular content of $Ta_2O_5$. For example, the zircon batch may include at least 0.1 wt. % of $Ta_2O_5$ for a total weight of the zircon batch, such as, at least 0.2 wt. % of $Ta_2O_5$, at least 0.3 wt. % of $Ta_2O_5$, at least 0.4 wt. % of $Ta_2O_5$, at least 0.5 wt. % of $Ta_2O_5$, at least 0.6 wt. % of $Ta_2O_5$, at least 0.7 wt. % of $Ta_2O_5$, at least 0.8 wt. % of $Ta_2O_5$ or even at least 0.9 wt. % of $Ta_2O_5$. According to still another embodiment, the zircon batch may include not greater than 3.0 wt. % of $Ta_2O_5$ for a total weight of the zircon batch, such as, not greater than 2.5 wt. % of $Ta_2O_5$, not greater than 2.0 wt. % of $Ta_2O_5$, not greater than 1.5 wt. % of $Ta_2O_5$, not greater than 1.0 wt. % of $Ta_2O_5$, not greater than 0.5 wt. % of $Ta_2O_5$, not greater than 0.1 wt. % of $Ta_2O_5$ or the zircon batch may even be essentially free of $Ta_2O_5$. It will be appreciated that the content of $Ta_2O_5$ in wt. % for the total weight of the zircon batch may be any value between any of the minimum and maximum values noted above. It will be further appreciated that the content of $Ta_2O_5$ in wt. % for the total weigh of the zircon batch may be within a range between any of the minimum and maximum values noted above.

According to yet another embodiment, the zircon batch may include a particular ratio $CM_{Ta2O5}/CM_{SiO2}$. $CM_{Ta2O5}$ represents a content of $Ta_2O_5$ in wt. % for a total weight of the zircon batch and $CM_{SiO2}$ represents a content of the $SiO_2$ component in wt. % for a total weight of the zircon batch. According to certain embodiments, the zircon batch may include a ratio $CM_{Ta2O5}/CM_{SiO2}$ of not greater than 0.5, such as, not greater than 0.1, not greater than 0.05, not greater than 0.04, not greater than 0.03 or even not greater than 0.02. According to another particular embodiment, the zircon batch may include a ratio $CM_{Ta2O5}/CM_{SiO2}$ of at least 0.001, such as, at least 0.005, at least 0.01, at least 0.02 or even at least 0.03. It will be appreciated that the ratio $CM_{Ta2O5}/CM_{SiO2}$ may be any value between any of the minimum and maximum values noted above. It will be further appreciated that the $CM_{Ta2O5}/CM_{SiO2}$ may be within a range between any of the minimum and maximum values noted above.

According to still another embodiment, the zircon batch may include a particular content of $TiO_2$. For example, the zircon batch may include not greater than 5.0 wt. % of $TiO_2$ for a total weight of the zircon batch, such as, not greater than 4.5 wt. % of $TiO_2$, not greater than 4.0 wt. % of $TiO_2$, not greater than 3.5 wt. % of $TiO_2$, not greater than 3.0 wt. % of $TiO_2$, not greater than 2.5 wt. % of $TiO_2$, not greater than 2.0 wt. % of $TiO_2$, not greater than 1.5 wt. % of $TiO_2$, not greater than 1.0 wt. % of $TiO_2$, not greater than 0.5 wt. % of $TiO_2$, not greater than 0.1 wt. % of $TiO_2$ or the zircon batch may even be essentially free of $TiO_2$. According to still another particular embodiment, the zircon batch may include at least 0.1 wt. % of $TiO_2$ for a total weight of the zircon batch, at least 0.2 wt. % of $TiO_2$, at least 0.3 wt. % of $TiO_2$, at least 0.4 wt. % of $TiO_2$, at least 0.5 wt. % of $TiO_2$, at least 0.6 wt. % of $TiO_2$, at least 0.7 wt. % of $TiO_2$, at least 0.8 wt. % of $TiO_2$ or even at least 0.9 wt. % of $TiO_2$. It will be appreciated that the content of $TiO_2$ in wt. % for the total weight of the zircon batch may be any value between any of the minimum and maximum values noted above. It will be further appreciated that the content of $TiO_2$ in wt. % for the total weigh of the zircon batch may be within a range between any of the minimum and maximum values noted above.

According to yet another embodiment, the zircon batch may include a particular ratio $CM_{TiO2}/CM_{SiO2}$. $CM_{TiO2}$ represents a content of $TiO_2$ in wt. % for a total weight of the zircon batch and $CM_{SiO2}$ represents a content of the $SiO_2$ component in wt. % for a total weight of the zircon batch. According to certain embodiments, the zircon batch may include a ratio $CM_{TiO2}/CM_{SiO2}$ of not greater than 0.5, such as, not greater than 0.1, not greater than 0.05, not greater than 0.04, not greater than 0.03 or even not greater than 0.02. According to another particular embodiment, the zircon batch may include a ratio $CM_{TiO2}/CM_{SiO2}$ of at least 0.001, such as, at least 0.005, at least 0.01, at least 0.02 or even at least 0.03. It will be appreciated that the ratio $CM_{TiO2}/CM_{SiO2}$ may be any value between any of the minimum and maximum values noted above. It will be further appreciated that the $CM_{TiO2}/CM_{SiO2}$ may be within a range between any of the minimum and maximum values noted above.

According to yet another embodiment, the zircon batch may include a particular content of $Ta_2O_5$ and $TiO_2$ combined. For example, the zircon batch may include not greater than 5.0 wt. % of $Ta_2O_5$ and $TiO_2$ combined for a total weight of the zircon batch, such as, not greater than 4.0 wt. % of $Ta_2O_5$ and $TiO_2$ combined, not greater than 3.0 wt. % of $Ta_2O_5$ and $TiO_2$ combined, not greater than 2.0 wt. % of $Ta_2O_5$ and $TiO_2$ combined, not greater than 1.0 wt. % of $Ta_2O_5$ and $TiO_2$ combined, not greater than 0.5 wt. % of $Ta_2O_5$ and $TiO_2$ combined, not greater than 0.1 wt. % of $Ta_2O_5$ and $TiO_2$ combined or the zircon batch may even be essentially free of $Ta_2O_5$ and $TiO_2$ combined. According to yet another embodiment, the zircon batch may include at least 0.1 wt. % of $Ta_2O_5$ and $TiO_2$ combined for a total weight of the zircon batch, such as, at least 0.2 wt. % of $Ta_2O_5$ and $TiO_2$ combined, at least 0.3 wt. % of $Ta_2O_5$ and $TiO_2$ combined, at least 0.4 wt. % of $Ta_2O_5$ and $TiO_2$ combined, at least 0.5 wt. % of $Ta_2O_5$ and $TiO_2$ combined, at least 0.6 wt. % of $Ta_2O_5$ and $TiO_2$ combined, at least 0.7 wt. % of $Ta_2O_5$ and $TiO_2$ combined $Ta_2O_5$ and $TiO_2$ combined, at least 0.8 wt. % of $Ta_2O_5$ and $TiO_2$ combined or even at least 0.9 wt. % of $Ta_2O_5$ and $TiO_2$ combined. It will be appreciated that the content of $Ta_2O_5$ and $TiO_2$ combined in wt. % for the total weight of the zircon batch may be any value between any of the minimum and maximum values noted above. It will be further appreciated that the content of $Ta_2O_5$ and $TiO_2$ combined in wt. % for the total weigh of the zircon batch may be within a range between any of the minimum and maximum values noted above.

According to still another embodiment, the zircon batch may include a particular content of $K_2O$. For example, the zircon batch may include not greater than 1.0 wt. % of $K_2O$ for a total weight of the zircon batch, such as, not greater than 0.8 wt. % of $K_2O$, not greater than 0.5 wt. % of $K_2O$, not greater than 0.4 wt. % of $K_2O$, not greater than 0.3 wt. % of $K_2O$, not greater than 0.2 wt. % of $K_2O$, not greater than 0.1 wt. % of $K_2O$ or the zircon batch may be essentially free of $K_2O$.

According to still another embodiment, the zircon batch may include a particular content of $Na_2O$. For example, the zircon batch may include not greater than 1.0 wt. % of $Na_2O$ for a total weight of the zircon batch, such as, not greater than 0.8 wt. % of $Na_2O$, not greater than 0.5 wt. % of $Na_2O$, not greater than 0.4 wt. % of $Na_2O$, not greater than 0.3 wt.

% of $Na_2O$, not greater than 0.2 wt. % of $Na_2O$, not greater than 0.1 wt. % of $Na_2O$ or the zircon batch may be essentially free of $Na_2O$.

According to still another embodiment, the zircon batch may include a particular content of $Y_2O_3$. For example, the zircon batch may include not greater than 1.0 wt. % of $Y_2O_3$ for a total weight of the zircon batch, such as, not greater than 0.8 wt. % of $Y_2O_3$, not greater than 0.5 wt. % of $Y_2O_3$, not greater than 0.4 wt. % of $Y_2O_3$, not greater than 0.3 wt. % of $Y_2O_3$, not greater than 0.2 wt. % of $Y_2O_3$, not greater than 0.1 wt. % of $Y_2O_3$ or the zircon batch may be essentially free of $Y_2O_3$.

According to still another embodiment, the zircon batch may include a particular content of $P_2O_5$. For example, the zircon batch may include not greater than 1.0 wt. % of $P_2O_5$ for a total weight of the zircon batch, such as, not greater than 0.8 wt. % of $P_2O_5$, not greater than 0.5 wt. % of $P_2O_5$, not greater than 0.4 wt. % of $P_2O_5$, not greater than 0.3 wt. % of $P_2O_5$, not greater than 0.2 wt. % of $P_2O_5$, not greater than 0.1 wt. % of $P_2O_5$ or the zircon batch may be essentially free of $P_2O_5$.

According to still another embodiment, the zircon batch may include a particular content of $Fe_2O_3$. For example, the zircon batch may include not greater than 1.0 wt. % of $Fe_2O_3$ for a total weight of the zircon batch, such as, not greater than 0.8 wt. % of $Fe_2O_3$, not greater than 0.5 wt. % of $Fe_2O_3$, not greater than 0.4 wt. % of $Fe_2O_3$, not greater than 0.3 wt. % of $Fe_2O_3$, not greater than 0.2 wt. % of $Fe_2O_3$, not greater than 0.1 wt. % of $Fe_2O_3$ or the zircon batch may be essentially free of $Fe_2O_3$.

According to still another embodiment, the zircon batch may include a particular content of ZnO. For example, the zircon batch may include not greater than 1.0 wt. % of ZnO for a total weight of the zircon batch, such as, not greater than 0.8 wt. % of ZnO, not greater than 0.5 wt. % of ZnO, not greater than 0.4 wt. % of ZnO, not greater than 0.3 wt. % of ZnO, not greater than 0.2 wt. % of ZnO, not greater than 0.1 wt. % of ZnO or the zircon batch may be essentially free of ZnO.

According to still another embodiment, the zircon batch may include a particular content of $TiO_2$, $K_2O$, $Na_2O$, $Y_2O_3$, $P_2O_5$, $Fe_2O_3$ and ZnO combined. For example, the zircon batch may include not greater than 1.5 wt. % of $TiO_2$, $K_2O$, $Na_2O$, $Y_2O_3$, $P_2O_5$, $Fe_2O_3$ and ZnO combined for a total weight of the zircon batch, such as, not greater than 1.2 wt. % of $TiO_2$, $K_2O$, $Na_2O$, $Y_2O_3$, $P_2O_5$, $Fe_2O_3$ and ZnO combined, not greater than 1.0 wt. % of $TiO_2$, $K_2O$, $Na_2O$, $Y_2O_3$, $P_2O_5$, $Fe_2O_3$ and ZnO combined, not greater than 0.7 wt. % of $TiO_2$, $K_2O$, $Na_2O$, $Y_2O_3$, $P_2O_5$, $Fe_2O_3$ and ZnO combined, not greater than 0.5 wt. % of $TiO_2$, $K_2O$, $Na_2O$, $Y_2O_3$, $P_2O_5$, $Fe_2O_3$ and ZnO combined, not greater than 0.2 wt. % of $TiO_2$, $K_2O$, $Na_2O$, $Y_2O_3$, $P_2O_5$, $Fe_2O_3$ and ZnO combined, not greater than 0.1 wt. % of $TiO_2$, $K_2O$, $Na_2O$, $Y_2O_3$, $P_2O_5$, $Fe_2O_3$ and ZnO combined or the zircon batch may be essentially free of $TiO_2$, $K_2O$, $Na_2O$, $Y_2O_3$, $P_2O_5$, $Fe_2O_3$ and ZnO combined.

In other embodiments, the zircon batch may have a minimal content of certain metal oxides, such as, for example, rare earth oxides, alkali oxides, and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali oxides may include any oxide compositions that include group one metals, (i.e., lithium, sodium, potassium, rubidium, cesium, and francium), for example, lithium oxide, potassium oxide and cesium oxide. A zircon batch that has a minimal content of any oxide noted above, for example, rare earth oxides, alkali oxides and any transition metal oxide not expressly disclosed herein, may have a content of that oxide of not greater than 1 wt. %, such as, not greater than 0.7 wt. %, not greater than 0.5 wt. % or even not greater than 0.2 wt. % of the total weight of the zircon batch.

In an embodiment, forming the sintered zircon body can include forming a particular crystalline phase within the zircon body. In another embodiment, forming the sintered zircon body can include forming particular contents of crystalline phases, particular ratios between contents of crystalline phases, or any combination thereof. Controlling formation of particular crystalline phases and/or contents and/or ratios thereof can facilitate formation of refractory object having improved performance and/or properties.

In an embodiment, the zircon body can include a first crystalline phase including an alkaline earth element. In particular aspects, the alkaline earth element can include at least one of Ca, Mg, Sr, and Ba. More particularly, the alkaline earth metal element can include Ca, Sr, Ba, or any combination thereof. In further aspects, the first crystalline phase can be an alkaline earth-Al—Si rich crystalline phase. In another particular aspect, the first crystalline phase can include alkaline earth oxide containing component including, for example, CaO, MgO, SrO, BaO, or any combination thereof. In another embodiment, the first crystalline phase can further include Al, Si, or a combination thereof. Al and/or Si may be present in an alumina containing component, such as specie of aluminosilicate. A particular example can include alkaline earth containing aluminosilicate. In further embodiments, the zircon body can include a first crystalline phase including calcium aluminosilicate, barium aluminosilicate, magnesium aluminosilicate, strontium aluminosilicate, or a combination thereof. In particular aspects, the first crystalline phase can include calcium aluminosilicate, barium aluminosilicate, strontium aluminosilicate, or a combination thereof. More particularly, in embodiments, the first crystalline phase may consist essentially of one or more of calcium aluminosilicate, barium aluminosilicate, magnesium aluminosilicate, and strontium aluminosilicate. Even more particularly, the first crystalline phase may consist essentially of one or more of calcium aluminosilicate, barium aluminosilicate, and strontium aluminosilicate. In certain instances, the first crystalline phase may consist essentially of calcium aluminosilicate.

In an embodiment, the zircon body can include the first crystalline phase including a feldspar-type crystal. In a particular aspect, the first crystalline phase may consist essentially of feldspar-type crystals. In another particular aspect, the feldspar-type crystals can include gehlenite ($Ca_2Al_2SiO_7$), prehnite ($Ca_2Al[AlSiO_7]$ and $Ca_2Al(AlSi_3O_{10})(OH)_2$), anorthite ($CaAl_2Si_2O_8$), celsian ($BaAl_2Si_2O_8$), or any combination thereof. In a more particular aspect, the first crystalline phase may consist essentially of one or more of gehlenite ($Ca_2Al_2SiO_7$), prehnite ($Ca_2Al[AlSiO_7]$ and $Ca_2Al(AlSi_3O_{10})(OH)_2$), anorthite ($CaAl_2Si_2O_8$), and celsian ($BaAl_2Si_2O_8$).

In an embodiment, the zircon body can include a particular content of the first crystalline phase that can facilitate formation of the refractory object having improved properties and/or performance. In an aspect, the zircon body can include at least 0.01 wt. % of a first crystalline phase including an alkaline earth metal for a total weight of the zircon body, at least 0.05 wt. %, at least 0.1 wt. % at least 0.2 wt. %, at least 0.3 wt. % at least 0.4 wt. %, at least 0.5 wt. %, at least 0.6 wt. %, at least 0.7 wt. %, at least 0.8 wt.

%, at least 0.9 wt. %, at least 1 wt. %, at least 2 wt. %, or at least 3 wt. %, at least 4 wt. %, at least 5 wt. %, or at least 6 wt. % for a total weight of the zircon body. In another aspect, the zircon body may include not greater than 20 wt. % of a first crystalline phase including an alkaline earth metal for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, not greater than 2 wt. %, or not greater than 1 wt. % for the total weight of the zircon body. Moreover, the zircon body can include the first crystalline phase in a content that may be any value in a range including any of the minimum and maximum percentages noted herein. It can be further appreciated that the content of the first crystalline phase can be in a range including any of the minimum and maximum percentages noted herein. The contents of the crystalline phases can be determined by X-ray diffraction analysis.

In an embodiment, the zircon body can include a second crystalline phase including tantalum, iron, titanium, or any combination thereof. In an aspect, the second crystalline phase can be a tantalum-iron-titania rich crystalline phase. In other aspects, the second crystalline phase can include tapiolite-type crystals. In another embodiment, the zircon body can include a particular content of the second crystalline phase to facilitate formation of the refractory object having improved properties and/or performance. In an aspect, the zircon body can include at least 0.01 wt. % of the second crystalline phase for a total weight of the zircon body, at least 0.05 wt. %, at least 0.1 wt. % at least 0.2 wt. %, at least 0.3 wt. % at least 0.4 wt. %, at least 0.5 wt. %, at least 0.6 wt. %, at least 0.7 wt. %, at least 0.8 wt. %, at least 0.9 wt. %, at least 1 wt. %, at least 1.5 wt. %, at least 2 wt. %, at least 2.5 wt. %, at least 3 wt. %, at least 3.5 wt. %, at least 4 wt. %, at least 4.5 wt. %, or at least 5 wt. % for a total weight of the zircon body. In another aspect, the zircon body may include not greater than 20 wt. % of the second crystalline phase for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, or not greater than 2 wt. % for the total weight of the zircon body. Moreover, the zircon body can include the second crystalline phase in a content that may be any value in a range including any of the minimum and maximum percentages noted herein. It can be further appreciated that the content of the second crystalline phase can be in a range including any of the minimum and maximum percentages noted herein.

In an embodiment, the zircon body can include an amorphous phase. Amorphous phase may be referred to as glass phase in this disclosure. In an aspect, the amorphous phase can include Si, Al, Ta, an alkaline earth metal element, or any combination thereof. In another aspect, the amorphous phase may include a particular content for elements present in the amorphous phase. For instance, the zircon body can include an amorphous phase including Si in a range from 40 wt. % to 60 wt. % for a total weight of the amorphous phase or in a range from 48 wt. % to 58 wt. %. The amorphous phase may also include Al in a content from 10 wt. % to 30 wt. % for the total weight of the amorphous phase or in a range from 15 wt. % to 25 wt. %. In particular instances, the amorphous phase can include an alkaline earth metal element in a content in a range from 0.5 wt. % to 15 wt. % for the total weight of the amorphous phase or in a range from 2 wt. % to 9 wt. %. The alkaline earth element can include Ca, Ba, Mg, Sr, or any combination thereof. The amorphous phase may further include Ta in a content in a range from 0.3 wt. % to 12 wt. % for the total weight of the amorphous phase or in a range from 1 wt. % to 7 wt. %. In particular examples, the amorphous phase can include alumina, silica, titania, alkaline earth oxide, or any combination thereof. In a further embodiment, the amorphous phase may be distributed substantially uniformly to the zircon body. In a further aspect, the amorphous phase may include impurities that come from the raw materials, including, for example, P, Na, K, Fe, the like, or any combination thereof.

In a further embodiment, the zircon body can include a particular content of the amorphous phase that can facilitate formation of the refractory object with improved properties and/or performance. For example, the zircon body can include at least 0.5 wt. % of the amorphous phase for a total weight of the zircon body, such as at least 0.8 wt. %, at least 1 wt. % at least 1.5 wt. %, at least 1.8 wt. % at least 2 wt. %, at least 2.5 wt. %, at least 3 wt. %, at least 4 wt. %, or at least 5 wt. % for a total weight of the zircon body. In another example the zircon body may include not greater than 20 wt. % of the amorphous phase for a total weight of the zircon body, such as not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, or not greater than 2 wt. % for the total weight of the zircon body. Moreover, the zircon body can include the amorphous phase in a content that may be any value in a range including any of the minimum and maximum percentages noted herein. It can be further appreciated that the content of the amorphous phase can be in a range including any of the minimum and maximum percentages noted herein. The content of the amorphous phase may be determined using the formula $C_G = C_{AEB}/C_{AEG}$. $C_G$ represents the content of amorphous phase relative to the total weight of the zircon body. $C_{AEG}$ represents the total content of alkaline earth oxide within the amorphous phase identified by microprobe analysis, and $C_{AEB}$ represents the total content of alkaline earth oxide within the zircon body determined by bulk ICP analysis performed on crushed zircon body.

In an embodiment, the first crystalline phase, the second crystalline phase, or both can be contained within the amorphous phase.

In an embodiment, the zircon body can include a third crystalline phase including Al and Si. In a further embodiment, the third crystalline phase may include an aluminum silicate species. For example, the zircon body can include a third crystalline phase including mullite ($3Al_2O_3 \cdot 2SiO_2$, $2Al_2O_3 \cdot SiO_2$, or both), silimanite ($Al_2O(SiO_4)$), andalusite ($Al_2SiO_5$), or any combination thereof. In a particular example, mullite may be the primary component of the third crystalline phase. In another particular example, the third crystalline phase may include mullite, silimanite, and andalusite. In still another particular example, the third crystalline phase consists essentially of mullite. In another embodiment, the zircon body can include a particular content of the third crystalline phase that can facilitate formation of the refractory object having improved properties and/or performance. For example, the zircon body can include at least 0.01 wt. % of the third crystalline phase for a total weight of the zircon body, such as at least 0.05 wt. %, at least 0.1 wt. % at least 0.2 wt. %, at least 0.3 wt. % at least 0.4 wt. %, at least 0.5 wt. %, at least 0.6 wt. %, at least 0.7 wt. %, at least 0.8 wt. %, at least 0.9 wt. %, at least 1 wt. %, at least 1.5 wt.

%, at least 2 wt. %, at least 2.5 wt. %, at least 3 wt. %, at least 3.5 wt. %, at least 3.7 wt. %, at least 4 wt. %, at least 4.5 wt. %, or at least 5 wt. % of the third crystalline phase for a total weight of the zircon body. In another example, the zircon body may include not greater than 20 wt. % of the third crystalline phase for a total weight of the zircon body, such as not greater than 18 wt. %, not greater than 16 wt. %, not greater than 14 wt. %, not greater than 12 wt. %, not greater than 10 wt. %, not greater than 8 wt. %, not greater than 7.5 wt. %, not greater than 7.2 wt. %, not greater than 6 wt. %, not greater than 5 wt. %, or not greater than 4 wt. % for the total weight of the zircon body. Moreover, the zircon body can include the third crystalline phase in a content that may be any value in a range including any of the minimum and maximum percentages noted herein. It can be further appreciated that the content of the third crystalline phase can be in a range including any of the minimum and maximum percentages noted herein. The third crystalline phase may be referred to mullite crystalline phase in this disclosure.

In an embodiment, the zircon body can include a fourth crystalline phase including zircon. The fourth crystalline phase may be referred to as zircon crystalline phase in this disclosure. In particular instances, the fourth crystalline phase can consist essentially of zircon. In another embodiment, the zircon body can include a particular content of the fourth crystalline phase that can facilitate formation of the refractory object having improved properties and/or performance. For example, the zircon body can include at least 50 wt. % of the fourth crystalline phase for a total weight of the zircon body, such as at least 60 wt. %, at least 70 wt. % at least 75 wt. %, at least 80 wt. % at least 85 wt. %, at least 87.5 wt. %, at least 90 wt. %, or at least 93 wt. % for a total weight of the zircon body. In another instance, the zircon body may include not greater than 99.5 wt. % of the fourth crystalline phase for a total weight of the zircon body, not greater than 99 wt. %, not greater than 98 wt. %, not greater than 97 wt. %, not greater than 96 wt. %, not greater than 95 wt. %, or not greater than 94 wt. % for the total weight of the zircon body. Moreover, the zircon body can include the fourth crystalline phase in a content that may be any value in a range including any of the minimum and maximum percentages noted herein. It can be further appreciated that the content of the fourth crystalline phase can be in a range including any of the minimum and maximum percentages noted herein.

In a further embodiment, the zircon body can include a fifth crystalline phase including zirconia. In particular embodiments, the fifth crystalline phase can consist essentially of zirconia. In another embodiment, the zircon body can include a particular content of the fourth crystalline phase that can facilitate formation of the refractory object having improved properties and/or performance. For example, the zircon body comprises at least 0.01 wt. % of the fifth crystalline phase including for a total weight of the zircon body, at least 0.03 wt. %, at least 0.05 wt. %, at least 0.1 wt. %, at least 0.2 wt. %, at least 0.3 wt. % at least 0.4 wt. %, at least 0.5 wt. %, at least 0.6 wt. %, at least 0.7 wt. %, at least 0.8 wt. %, at least 0.9 wt. %, at least 1 wt. %, at least 1.3 wt. %, at least 1.5 wt. %, or at least 1.7 wt. % of the fifth crystalline phase for a total weight of the zircon body. In another example, the zircon body may include not greater than 15 wt. % of the fifth crystalline phase for a total weight of the zircon body, such as not greater than 12 wt. %, not greater than 10 wt. %, not greater than 9 wt. %, not greater than 8.7 wt. %, not greater than 8.5 wt. %, not greater than 8.3 wt. %, not greater than 8 wt. %, not greater than 7 wt. %, not greater than 6 wt. %, not greater than 5 wt. %, not greater than 4 wt. %, not greater than 3 wt. %, or not greater than 2 wt. % of the fifth crystalline phase for the total weight of the zircon body. Moreover, the zircon body can include the fifth crystalline phase in a content that may be any value in a range including any of the minimum and maximum percentages noted herein. It can be further appreciated that the content of the fifth crystalline phase can be in a range including any of the minimum and maximum percentages noted herein. In an embodiment the majority or essentially all of the zirconia may be present in the crystalline phase, i.e., the fifth crystalline phase. The fifth crystalline phase may be referred to as zirconia crystalline phase in this disclosure.

In another embodiment, the zircon body formed according to embodiments described herein may include a particular content of zirconia. For example, the zircon body may include a content of zirconia of at least 0.01 wt. % for a total weight of the zircon body, at least 0.02 wt. %, at least 0.04 wt. %, at least 0.06 wt. %, at least 0.08 wt. %, at least 0.1 wt. %, at least 0.2 wt. %, at least 0.3 wt. % at least 0.4 wt. %, at least 0.5 wt. %, at least 0.6 wt. %, at least 0.7 wt. %, at least 0.8 wt. %, at least 0.9 wt. %, or at least 1 wt. % for a total weight of the zircon body. In another example, the zircon body may include not greater than 15 wt. % of zirconia for a total weight of the zircon body, such as not greater than 12 wt. %, not greater than 10 wt. %, not greater than 9 wt. %, not greater than 8 wt. %, not greater than 7 wt. %, not greater than 6 wt. %, not greater than 5 wt. %, not greater than 4 wt. %, not greater than 3 wt. %, or not greater than 2 wt. % for the total weight of the zircon body. Moreover, the zircon body can include zirconia in a content that may be any value in a range including any of the minimum and maximum percentages noted herein. It can be further appreciated that the content of zirconia can be in a range including any of the minimum and maximum percentages noted herein.

Figure 4:
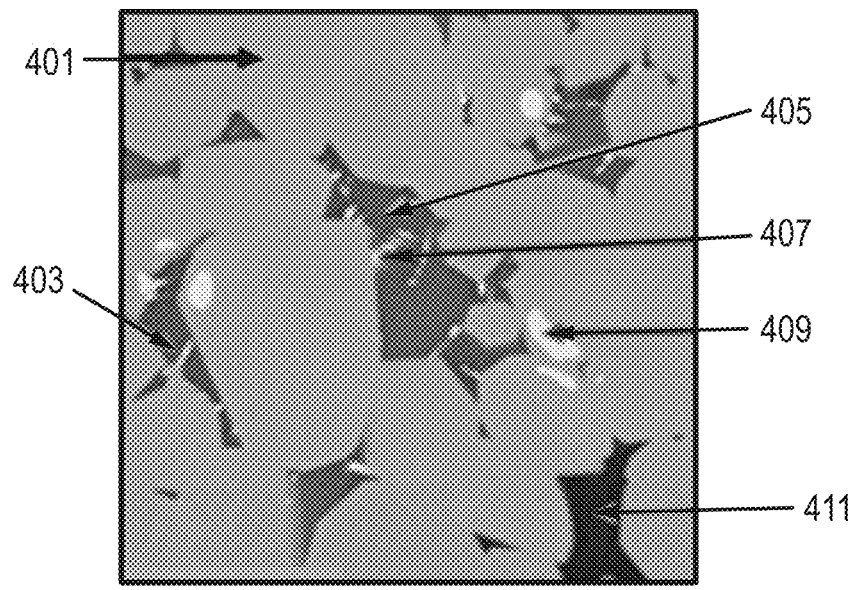
FIGS. 4 and 5 include images of the microstructure of a zircon body of a refractory object formed according to embodiments described herein.
Figure 5:
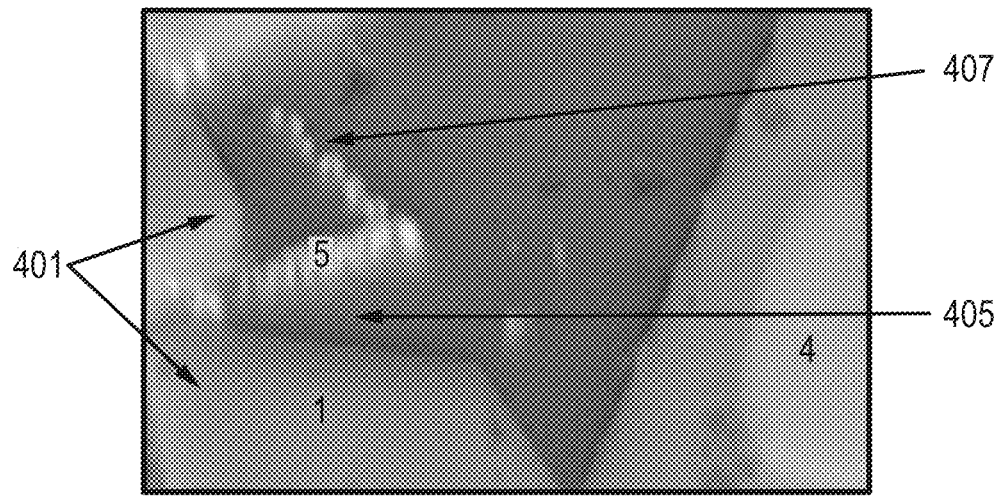

Referring to FIGS. 4 and 5, images of the microstructure of the zircon body of a refractory object formed according to embodiments described herein are included. When analyzed using electron backscatter diffraction, the zircon body may be shown to include zircon crystalline phase 401, a Ta—Fe—Ti rich crystalline phase 403, a glass phase 405, a Ca—Al—Si rich crystalline phase 407 contained within the glass phase 405, a zirconia crystalline phase 409, and a mullite crystalline phase 411. When further analyzed using electron backscatter diffraction, the Ca—Al—Si rich phase 407 includes gehlenite ($Ca_2Al_2SiO_7$) or its hydrated form, prehnite ($Ca_2Al_2Si_3O_{12}H_2$).

In an embodiment, the zircon body can include a particular ratio of the contents of crystalline phases that can facilitate formation of refractory object having improved properties and/or performance.

In an embodiment, the zircon body can include a particular ratio of $C_{C2}/C_{C1}$, wherein $C_{C2}$ is the content of the second crystalline phase in wt. % for a total weight of the zircon body and $C_{C1}$ is the content of the first crystalline phase in wt. % for the total weight of the zircon body. For example, the ratio of $C_{C2}/C_{C1}$ can be at least 0.01, at least 0.1, at least 0.5, at least 1, at least 2, at least 3, at least 4, or at least 5. In another example, the ratio of $C_{C2}/C_{C1}$ may be not greater than 100, not greater than 90, not greater than 80, not greater than 70, not greater than 60, not greater than 50, not greater than 40, not greater than 30, not greater than 20, not greater than 10, not greater than 9, not greater than 8, not greater than 7, not greater than 6, or not greater than 5. Moreover, the ratio of $C_{C3}/C_{C1}$ may be in a range including any of the minimum and maximum values noted herein. It will be further appreciated the ratio of $C_{C3}/C_{C1}$ may be any value in a range including any of the minimum and maximum values noted herein.

In an embodiment, the zircon body can include a particular ratio of $C_{C3}/C_{C1}$, wherein $C_{C3}$ is a content of the third crystalline phase in wt. % for a total weight of the zircon body and $C_{C1}$ is a content of the first crystalline phase in wt. % for the total weight of the zircon body. For example, the ratio of $C_{C3}/C_{C1}$ is at least 0.01, at least 0.05, at least 0.1, at least 0.5, at least 1, at least 1.5, at least 2, at least 2.5, at least 3, at least 3.5, at least 4, at least 4.5, at least 5, at least 5, at least 5.5, at least 6, at least 6.5, at least 7, at least 7.5, at least 8, at least 8.5, at least 9, at least 9.5, or at least 10. In another example, the ratio of $C_{C3}/C_{C1}$ may be not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, not greater than 30, not greater than 28, not greater than 25, not greater than 22, not greater than 20, not greater than 18, not greater than 15, not greater than 12, or not greater than 10. Moreover, the ratio of $C_{C3}/C_{C1}$ may be in a range including any of the minimum and maximum values noted herein. It will be further appreciated the ratio of $C_{C3}/C_{C1}$ may be any value in a range including any of the minimum and maximum values noted herein.

In an embodiment, the zircon body can include a particular ratio of $C_A/C_{C1}$, wherein $C_A$ is the content of the amorphous phase in wt. % for a total weight of the zircon body and $C_{C1}$ is the content of the first crystalline phase in wt. % for the total weight of the zircon body. In an example, the ratio of $C_A/C_{C1}$ can be at least 1, at least 1.5, at least 2, at least 2.5, at least 3, at least 3.5, at least 4, at least 4.5, at least 5, at least 5, at least 5.5, at least 6, at least 6.5, at least 7, at least 7.5, at least 8, at least 8.5, at least 9, at least 9.5, at least 10, at least 11, at least 12, at least 13, at least 14, at least 15, at least 16, at least 17, at least 18, at least 19, at least 20, at least 22, at least 24, at least 26, at least 28, at least 30, at least 32, at least 35, at least 38, at least 40, at least 50, at least 60, or at least 70. In another instance, the ratio of $C_A/C_{C1}$ may be not greater than 500, not greater than 400, not greater than 300, not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, or not greater than 30. Moreover, the ratio of $C_A/C_{C1}$ may be in a range including any of the minimum and maximum values noted herein. It will be further appreciated the ratio of $C_A/C_{C1}$ may be any value in a range including any of the minimum and maximum values noted herein.

In an embodiment, the zircon body can include a particular ratio of $C_{C4}/C_{C1}$, wherein $C_{C4}$ is the content of the fourth crystalline phase in wt. % for a total weight of the zircon body and $C_{C1}$ is the content of the first crystalline phase in wt. % for the total weight of the zircon body. In an example, the ratio of $C_{C4}/C_{C1}$ can be at least 10, at least 15, at least 20, at least 25, at least 30, at least 35, at least 40, at least 45, at least 50, at least 55, at least 60, at least 65, at least 70, at least 75, at least 80, at least 85, or at least 90. In another example, the ratio of $C_{C4}/C_{C1}$ may be not greater than 9300, not greater than 7000, not greater than 5000, not greater than 3000, not greater than 1000, not greater than 800, not greater than 600, not greater than 500, not greater than 400, not greater than 300, not greater than 200, not greater than 100, not greater than 90, not greater than 80, not greater than 70, not greater than 60, not greater than 50, not greater than 40, not greater than 30, not greater than 20, or not greater than 10. Moreover, the ratio of $C_4/C_{C1}$ may be in a range including any of the minimum and maximum values noted herein. It will be further appreciated the ratio of $C_4/C_{C1}$ may be any value in a range including any of the minimum and maximum values noted herein.

In an embodiment, the zircon body can include a particular ratio of $C_{C5}/C_{C1}$, wherein $C_{C5}$ is the content of the fifth crystalline phase in wt. % for a total weight of the zircon body and $C_{C1}$ is the content of the first crystalline phase in wt. % for the total weight of the zircon body. In an example, the ratio of $C_{C5}/C_{C1}$ can be at least 0.01, at least 0.1, at least 0.5, at least 1, at least 2, at least 3, at least 4, or at least 5. In another instance, the ratio of $C_{C5}/C_{C1}$ may be not greater than 100, not greater than 90, not greater than 80, not greater than 70, not greater than 60, not greater than 50, not greater than 40, not greater than 30, not greater than 20, not greater than 10, not greater than 9, not greater than 8, not greater than 7, not greater than 6, not greater than 5, not greater than 4, or not greater than 3. Moreover, the ratio of $C_5/C_{C1}$ may be in a range including any of the minimum and maximum values noted herein. It will be further appreciated the ratio of $C_5/C_{C1}$ may be any value in a range including any of the minimum and maximum values noted herein.

In another embodiment, the zircon body formed according to embodiments described herein may include a particular content of zircon. For example, the zircon body may include a content of zircon of at least 50 wt. % for a total weight of the zircon body, such as, at least 52 wt. %, at least 53 wt. %, at least 54 wt. %, at least 55 wt. %, at least 56 wt. %, at least 57 wt. %, at least 57.5 wt. %, at least 58 wt. %, at least 58.5 wt. %, at least 59 wt. %, at least 59.5 wt. %, at least 60 wt. %, at least 60.5 wt. %, at least 61 wt. %, at least 61.5, wt. %, at least 62 wt. %, at least 62.5 wt. %, at least 63 wt. %, at least 62.5 wt. %, at least 64 wt. %, at least 64.5 wt. %, at least five wt. %, at least 65.5 wt. %, at least 66 wt. %, at least 66.5 wt. %, at least 67 wt. %, at least 68 wt. %, at least 69 wt. %, at least 70 wt. %, at least 75 wt. %, at least 80 wt. %, at least 85 wt. %, at least 90 wt. % or even at least 93 wt. %. In another example, the zircon body may include a content of zircon of not greater than 99 wt. % for total weight of the zircon body, such as, not greater than 95 wt. %, not greater than 90 wt. %, not greater than 85 wt. %, not greater than 80 wt. %, not greater than 75 wt. %, not greater than 70 wt. %, not greater than 69 wt. %, not greater than 68 wt. %, not greater than 67 wt. %, not greater than 66.5 wt. %, not greater than 66 wt. %, not greater than 66.5 wt. %, not greater than 65 wt. %, not greater than 64.5 wt. %, not greater than 64 wt. %, not greater than 63.5 wt. %, not greater than 53 wt. %, not greater than 62.5 wt. %, not greater than 62 wt. %, not greater than 61.5 wt. %, not greater than 61 wt. %, not greater than 60.5 wt. %, not greater than 60 wt. %, not greater than 59.5 wt. %, not greater than 59 wt. %, not greater than 58 wt. %, not greater than 58 wt. %, at least 57 wt. %, not greater than 57 wt. %, not greater than 56 wt. %, not greater than 55 wt. %, not greater than 54 wt. %, not greater than 53 wt. %, not greater than 52 wt. % or even not greater than 51 wt. %. It will be appreciated that the content of zircon in wt. % for the total weight of the zircon body may be any value between any of the minimum and maximum values noted above. It will be further appreciated that the content of zircon in wt. % for the total weigh of the zircon body may be within a range between any of the minimum and maximum values noted above. In a further embodiment, the zircon body can include zircon such that the majority or essentially all of the zircon is present in the fourth crystalline phase.

According to another particular embodiment, the zircon body may include a particular content of $Al_2O_3$ containing component. For example, the zircon body may include not greater than 10 wt. % of the $Al_2O_3$ containing component for a total weight of the zircon body, such as, not greater than 9 wt. % of the $Al_2O_3$ containing component, not greater than 8 wt. % of the $Al_2O_3$ containing component, not greater than 7 wt. % of the $Al_2O_3$ containing component, not greater than 6.8 wt. % of the $Al_2O_3$ containing component, not greater than 6.5 wt. % of the $Al_2O_3$ containing component, not greater than 6.2 wt. % of the $Al_2O_3$ containing component, not greater than 6 wt. % of the $Al_2O_3$ containing component, not greater than 5.8 wt. % of the $Al_2O_3$ containing component, not greater than 5.6 wt. % of the $Al_2O_3$ containing component, not greater than 5.3 wt. % of the $Al_2O_3$ containing component, not greater than 5 wt. % of the $Al_2O_3$ containing component, not greater than 4.8 wt. % of the $Al_2O_3$ containing component, or not greater than 4.6 wt. % of the $Al_2O_3$ containing component. In a further example, the zircon body may include at least 0.2 wt. % of the $Al_2O_3$ containing component for a total weight of the zircon body, such as, at least 0.5 wt. % of the $Al_2O_3$ containing component, at least 1.0 wt. % of the $Al_2O_3$ containing component, at least 1.5 wt. % of the $Al_2O_3$ containing component, at least 1.7 wt. % of the $Al_2O_3$ containing component, at least 2.0 wt. % of the $Al_2O_3$ containing component, at least 2.5 wt. % of the $Al_2O_3$ containing component, at least 3 wt. % of the $Al_2O_3$ containing component, at least 3.5 wt. % of the $Al_2O_3$ containing component, at least 3.8 wt. % of the $Al_2O_3$ containing component, at least 4 wt. % of the $Al_2O_3$ containing component, at least 4.2 wt. % of the $Al_2O_3$ containing component, at least 4.4 wt. % of the $Al_2O_3$ containing component, or even at least 4.5 wt. % of the $Al_2O_3$ containing component. It will be appreciated that the content of $Al_2O_3$ containing component in wt. % for the total weight of the zircon body may be any value between any of the minimum and maximum values noted above. It will be further appreciated that the content of $Al_2O_3$ containing component in wt. % for the total weigh of the zircon body may be within a range between any of the minimum and maximum values noted above.

According to another particular embodiment, the zircon body may include a particular content of $Al_2O_3$. For example, the zircon body may include not greater than 10 wt. % of the $Al_2O_3$ for a total weight of the zircon body, such as, not greater than 9 wt. % of the $Al_2O_3$, not greater than 8 wt. % of the $Al_2O_3$, not greater than 7 wt. % of the $Al_2O_3$, not greater than 6.5 wt. % of the $Al_2O_3$, not greater than 6 wt. % of the $Al_2O_3$, not greater than 5.8 wt. % of the $Al_2O_3$, not greater than 5.6 wt. % of the $Al_2O_3$, not greater than 5.4 wt. % of the $Al_2O_3$, not greater than 5.3 wt. % of the $Al_2O_3$ not greater than 5.1 wt. % of the $Al_2O_3$, not greater than 5 wt. % of the $Al_2O_3$, not greater than 4.9 wt. % of the $Al_2O_3$, not greater than 4.8 wt. % of the $Al_2O_3$, not greater than 4.7 wt. % of the $Al_2O_3$, not greater than 4.6 wt. % of the $Al_2O_3$, or even not greater than 4.5 wt. % of the $Al_2O_3$. According to still another embodiment, the zircon body may include at least 0.2 wt. % of the $Al_2O_3$ for a total weight of the zircon body, such as, at least 0.5 wt. % of the $Al_2O_3$, at least 1.0 wt. % of the $Al_2O_3$, at least 1.5 wt. % of the $Al_2O_3$, at least 2 wt. % of the $Al_2O_3$, at least 2.5 wt. % of the $Al_2O_3$, at least 3 wt. % of the $Al_2O_3$, at least 3.4 wt. % of the $Al_2O_3$, at least 3.7 wt. % of the $Al_2O_3$, at least 4 wt. % of the $Al_2O_3$, at least 4.1 wt. % of the $Al_2O_3$, at least 4.2 wt. % of the $Al_2O_3$, or even at least 4.3 wt. % of the $Al_2O_3$. It will be appreciated that the content of $Al_2O_3$ in wt. % for the total weight of the zircon body may be any value between any of the minimum and maximum values noted above. It will be further appreciated that the content of $Al_2O_3$ in wt. % for the total weigh of the zircon body may be within a range between any of the minimum and maximum values noted above.

According to a particular embodiment, the $Al_2O_3$ containing component in the zircon body may include alumina. According to still another embodiment, the $Al_2O_3$ containing component in the zircon body may include a particular content of alumina. For example, the $Al_2O_3$ containing component in the zircon body may include at least 1 wt. % alumina for a total weight of the $Al_2O_3$ containing component, such as, at least 2 wt. % alumina, at least 5 wt. % alumina, at least 10 wt. % alumina, at least 15 wt. % alumina, at least 20 wt. % alumina, at least 25 wt. % alumina, at least 30 wt. % alumina, at least 35 wt. % alumina, at least 40 wt. % alumina, at least 45 wt. % alumina, at least 50 wt. % alumina, at least 55 wt. % alumina, at least 60 wt. % alumina, at least 65 wt. % alumina, at least 70 wt. % alumina, at least 75 wt. % alumina, at least 80 wt. % alumina, at least 85 wt. % alumina, at least 90 wt. % alumina, at least 95 wt. % alumina or the $Al_2O_3$ containing component may even consists essentially of alumina. It will be appreciated that content of alumina in the $Al_2O_3$ containing component in the zircon body may be any value or at least any value between any of the values noted above.

According to a particular embodiment, the $Al_2O_3$ containing component in the zircon body may include mullite. According to still another embodiment, the $Al_2O_3$ containing component in the zircon body may include a particular content of mullite. For example, the $Al_2O_3$ containing component in the zircon body may include at least 1 wt. % mullite for a total weight of the $Al_2O_3$ containing component, such as, at least 2 wt. % mullite, at least 5 wt. % mullite, at least 10 wt. % mullite, at least 15 wt. % mullite, at least 20 wt. % mullite, at least 25 wt. % mullite, at least 30 wt. % mullite, at least 35 wt. % mullite, at least 40 wt. % mullite, at least 45 wt. % mullite, at least 50 wt. % mullite, at least 55 wt. % mullite, at least 60 wt. % mullite, at least 65 wt. % mullite, at least 70 wt. % mullite, at least 75 wt. % mullite, at least 80 wt. % mullite, at least 85 wt. % mullite, at least 90 wt. % mullite, at least 95 wt. % mullite or the $Al_2O_3$ containing component may even consists essentially of mullite. It will be appreciated that content of mullite in the $Al_2O_3$ containing component in the zircon body may be any value or at least any value between any of the values noted above.

According to still another embodiment, the mullite in the zircon body may include $Al_6Si_2O_{13}$. According to still another embodiment, the mullite in the zircon body may include a particular content of $Al_6Si_2O_{13}$. For example, the mullite in the zircon body may include at least 1 wt. % $Al_6Si_2O_{13}$ for a total weight of the mullite, such as, at least 2 wt. % $Al_6Si_2O_{13}$, at least 5 wt. % $Al_6Si_2O_{13}$, at least 10 wt. % $Al_6Si_2O_{13}$, at least 15 wt. % $Al_6Si_2O_{13}$, at least 20 wt. % $Al_6Si_2O_{13}$, at least 25 wt. % $Al_6Si_2O_{13}$, at least 30 wt. % $Al_6Si_2O_{13}$, at least 35 wt. % $Al_6Si_2O_{13}$, at least 40 wt. % $Al_6Si_2O_{13}$, at least 45 wt. % $Al_6Si_2O_{13}$, at least 50 wt. % $Al_6Si_2O_{13}$, at least 55 wt. % $Al_6Si_2O_{13}$, at least 60 wt. % $Al_6Si_2O_{13}$, at least 65 wt. % $Al_6Si_2O_{13}$, at least 70 wt. % $Al_6Si_2O_{13}$, at least 75 wt. % $Al_6Si_2O_{13}$, at least 80 wt. % $Al_6Si_2O_{13}$, at least 85 wt. % $Al_6Si_2O_{13}$, at least 90 wt. % $Al_6Si_2O_{13}$, at least 95 wt. % $Al_6Si_2O_{13}$ or the mullite in the zircon body may even consists essentially of $Al_6Si_2O_{13}$. It will be appreciated that content of $Al_6Si_2O_{13}$ in mullite in the zircon body may be any value or at least any value between any of the values noted above.

According to yet another particular embodiment, the $Al_2O_3$ containing component may include an aluminosilicate species. According to still another embodiment, the aluminosilicate species may include at least one of a non-stoichiometric mullite, stoichiometric mullite, and a combination thereof. According to still another embodiment, the $Al_2O_3$ containing component may include a combination of an aluminate species and an aluminosilicate species. According to yet another embodiment, the aluminosilicate species is present in a greater content than the aluminate species.

According to another particular embodiment, the zircon body may include a particular content of mullite. In an aspect, the zircon body can include at least 0.5 wt. % of mullite for a total weight of the zircon body, such as at least 1 wt. %, at least 1.2 wt. %, at least 1.5 wt. %, at least 1.8 wt. %, at least 2 wt. %, at least 2.2 wt. %, at least 2.5 wt. %, at least 2.7 wt. %, at least 3 wt. %, at least 3.2 wt. %, at least 3.5 wt. %, at least 3.7 wt. %, at least 4.1 wt. % of mullite for the total weight of the zircon body. In another aspect, the zircon body may include not greater than 10 wt. % of mullite for a total weight of the zircon body, not greater than 9 wt. %, not greater than 8.6 wt. %, not greater than 8.2 wt. %, not greater than 8 wt. %, not greater than 7.6 wt. %, not greater than 7.4 wt. %, not greater than 7.2 wt. %, not greater than 7 wt. %, not greater than 6 wt. %, not greater than 5 wt. %, not greater than 4 wt. %, not greater than 3.8 wt. %, not greater than 3.5 wt. %, not greater than 3.2 wt. %, or not greater than 3 wt. %. It will be appreciated that the content of mullite in wt. % for the total weight of the zircon body may be any value between any of the minimum and maximum values noted above. It will be further appreciated that the content of mullite in wt. % for the total weigh of the zircon body may be within a range between any of the minimum and maximum values noted above. For example, the zircon body may include a content of mullite in a range including at least 0.5 wt. % and not greater than 10 wt. % or in a range including at least 3 wt. % and not greater than 8 wt. % for the total weight of the zircon body.

In an embodiment, the zircon body can include a particular ratio of $C_{ZN}/C_M$ that can facilitate formation of the refractory body having improved properties and/or performance, wherein $C_{ZN}$ is the content of zircon in wt. % for a total weight of the zircon body and CM is the content of mullite in wt. % for the total weight of the zircon body. In an example, the ratio of $C_{ZN}/C_M$ can be at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, or at least 33. In another example, the ratio of $C_{ZN}/C_M$ may be not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, or not greater than 30. It will be appreciated that the ratio of $C_{ZN}/C_M$ may be any value between any of the minimum and maximum values noted above. It will be further appreciated that the ratio of $C_{ZN}/C_M$ may be within a range between any of the minimum and maximum values noted above.

According to another particular embodiment, the zircon body may include a particular content of a $SiO_2$ component. The $SiO_2$ component may include the combination of $SiO_2$ added to the zircon body as part of the zircon material, $SiO_2$ added to the zircon body as part of the $Al_2O_3$ containing component and the $SiO_2$ added to the zircon body as free silica. Free silica may be defined as $SiO_2$ that is not bonded as part of the crystalline form of the zircon material or the $Al_2O_3$ containing component. For example, the zircon body may include not greater than 34.5 wt. % of a $SiO_2$ component for a total weight of the zircon body, not greater than 33 wt. % of a $SiO_2$ component, not greater than 32.5 wt. % of a $SiO_2$ component, not greater than 32 wt. % of a $SiO_2$ component, not greater than 31.5 wt. % of a $SiO_2$ component, not greater than 30 wt. % of a $SiO_2$ component, not greater than 29.5 wt. % of a $SiO_2$ component, not greater than 29 wt. % of a $SiO_2$ component, not greater than 28.5 wt. % of a $SiO_2$ component, not greater than 28 wt. % of a $SiO_2$ component, not greater than 27.5 wt. % of a $SiO_2$ component, not greater than 27 wt. % of a $SiO_2$ component or even greater than 26.5 wt. % of a $SiO_2$ component. According to still another embodiment, the zircon body may include at least 25.5 wt. % of a $SiO_2$ component for a total weight of the zircon body, at least 26 wt. % of a $SiO_2$ component, at least 26.5 wt. % of a $SiO_2$ component, at least 27 wt. % of a $SiO_2$ component, at least 27.5 wt. % of a $SiO_2$ component, at least 28 wt. % of a $SiO_2$ component, at least 28.5 wt. % of a $SiO_2$ component, at least 29 wt. % of a $SiO_2$ component, at least 29.5 wt. % of a $SiO_2$ component, at least 30 wt. % of a $SiO_2$ component, at least 30.5 wt. % of a $SiO_2$ component, at least 31 wt. % of a $SiO_2$ component, at least 31.5 wt. % of a $SiO_2$ component, at least 32 wt. % of a $SiO_2$ component, at least 32.5 wt. % of a $SiO_2$ component, at least 33 wt. % of a $SiO_2$ component, at least 33.5 wt. % of a $SiO_2$ component, about 34 wt. % of a $SiO_2$ component or even at least 34.5 wt. % of a $SiO_2$ component. It will be appreciated that the content of a $SiO_2$ component in wt. % for the total weight of the zircon body may be any value between any of the minimum and maximum values noted above. It will be further appreciated that the content of a $SiO_2$ component in wt. % for the total weigh of the zircon body may be within a range between any of the minimum and maximum values noted above.

According to still another embodiment, the zircon body may include a particular ratio $C_{SiO2}/C_{AlC}$. $C_{SiO2}$ may represent a content of the $SiO_2$ component in wt. % for a total weight of the zircon body and $C_{AlC}$ may represent a content of $Al_2O_3$ containing component in wt. % for a total weight of the zircon body. For example, the zircon body may have a ratio $C_{SiO2}/C_{AlC}$ of at least 5, such as, at least 8, at least 10, at least 13, at least 15, at least 18, at least 20, at least 23, at least 25, at least 28, at least 30, at least 33, at least 35, at least 38, at least 40, at least 43, at least 45 or even at least 48. According to another embodiment, the zircon body may include a ratio a ratio $C_{SiO2}/C_{AlC}$ of not greater than 50, such as, not greater than 47, not greater than 45, not greater than 42, not greater than 40, not greater than 37, not greater than 35, not greater than 32, not greater than 30, not greater than 27, not greater than 20, not greater than 17, not greater than 12, not greater than 10 or even not greater than 7. It will be appreciated that the ratio $C_{SiO2}/C_{AlC}$ may be any value between any of the minimum and maximum values noted above. It will be further appreciated that the $C_{SiO2}/C_{AlC}$ may be within a range between any of the minimum and maximum values noted above.

According to still another embodiment, the zircon body may include a particular ratio $C_{AlC}/C_{ZN}$. $C_{ALC}$ may represent a content of $Al_2O_3$ containing component in wt. % for a total weight of the zircon body and $C_{ZN}$ may represent a content of zircon in wt. % for a total weight of the body. For example, the zircon body may include a ratio $C_{AlC}/C_{ZN}$ of not greater than 0.08, such as, not greater than 0.075, not greater than 0.07, not greater than 0.065, not greater than 0.06, not greater than 0.055, not greater than 0.05, not greater than 0.045, not greater than 0.04, not greater than 0.035, not greater than 0.030, not greater than 0.025, not greater than 0.02, not greater than 0.015 or even not greater than 0.01. According to still another embodiment, the zircon body may include a ratio of $C_{AlC}/C_{ZN}$ of at least 0.002, such as, at least 0.005, at least 0.01, at least at least 0.02, at least 0.03, at least 0.035, at least 0.04, at least 0.045, at least 0.05, at least 0.055, at least 0.06, at least 0.065, at least 0.07, at least 0.075, at least 0.08, at least 0.085 or even at least 0.09. It will be appreciated that the ratio $C_{AlC}/C_{ZN}$ may be any value between any of the minimum and maximum values noted above. It will be further appreciated that the $C_{AlC}/C_{ZN}$ may be within a range between any of the minimum and maximum values noted above.

According to yet another particular embodiment, the zircon body may include a sintering aid, for example, $Ta_2O_5$ or $TiO_2$. According to still another particular embodiment, the zircon body may include a particular content of a sintering aid. For example, the zircon body may include not greater than 5.0 wt. % of a sintering aid for a total weight of the zircon body, such as, not greater than 4.5 wt. % of a sintering aid, not greater than 4.0 wt. % of a sintering aid, not greater than 3.5 wt. % of a sintering aid, not greater than 3.0 wt. % of a sintering aid, not greater than 2.5 wt. % of a sintering aid, not greater than 2.0 wt. % of a sintering aid, not greater than 1.5 wt. % of a sintering aid, not greater than 1.0 wt. % of a sintering aid, not greater than 0.5 wt. % of a sintering aid, not greater than 0.1 wt. % of a sintering aid or the zircon body may even be essentially free of a sintering aid. According to still another particular embodiment, the zircon body may include at least 0.1 wt. % of a sintering aid a total weight of the zircon body, at least 0.2 wt. % of a sintering aid, at least 0.3 wt. % of a sintering aid, at least 0.4 wt. % of a sintering aid, at least 0.5 wt. % of a sintering aid, at least 0.6 wt. % of a sintering aid, at least 0.7 wt. % of a sintering aid, at least 0.8 wt. % of a sintering aid or even at least 0.9 wt. % of a sintering aid. It will be appreciated that the content of a sintering aid in wt. % for the total weight of the zircon body may be any value between any of the minimum and maximum values noted above. It will be further appreciated that the content of a sintering aid in wt. % for the total weigh of the zircon body may be within a range between any of the minimum and maximum values noted above.

According to yet another embodiment, the zircon body may include a particular ratio $C_{SA}/C_{SiO2}$. $C_{SA}$ represents a content of a sintering aid in wt. % for a total weight of the zircon body and $C_{SiO2}$ represents a content of the $SiO_2$ component in wt. % for a total weight of the zircon body. According to certain embodiments, the zircon body may include a ratio $CB_{SA}/CB_{SiO2}$ of not greater than 0.5, such as, not greater than 0.1, not greater than 0.05, not greater than 0.04, not greater than 0.03 or even not greater than 0.02. According to another particular embodiment, the zircon body may include a ratio $C_{SA}/C_{SiO2}$ of at least 0.001, such as, at least 0.005, at least 0.01, at least 0.02 or even at least 0.03. It will be appreciated that the ratio $C_{SA}/C_{SiO2}$ may be any value between any of the minimum and maximum values noted above. It will be further appreciated that the $C_{SA}/C_{SiO2}$ may be within a range between any of the minimum and maximum values noted above.

According to still another embodiment, the zircon body may include a particular content of $Ta_2O_5$. For example, the zircon body may include at least 0.1 wt. % of $Ta_2O_5$ for a total weight of the zircon body, such as, at least 0.2 wt. % of $Ta_2O_5$, at least 0.3 wt. % of $Ta_2O_5$, at least 0.4 wt. % of $Ta_2O_5$, at least 0.5 wt. % of $Ta_2O_5$, at least 0.6 wt. % of $Ta_2O_5$, at least 0.7 wt. % of $Ta_2O_5$, at least 0.8 wt. % of $Ta_2O_5$ or even at least 0.9 wt. % of $Ta_2O_5$. According to still another embodiment, the zircon body may include not greater than 3.0 wt. % of $Ta_2O_5$ for a total weight of the zircon body, such as, not greater than 2.5 wt. % of $Ta_2O_5$, not greater than 2.0 wt. % of $Ta_2O_5$, not greater than 1.5 wt. % of $Ta_2O_5$, not greater than 1.0 wt. % of $Ta_2O_5$, not greater than 0.5 wt. % of $Ta_2O_5$, not greater than 0.1 wt. % of $Ta_2O_5$ or the zircon body may even be essentially free of $Ta_2O_5$. It will be appreciated that the content of $Ta_2O_5$ in wt. % for the total weight of the zircon body may be any value between any of the minimum and maximum values noted above. It will be further appreciated that the content of $Ta_2O_5$ in wt. % for the total weigh of the zircon body may be within a range between any of the minimum and maximum values noted above.

According to yet another embodiment, the zircon body may include a particular ratio $C_{Ta2O5}/C_{SiO2}$. $C_{Ta2O5}$ represents a content of $Ta_2O_5$ in wt. % for a total weight of the zircon body and $C_{SiO2}$ represents a content of the $SiO_2$ component in wt. % for a total weight of the zircon body. According to certain embodiments, the zircon body may include a ratio $C_{Ta2O5}/C_{SiO2}$ of not greater than 0.5, such as, not greater than 0.1, not greater than 0.05, not greater than 0.04, not greater than 0.03 or even not greater than 0.02. According to another particular embodiment, the zircon body may include a ratio $C_{Ta2O5}/C_{SiO2}$ of at least 0.001, such as, at least 0.005, at least 0.01, at least 0.02 or even at least 0.03. It will be appreciated that the ratio $C_{Ta2O5}/C_{SiO2}$ may be any value between any of the minimum and maximum values noted above. It will be further appreciated that the $C_{Ta2O5}/C_{SiO2}$ may be within a range between any of the minimum and maximum values noted above.

According to still another embodiment, the zircon body may include a particular content of $TiO_2$. For example, the zircon body may include not greater than 5.0 wt. % of $TiO_2$ for a total weight of the zircon body, such as, not greater than 4.5 wt. % of $TiO_2$, not greater than 4.0 wt. % of $TiO_2$, not greater than 3.5 wt. % of $TiO_2$, not greater than 3.0 wt. % of $TiO_2$, not greater than 2.5 wt. % of $TiO_2$, not greater than 2.0 wt. % of $TiO_2$, not greater than 1.5 wt. % of $TiO_2$, not greater than 1.0 wt. % of $TiO_2$, not greater than 0.5 wt. % of $TiO_2$, not greater than 0.1 wt. % of $TiO_2$ or the zircon body may even be essentially free of $TiO_2$. According to still another particular embodiment, the zircon body may include at least 0.1 wt. % of $TiO_2$ for a total weight of the zircon body, at least 0.2 wt. % of $TiO_2$, at least 0.3 wt. % of $TiO_2$, at least 0.4 wt. % of $TiO_2$, at least 0.5 wt. % of $TiO_2$, at least 0.6 wt. % of $TiO_2$, at least 0.7 wt. % of $TiO_2$, at least 0.8 wt. % of $TiO_2$ or even at least 0.9 wt. % of $TiO_2$. It will be appreciated that the content of $TiO_2$ in wt. % for the total weight of the zircon body may be any value between any of the minimum and maximum values noted above. It will be further appreciated that the content of $TiO_2$ in wt. % for the total weigh of the zircon body may be within a range between any of the minimum and maximum values noted above.

According to yet another embodiment, the zircon body may include a particular ratio $C_{TiO2}/C_{SiO2}$. $C_{TiO2}$ represents a content of $TiO_2$ in wt. % for a total weight of the zircon body and $C_{SiO2}$ represents a content of the $SiO_2$ component in wt. % for a total weight of the zircon body. According to certain embodiments, the zircon body may include a ratio $C_{TiO2}/C_{SiO2}$ of not greater than 0.5, such as, not greater than 0.1, not greater than 0.05, not greater than 0.04, not greater than 0.03 or even not greater than 0.02. According to another particular embodiment, the zircon body may include a ratio $C_{TiO2}/C_{SiO2}$ of at least 0.001, such as, at least 0.005, at least 0.01, at least 0.02 or even at least 0.03. It will be appreciated that the ratio $C_{TiO2}/C_{SiO2}$ may be any value between any of the minimum and maximum values noted above. It will be further appreciated that the $C_{TiO2}/C_{SiO2}$ may be within a range between any of the minimum and maximum values noted above.

According to yet another embodiment, the zircon body may include a particular content of $Ta_2O_5$ and $TiO_2$ combined. For example, the zircon body may include not greater than 5.0 wt. % of $Ta_2O_5$ and $TiO_2$ combined for a total weight of the zircon body, such as, not greater than 4.0 wt. % of $Ta_2O_5$ and $TiO_2$ combined, not greater than 3.0 wt. % of $Ta_2O_5$ and $TiO_2$ combined, not greater than 2.0 wt. % of $Ta_2O_5$ and $TiO_2$ combined, not greater than 1.0 wt. % of $Ta_2O_5$ and $TiO_2$ combined, not greater than 0.5 wt. % of $Ta_2O_5$ and $TiO_2$ combined, not greater than 0.1 wt. % of $Ta_2O_5$ and $TiO_2$ combined or the zircon body may even be essentially free of $Ta_2O_5$ and $TiO_2$ combined. According to yet another embodiment, the zircon body may include at least 0.1 wt. % of $Ta_2O_5$ and $TiO_2$ combined for a total weight of the zircon body, such as, at least 0.2 wt. % of $Ta_2O_5$ and $TiO_2$ combined, at least 0.3 wt. % of $Ta_2O_5$ and $TiO_2$ combined, at least 0.4 wt. % of $Ta_2O_5$ and $TiO_2$ combined, at least 0.5 wt. % of $Ta_2O_5$ and $TiO_2$ combined, at least 0.6 wt. % of $Ta_2O_5$ and $TiO_2$ combined, at least 0.7 wt. % of $Ta_2O_5$ and $TiO_2$ combined $Ta_2O_5$ and $TiO_2$ combined, at least 0.8 wt. % of $Ta_2O_5$ and $TiO_2$ combined or even at least 0.9 wt. % of $Ta_2O_5$ and $TiO_2$ combined. It will be appreciated that the content of $Ta_2O_5$ and $TiO_2$ combined in wt. % for the total weight of the zircon body may be any value between any of the minimum and maximum values noted above. It will be further appreciated that the content of $Ta_2O_5$ and $TiO_2$ combined in wt. % for the total weigh of the zircon body may be within a range between any of the minimum and maximum values noted above.

According to a particular embodiment, the zircon body can include a particular content of alkaline earth oxide that can facilitate formation of the refractory object having improved properties and/or performance. In an aspect, the zircon body can include one or more alkaline earth oxide, wherein a total content of the alkaline earth oxide can be at least 0.02 wt. % for a total weight of the zircon body, such as at least 0.1 wt. %, at least 0.15 wt. %, at least 0.2 wt. %, at least 0.5 wt. %, at least 0.8 wt. %, at least 1 wt. %, at least 1.2 wt. %, at least 1.5 wt. %, at least 1.8 wt. %, or at least 2 wt. %. In another aspect, the total content of alkaline earth oxide may be not greater than 8 wt. % for a total weight of the zircon body, such as not greater than 7 wt. %, not greater than 6 wt. %, not greater than 5 wt. %, or not greater than 4 wt. %. Moreover, the total content of alkaline earth oxide may be any value in a range including any of the minimum and maximum percentages noted herein. It will be further appreciated the total content of the alkaline earth oxide can be in a range including any of the minimum and maximum percentages noted herein. For example, the total content can be in a range from at least 0.02 wt. % and not greater than 8 wt. % for a total weight of the zircon body, or in a range including at least 0.15 wt. % and not greater than 8 wt. %.

According to a particular embodiment, the zircon body can include a particular ratio of $C_{Al2O3}/C_{AKO}$ that can facilitate formation of the refractory body having improved properties and/or performance, wherein $C_{Al2O3}$ is the content of alumina in wt. % for a total weight of the zircon body and $C_{AKO}$ is the content of alkaline earth oxide in wt. % for the total weight of the zircon body. In particular aspects, alkaline earth oxide can include CaO, BaO, SrO, MgO, or any combination thereof. In an example, the ratio of $C_{Al2O3}/C_{AKO}$ can be at least 1, at least 2, at least 3, at least 4, at least 5, at least 6, at least 7, at least 8, at least 9, at least 10, at least 11, at least 12, at least 13, or at least 14. In another example, the ratio of $C_{Al2O3}/C_{AKO}$ may be not greater than 200, not greater than 100, not greater than 90, not greater than 80, not greater than 70, not greater than 60, not greater than 50, not greater than 40, not greater than 30, not greater than 20, not greater than 15, not greater than 14, not greater than 13, not greater than 12, not greater than 11, not greater than 10, or not greater than 9. It will be appreciated that the ratio of $C_{Al2O3}/C_{AKO}$ may be any value between any of the minimum and maximum values noted above. It will be further appreciated that the ratio of $C_{Al2O3}/C_{AKO}$ may be within a range between any of the minimum and maximum values noted above.

In a particular embodiment, the zircon body may include a particular content of CaO that can facilitate formation of the refractory object having improved properties and/or performance. For example, at least 0.02 wt. % of CaO for a total weight of the zircon body, at least 0.08 wt. %, at least 0.1 wt. %, at least 0.15 wt. %, at least 0.2 wt. %, at least 0.3 wt. %, at least 0.5 wt. %, at least 0.7 wt. %, at least 1 wt. %, at least 1.2 wt. %, at least 1.4 wt. %, at least 1.5 wt. %, at least 1.8 wt. %, or at least 2 wt. %. In another example, the zircon body may include not greater than 5 wt. % CaO for a total weight of the zircon body, such as, not greater than 4 wt. %, not greater than 3.8 wt. % of CaO, not greater than 3.5 wt. % of CaO, not greater than 3 wt. % CaO, not greater than 3.8 wt. % CaO, not greater than 3.5 wt. % CaO, not greater than 3.2 wt. % CaO, not greater than 3 wt. % CaO, not greater than 2.8 wt. % CaO, not greater than 2.5 wt. % CaO, not greater than 2.2 wt. % CaO, not greater than 2 wt. % CaO, not greater than 1.8 wt. %, not greater than 1.5 wt. %, not greater than 1.2 wt. %, or not greater than 1 wt. % of CaO. In a particular example, the zircon body can include a content of CaO that may be any percentage in a range including any of the minimum and maximum percentages noted herein. It will be further appreciated, the zircon body can include a content of CaO in a range including any of the minimum and maximum percentages noted herein.

According to a particular embodiment, the zircon body can include a particular ratio of $C_{Al2O3}/C_{CaO}$ that can facilitate formation of the refractory body having improved properties and/or performance, wherein $C_{Al2O3}$ is the content of alumina in wt. % for a total weight of the zircon body and $C_{CaO}$ is the content of CaO in wt. % for a total weight of the zircon body. In an example, the ratio of $C_{Al2O3}/C_{CaO}$ can be at least 1, at least 2, at least 3, at least 4, at least 5, at least 6, at least 7, at least 8, at least 9, at least 10, at least 11, at least 12, at least 13, or at least 14. In another example, the ratio of $C_{Al2O3}/C_{AKO}$ may be not greater than 200, not greater than 100, not greater than 90, not greater than 80, not greater than 70, not greater than 60, not greater than 50, not greater than 40, not greater than 30, not greater than 20, not greater than 15, not greater than 14, not greater than 13, not greater than 12, not greater than 11, not greater than 10, or not greater than 9. It will be appreciated that the ratio of $C_{Al2O3}/C_{CaO}$ may be any value between any of the minimum and maximum values noted above. It will be further appreciated that the ratio of $C_{Al2O3}/C_{CaO}$ may be within a range between any of the minimum and maximum values noted above.

According to still another embodiment, the zircon body may include a particular content of MgO that can facilitate formation of the refractory object having improved properties and/or performance. For example, the zircon body may include at least 0.01 wt. % of MgO for a total weight of the zircon body, such as at least 0.02 wt. % of MgO, at least 0.03 wt. % of MgO, at least 0.04 wt. % of MgO, at least 0.05 wt. % of MgO, at least 0.06 wt. % of MgO, at least 0.07 wt. % of MgO, at least 0.08 wt. % of MgO, at least 0.09 wt. % of MgO, at least 0.1 wt. %, at least 0.12 wt. %, at least 0.13 wt. %, at least 0.15 wt. %, or at least 0.18 wt. %, of MgO for the total weight of the zircon body. In another instance, the zircon body may include not greater than 0.2 wt. % MgO for a total weight of the zircon body, such as not greater than 0.18 wt. %, not greater than 0.15 wt. %, not greater than 0.12 wt. %, not greater than 0.1 wt. %, not greater than 0.08 wt. %, not greater than 0.05 wt. %, or not greater than 0.03 wt. % of MgO for a total weight of the zircon body. Moreover, the zircon body can include a content of MgO that may be any percentage in a range including any of the minimum and maximum percentages noted herein. It will be further appreciated that the zircon body can include a content of MgO in a range including any of the minimum and maximum percentages noted herein. In a particular embodiment, the zircon body may be essentially free of MgO. For example, MgO may be an impurity from one or more of the raw materials.

According to a particular embodiment, the zircon body can include a particular ratio of $C_{Al2O3}/C_{MgO}$ that can facilitate formation of the refractory body having improved properties and/or performance, wherein $C_{Al2O3}$ is the content of alumina in wt. % for a total weight of the zircon body and $C_{MgO}$ is the content of MgO in wt. % for a total weight of the zircon body. In an example, the ratio of $C_{Al2O3}/C_{MgO}$ can be at least 5, at least 6, at least 7, at least 8, at least 9, at least 10, at least 11, at least 12, at least 13, at least 14, at least 16, at least 18, at least 20, at least 24, at least 25, at least 28, at least 30, at least 33, at least 35, at least 38, or at least 40. In another example, the ratio of $C_{Al2O3}/C_{MgO}$ may be not greater than 5000, not greater than 4000, not greater than 3000, not greater than 2000, not greater than 1000, not greater than 800, not greater than 700, not greater than 500, not greater than 300, not greater than 200, not greater than 150, not greater than 100, not greater than 90, not greater than 80, not greater than 70, not greater than 60, not greater than 50, not greater than 40, not greater than 30, or not greater than 20. It will be appreciated that the ratio of $C_{Al2O3}/C_{MgO}$ may be any value between any of the minimum and maximum values noted above. It will be further appreciated that the ratio of $C_{Al2O3}/C_{MgO}$ may be within a range between any of the minimum and maximum values noted above.

According to still another embodiment, the zircon body may include a particular content of BaO that can facilitate formation of the refractory object having improved properties and/or performance. For example, the zircon body may include at least 0.05 wt. % BaO for a total weight of the zircon body, at least 0.1 wt. %, at least 0.2 wt. %, at least 0.3 wt. %, at least 0.5 wt. %, at least 0.8 wt. %, at least 1 wt. %, at least 1.2 wt. %, at least 1.4 wt. %, at least 1.5 wt. %, at least 1.8 wt. %, or at least 2 wt. % of BaO for the total weight of the zircon body. In another example, the zircon body may include not greater than 5 wt. % of BaO for a total weight of the zircon body, such as not greater than 4 wt. %, not greater than 3.8 wt. %, not greater than 3.5 wt. %, not greater than 3.2 wt. %, not greater than 3 wt. %, not greater than 2.8 wt. %, not greater than 2.5 wt. %, not greater than 2.2 wt. %, not greater than 2 wt. %, not greater than 1.8 wt. %, not greater than 1.5 wt. %, or not greater than 1.2 wt. %, or not greater than 1 wt. % of BaO for the total weight of the zircon body. Moreover, the zircon body can include a content of BaO that may be any percentage in a range including any of the minimum and maximum percentages noted herein. It will be further appreciated that the zircon body can include a content of BaO in a range including any of the minimum and maximum percentages noted herein.

According to a particular embodiment, the zircon body can include a particular ratio of $C_{Al2O3}/C_{BaO}$ that can facilitate formation of the refractory body having improved properties and/or performance, wherein $C_{Al2O3}$ is the content of alumina in wt. % for a total weight of the zircon body and $C_{BaO}$ is the content of BaO in wt. % for a total weight of the zircon body. In an example, the ratio of $C_{Al2O3}/C_{BaO}$ can be at least 1, at least 2, at least 3, at least 4, at least 5, at least 6, at least 7, at least 8, at least 9, at least 10, at least 11, at least 12, at least 13, or at least 14. In another example, the ratio of $C_{Al2O3}/C_{BaO}$ may be not greater than 200, not greater than 100, not greater than 90, not greater than 80, not greater than 70, not greater than 60, not greater than 50, not greater than 40, not greater than 30, not greater than 20, not greater than 15, not greater than 14, not greater than 13, not greater than 12, not greater than 11, not greater than 10, or not greater than 9. It will be appreciated that the ratio of $C_{Al2O3}/C_{BaO}$ may be any value between any of the minimum and maximum values noted above. It will be further appreciated that the ratio of $C_{Al2O3}/C_{BaO}$ may be within a range between any of the minimum and maximum values noted above.

According to still another embodiment, the zircon body may include a particular content of SrO that can facilitate formation of the refractory object having improved properties and/or performance. For example, the zircon body may include at least 0.05 wt. % SrO for a total weight of the zircon body, at least 0.1 wt. %, at least 0.15 wt. %, at least 0.2 wt. %, at least 0.3 wt. %, at least 0.5 wt. %, at least 0.8 wt. %, at least 1 wt. %, at least 1.2 wt. %, at least 1.4 wt. %, at least 1.6 wt. %, at least 1.8 wt. %, or at least 2 wt. % of SrO. In another example, the zircon body may include not greater than 5 wt. % of SrO for a total weight of the zircon body, such as not greater than 4 wt. %, not greater than 3.8 wt. %, not greater than 3.5 wt. %, not greater than 3.2 wt. %, not greater than 3 wt. %, not greater than 2.8 wt. %, not greater than 2.5 wt. %, not greater than 2.2 wt. %, not greater than 2 wt. %, not greater than 1.8 wt. %, not greater than 1.5 wt. %, or not greater than 1.2 wt. %, or not greater than 1 wt. % of SrO for the total weight of the zircon body. Moreover, the zircon body can include a content of SrO that may be any percentage in a range including any of the minimum and maximum percentages noted herein. It will be further appreciated that the zircon body can include a content of SrO in a range including any of the minimum and maximum percentages noted herein.

According to a particular embodiment, the zircon body can include a particular ratio of $C_{Al2O3}/C_{SrO}$ that can facilitate formation of the refractory body having improved properties and/or performance, wherein $C_{Al2O3}$ is the content of alumina in wt. % for a total weight of the zircon body and $C_{SrO}$ is the content of SrO in wt. % for a total weight of the zircon body. In an example, the ratio of $C_{Al2O3}/C_{SrO}$ can be at least 1, at least 2, at least 3, at least 4, at least 5, at least 6, at least 7, at least 8, at least 9, at least 10, at least 11, at least 12, at least 13, or at least 14. In another example, the ratio of $C_{Al2O3}/C_{SrO}$ may be not greater than 200, not greater than 100, not greater than 90, not greater than 80, not greater than 70, not greater than 60, not greater than 50, not greater than 40, not greater than 30, not greater than 20, not greater than 15, not greater than 14, not greater than 13, not greater than 12, not greater than 11, not greater than 10, or not greater than 9. It will be appreciated that the ratio of $C_{Al2O3}/C_{SrO}$ may be any value between any of the minimum and maximum values noted above. It will be further appreciated that the ratio of $C_{Al2O3}/C_{SrO}$ may be within a range between any of the minimum and maximum values noted above.

According to still another embodiment, the zircon body may include a particular content of $K_2O$. For example, the zircon body may include not greater than 1.0 wt. % of $K_2O$ for a total weight of the zircon body, such as, not greater than 0.8 wt. % of $K_2O$, not greater than 0.5 wt. % of $K_2O$, not greater than 0.4 wt. % of $K_2O$, not greater than 0.3 wt. % of $K_2O$, not greater than 0.2 wt. % of $K_2O$, not greater than 0.1 wt. % of $K_2O$ or the zircon body may be essentially free of $K_2O$.

According to still another embodiment, the zircon body may include a particular content of $Na_2O$. For example, the zircon body may include not greater than 1.0 wt. % of $Na_2O$ for a total weight of the zircon body, such as, not greater than 0.8 wt. % of $Na_2O$, not greater than 0.5 wt. % of $Na_2O$, not greater than 0.4 wt. % of $Na_2O$, not greater than 0.3 wt. % of $Na_2O$, not greater than 0.2 wt. % of $Na_2O$, not greater than 0.1 wt. % of $Na_2O$ or the zircon body may be essentially free of $Na_2O$.

According to still another embodiment, the zircon body may include a particular content of $Y_2O_3$. For example, the zircon body may include not greater than 1.0 wt. % of $Y_2O_3$ for a total weight of the zircon body, such as, not greater than 0.8 wt. % of $Y_2O_3$, not greater than 0.5 wt. % of $Y_2O_3$, not greater than 0.4 wt. % of $Y_2O_3$, not greater than 0.3 wt. % of $Y_2O_3$, not greater than 0.2 wt. % of $Y_2O_3$, not greater than 0.1 wt. % of $Y_2O_3$ or the zircon body may be essentially free of $Y_2O_3$.

According to still another embodiment, the zircon body may include a particular content of $P_2O_5$. For example, the zircon body may include not greater than 1.0 wt. % of $P_2O_5$ for a total weight of the zircon body, such as, not greater than 0.8 wt. % of $P_2O_5$, not greater than 0.5 wt. % of $P_2O_5$, not greater than 0.4 wt. % of $P_2O_5$, not greater than 0.3 wt. % of $P_2O_5$, not greater than 0.2 wt. % of $P_2O_5$, not greater than 0.1 wt. % of $P_2O_5$ or the zircon body may be essentially free of $P_2O_5$.

According to still another embodiment, the zircon body may include a particular content of $Fe_2O_3$. For example, the zircon body may include not greater than 1.0 wt. % of $Fe_2O_3$ for a total weight of the zircon body, such as, not greater than 0.8 wt. % of $Fe_2O_3$, not greater than 0.5 wt. % of $Fe_2O_3$, not greater than 0.4 wt. % of $Fe_2O_3$, not greater than 0.3 wt. % of $Fe_2O_3$, not greater than 0.2 wt. % of $Fe_2O_3$, not greater than 0.1 wt. % of $Fe_2O_3$ or the zircon body may be essentially free of $Fe_2O_3$.

According to still another embodiment, the zircon body may include a particular content of ZnO. For example, the zircon body may include not greater than 1.0 wt. % of ZnO for a total weight of the zircon body, such as, not greater than 0.8 wt. % of ZnO, not greater than 0.5 wt. % of ZnO, not greater than 0.4 wt. % of ZnO, not greater than 0.3 wt. % of ZnO, not greater than 0.2 wt. % of ZnO, not greater than 0.1 wt. % of ZnO or the zircon body may be essentially free of ZnO.

According to still another embodiment, the zircon body may include a particular content of $Yb_2O_3$, $K_2O$, $Na_2O$, $Y_2O_3$, $P_2O_5$, $Fe_2O_3$ and ZnO combined. For example, the zircon body may include not greater than 1.5 wt. % of $Yb_2O_3$, $K_2O$, $Na_2O$, $Y_2O_3$, $P_2O_5$, $Fe_2O_3$ and ZnO combined for a total weight of the zircon body, such as, not greater than 1.2 wt. % of $Yb_2O_3$, $K_2O$, $Na_2O$, $Y_2O_3$, $P_2O_5$, $Fe_2O_3$ and ZnO combined, not greater than 1.0 wt. % of $Yb_2O_3$, $K_2O$, $Na_2O$, $Y_2O_3$, $P_2O_5$, $Fe_2O_3$ and ZnO combined, not greater than 0.7 wt. % of $Yb_2O_3$, $K_2O$, $Na_2O$, $Y_2O_3$, $P_2O_5$, $Fe_2O_3$ and ZnO combined, not greater than 0.5 wt. % of $Yb_2O_3$, $K_2O$, $Na_2O$, $Y_2O_3$, $P_2O_5$, $Fe_2O_3$ and ZnO combined, not greater than 0.2 wt. % of $Yb_2O_3$, $K_2O$, $Na_2O$, $Y_2O_3$, $P_2O_5$, $Fe_2O_3$ and ZnO combined, not greater than 0.1 wt. % of $Yb_2O_3$, $K_2O$, $Na_2O$, $Y_2O_3$, $P_2O_5$, $Fe_2O_3$ and ZnO combined or the zircon body may be essentially free of $Yb_2O_3$, $K_2O$, $Na_2O$, $Y_2O_3$, $P_2O_5$, $Fe_2O_3$ and ZnO combined.

In other embodiments, the zircon body may have a minimal content of metal oxides, such as, for example, rare earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali oxides may include any oxide compositions that include group one metals, (i.e., lithium, sodium, potassium, rubidium, cesium, and francium), for example, lithium oxide, potassium oxide and cesium oxide. A zircon body that has a minimal content of any oxide noted above, for example, rare earth oxides, alkali oxides and any transition metal oxide not expressly disclosed herein, may have a content of that oxide of not greater than 1 wt. %, such as, not greater than 0.7 wt. %, not greater than 0.5 wt. % or even not greater than 0.2 wt. % of the total weight of the zircon body.

According to a particular embodiment, refractory objects formed according to methods described herein may include the amorphous phase including free silica. Free silica may be defined as $SiO_2$ that is not bonded as part of the crystalline form of the zircon material or the $Al_2O_3$ containing component. In particular aspects, the majority or essentially all of the free silica may be present in the amorphous phase of the zircon body. In a further embodiment, the fourth crystalline phase can include zircon grains, and free silica may be present between the zircon grains.

According to still other embodiments, the zircon body may include a particular content of free silica. For example, the zircon body may include not greater than 4.5 wt. % of free silica for a total weight of the zircon body, such as, not greater than 4.0 wt. % of free silica, not greater than 3.9 wt. % of free silica, not greater than 3.8 wt. % of free silica, not greater than 3.7 wt. % of free silica, not greater than 3.6 wt. % of free silica, not greater than 3.5 wt. % of free silica, not greater than 3.4 wt. % of free silica, not greater than 3.3 wt. % of free silica, not greater than 3.2 wt. % of free silica, not greater than 3.1 wt. % of free silica, not greater than 3.0 wt. % of free silica, not greater than 2.9 wt. % of free silica, not greater than 2.8 wt. % of free silica, not greater than 2.7 wt. % of free silica, not greater than 2.6 wt. % of free silica, not greater than 2.5 wt. % of free silica, not greater than 2.4 wt. % of free silica, not greater than 2.3 wt. % of free silica, not greater than 2.2 wt. % of free silica, not greater than 2.1 wt. % of free silica, not greater than 2.0 wt. % of free silica, not greater than 1.9 wt. % of free silica, not greater than 1.8 wt. % of free silica, not greater than 1.7 wt. % of free silica, not greater than 1.6 wt. % of free silica, not greater than 1.5 wt. % of free silica, not greater than 1.4 wt. % of free silica, not greater than 1.3 wt. % of free silica, not greater than 1.2 wt. % of free silica, not greater than 1.1 wt. % of free silica, not greater than 1.0 wt. % of free silica or even not greater than 0.5 wt. % of free silica. According to still other embodiments, the zircon body may include at least 0.1 wt. % of free silica for a total weight of the zircon body, such as, at least 0.5 wt. % of free silica, at least 0.6 wt. % of free silica, at least 0.7 wt. % of free silica, at least 0.8 wt. % of free silica, at least 0.9 wt. % of free silica, at least 1.0 wt. % of free silica, at least 1.1 wt. % of free silica, at least 1.1 wt. % of free silica, at least 1.2 wt. % of free silica, at least 1.3 wt. % of free silica, at least 1.4 wt. % of free silica, at least 1.5 wt. % of free silica, at least 1.6 wt. % of free silica, at least 1.7 wt. % of free silica, at least 1.8 wt. % of free silica, at least 1.9 wt. % of free silica, at least 2.0 wt. % of free silica, at least 2.1 wt. % of free silica, at least 2.2 wt. % of free silica, at least 2.3 wt. % of free silica, at least 2.4 wt. % of free silica, at least 2.5 wt. % of free silica, at least 2.6 wt. % of free silica, at least 2.7 wt. % of free silica, at least 2.8 wt. % of free silica, at least 2.9 wt. % of free silica, at least 3.0 wt. % of free silica, at least 3.1 wt. % of free silica, at least 3.2 wt. % of free silica, at least 3.3 wt. % of free silica, at least 3.4 wt. % of free silica, at least 3.5 wt. % of free silica, at least 3.6 wt. % of free silica, at least 3.7 wt. % of free silica, at least 3.8 wt. % of free silica, at least 3.9 wt. % of free silica, at least 4.0 wt. % of free silica or even at least 4.5 wt. % of free silica. It will be appreciated that the content of free silica in the zircon body in wt. % for the total weight of the zircon body may be any value between any of the minimum and maximum values noted above. It will be further appreciated that the content of free silica in the zircon body in wt. % for the total weigh of the zircon body may be within a range between any of the minimum and maximum values noted above.

According to another particular embodiment, the zircon grains in the zircon body may include a particular content of free silica. For example, the zircon grains may include not greater than 4.5 wt. % of free silica for a total weight of the zircon body, such as, not greater than 4.0 wt. % of free silica, not greater than 3.9 wt. % of free silica, not greater than 3.8 wt. % of free silica, not greater than 3.7 wt. % of free silica, not greater than 3.6 wt. % of free silica, not greater than 3.5 wt. % of free silica, not greater than 3.4 wt. % of free silica, not greater than 3.3 wt. % of free silica, not greater than 3.2 wt. % of free silica, not greater than 3.1 wt. % of free silica, not greater than 3.0 wt. % of free silica, not greater than 2.9 wt. % of free silica, not greater than 2.8 wt. % of free silica, not greater than 2.7 wt. % of free silica, not greater than 2.6 wt. % of free silica, not greater than 2.5 wt. % of free silica, not greater than 2.4 wt. % of free silica, not greater than 2.3 wt. % of free silica, not greater than 2.2 wt. % of free silica, not greater than 2.1 wt. % of free silica, not greater than 2.0 wt. % of free silica, not greater than 1.9 wt. % of free silica, not greater than 1.8 wt. % of free silica, not greater than 1.7 wt. % of free silica, not greater than 1.6 wt. % of free silica, not greater than 1.5 wt. % of free silica, not greater than 1.4 wt. % of free silica, not greater than 1.3 wt. % of free silica, not greater than 1.2 wt. % of free silica, not greater than 1.1 wt. % of free silica, not greater than 1.0 wt. % of free silica or even not greater than 0.5 wt. % of free silica. According to still other embodiments, the zircon grains may include at least 0.1 wt. % of free silica for a total weight of the zircon body, such as, at least 0.5 wt. % of free silica, at least 0.6 wt. % of free silica, at least 0.7 wt. % of free silica, at least 0.8 wt. % of free silica, at least 0.9 wt. % of free silica, at least 1.0 wt. % of free silica, at least 1.1 wt. % of free silica, at least 1.2 wt. % of free silica, at least 1.3 wt. % of free silica, at least 1.4 wt. % of free silica, at least 1.5 wt. % of free silica, at least 1.6 wt. % of free silica, at least 1.7 wt. % of free silica, at least 1.8 wt. % of free silica, at least 1.9 wt. % of free silica, at least 2.0 wt. % of free silica, at least 2.1 wt. % of free silica, at least 2.2 wt. % of free silica, at least 2.3 wt. % of free silica, at least 2.4 wt. % of free silica, at least 2.5 wt. % of free silica, at least 2.6 wt. % of free silica, at least 2.7 wt. % of free silica, at least 2.8 wt. % of free silica, at least 2.9 wt. % of free silica, at least 3.0 wt. % of free silica, at least 3.1 wt. % of free silica, at least 3.2 wt. % of free silica, at least 3.3 wt. % of free silica, at least 3.4 wt. % of free silica, at least 3.5 wt. % of free silica, at least 3.6 wt. % of free silica, at least 3.7 wt. % of free silica, at least 3.8 wt. % of free silica, at least 3.9 wt. % of free silica, at least 4.0 wt. % of free silica or even at least 4.5 wt. % of free silica. It will be appreciated that the content of free silica in the zircon grains in wt. % for the total weight of the zircon body may be any value between any of the minimum and maximum values noted above. It will be further appreciated that the content of free silica in the zircon grains in wt. % for the total weigh of the zircon body may be within a range between any of the minimum and maximum values noted above.

In an embodiment, the amorphous phase can include a particular content of silica (SiO2) that may facilitate formation of the refractory object having improved properties and/or performance. According to still another particular embodiment, the amorphous phase of the zircon body may include a particular content of $SiO_2$ that can be measured using scanning electron microscopy with wavelength dispersive X-ray spectroscopy or scanning electron microscopy with energy dispersive X-ray spectroscopy. For example, the amorphous phase may include a content of $SiO_2$ of at least 20 wt. % for a total weight of the amorphous phase, such as, at least 23 wt. %, at least 25 wt. %, at least 28 wt. %, at least 30 wt. %, at least 33 wt. %, at least 35 wt. %, at least 37 wt. %, at least 40 wt. %, at least 45 wt. %, at least 47 wt. %, at least 49 wt. %, at least 50 wt. %, at least 51 wt. %, at least 53 wt. %, at least 55 wt. %, at least 58 wt. %, at least 60 wt. %, at least 61 wt. %, at least 63 wt. %, at least 65 wt. %, at least 67 wt. %, or even at least 70 wt. % of silica for the total weight of the amorphous phase. According to still another embodiment, the amorphous phase may include a content of $SiO_2$ of not greater than 80 wt. % for a total weight of the amorphous phase, such as, not greater than 78 wt. %, not greater than 75 wt. %, not greater than 73 wt. %, not greater than 71 wt. %, not greater than 70 wt. %, not greater than 69 wt. %, not greater than 67 wt. %, not greater than 65 wt. %, not greater than 60 wt. %, not greater than 55 wt. %, not greater than 50 wt. %, not greater than 45 wt. %, not greater than 40 wt. %, not greater than 37 wt. %, not greater than 35 wt. %, not greater than 33 wt. %, not greater than 30 wt. % or even not greater than 27 wt. %. It will be appreciated that the content of $SiO_2$ in the amorphous phase may be any value between any of the maximum and minimum values noted above. It will be further appreciated that the content of $SiO_2$ in the amorphous phase may be any value within a range between any of the maximum and minimum values noted above. For example, the amorphous phase may include a content of silica in a range including at least 47 wt. % to 85 wt. % for a total weight of the amorphous phase or in a range including at least 54 wt. % to not greater than 67 wt. % for the total weight of the amorphous phase.

In an embodiment, the zircon body formed according to embodiments described herein can include the amorphous phases including alumina ($Al_2O_3$). The alumina may be free alumina, not bonded as part of the crystalline form of the zircon material or the silica containing component. In a further embodiment, the majority or essentially all the free alumina may be present in the amorphous phase. In an embodiment, the amorphous phase can include a particular content of alumina ($Al_2O_3$) that may facilitate formation of the refractory object having improved properties and/or performance. According to still another particular embodiment, the amorphous phase of the zircon body may include a particular content of $Al_2O_3$ that can be measured using scanning electron microscopy with wavelength dispersive X-ray spectroscopy or scanning electron microscopy with energy dispersive X-ray spectroscopy. For example, the amorphous phase may include a content of $Al_2O_3$ of at least 5 wt. % for a total weight of the amorphous phase, such as, at least 8 wt. %, at least 10 wt. %, at least 12 wt. %, at least 13 wt. %, at least 14 wt. %, at least 15 wt. %, at least 16 wt. %, at least 17 wt. %, at least 18 wt. %, at least 20 wt. %, at least 21 wt. %, at least 22 wt. %, at least 23 wt. %, or even at least 25 wt. % of alumina for the total weight of the amorphous phase. According to still another embodiment, the amorphous phase may include a content of $Al_2O_3$ of not greater than 39 wt. % for a total weight of the amorphous phase, such as, not greater than 37 wt. %, not greater than 35 wt. %, not greater than 32 wt. %, not greater than 30 wt. %, not greater than 28 wt. %, not greater than 27 wt. %, not greater than 25 wt. %, not greater than 23 wt. %, not greater than 21 wt. %, not greater than 19 wt. %, not greater than 17 wt. %, not greater than 16 wt. %, not greater than 15 wt. %, or not greater than 13 wt. % of alumina for the total weight of the amorphous phase. It will be appreciated that the content of $Al_2O_3$ in the amorphous phase may be any value between any of the maximum and minimum values noted above. It will be further appreciated that the content of $Al_2O_3$ in the amorphous phase may be any value within a range between any of the maximum and minimum values noted above. For example, the amorphous phase may include a content of alumina in a range including at least 10 wt. % to 35 wt. % for a total weight of the amorphous phase or in a range including at least 16 wt. % to at most 23 wt. % for the total weight of the amorphous phase.

According to still another particular embodiment, the amorphous phase of the zircon body may include a particular content of alkaline earth oxide that can be measured using scanning electron microscopy with energy dispersive X-ray spectroscopy or scanning electron microscopy with wavelength dispersive X-ray spectroscopy. The alkaline earth oxide may be free alkaline earth oxide, not bonded as part of the zircon material or alumina containing component. The alkaline earth oxide may include CaO, BaO, MgO, SrO, or any combination thereof. In particular aspects, the majority or essentially all of the free alkaline earth oxide can be present in the amorphous phase.

In an embodiment, the amorphous phase can include a particular total content of alkaline earth oxide that may facilitate formation of the refractory object having improved properties and/or performance. In an example, the amorphous phase may include a total content of alkaline earth oxide of at least 2 wt. % for a total weight of the amorphous. In a particular example, the amorphous phase may include a total content of greater than 2.9 wt. % of the alkaline earth oxide for a total weight of the amorphous phase, such as, greater than 3.0 wt. %, at least 3.1 wt. %, at least 3.2 wt. %, at least 3.5 wt. %, at least 3.8 wt. %, at least 4 wt. %, at least 4.3 wt. %, at least 4.5 wt. %, at least 4.8 wt. %, at least 5 wt. %, at least 5.3 wt. %, at least 5.5 wt. %, at least 5.7 wt. %, at least 6.0 wt. %, at least 6.3 wt. %, at least 6.5 wt. %, at least 6.8 wt. %, at least 7 wt. %, at least 7.6 wt. %, at least 7.9 wt. %, at least 8.1 wt. %, at least 8.3 wt. %, at least 8.5 wt. %, at least 8.8 wt. %, at least 9 wt. %, at least 9.3 wt. %, at least 9.5 wt. %, at least 9.8 wt. %, at least 10 wt. %, at least 10.4 wt. %, at least 10.8 wt. %, at least 11.0 wt. %, at least 11.3 wt. %, at least 11.5 wt. %, at least 11.8 wt. %, at least 12.0 wt. %, at least 12.3 wt. %, at least 12.5 wt. %, at least 12.8 wt. %, at least 13.0 wt. %, or even at least 13.2 wt. % of the alkaline earth oxide for the total weight of the amorphous phase. According to still another embodiment, the amorphous phase may include a content of alkaline earth oxide of not greater than 50 wt. % for a total weight of the amorphous phase, such as, not greater than 45 wt. %, not greater than 40 wt. %, not greater than 35 wt. %, not greater than 30 wt. %, not greater than 25 wt. %, not greater than 20 wt. %, not greater than 15 wt. %, or not greater than 14 wt. % of the alkaline earth oxides for a total weight of the amorphous phase. In a particular instance, the amorphous phase may include a total content of alkaline earth oxide of not greater than 13.7 wt. % for the total weight of the amorphous phase, such as not greater than 13.5 wt. %, not greater than 13.2 wt. %, not greater than 13 wt. %, not greater than 12 wt. %, not greater than 11 wt. %, not greater than 10 wt. %, not greater than 9 wt. % of the alkaline earth oxide, not greater than 8 wt. % of the alkaline earth oxide, not greater than 7 wt. % of the alkaline earth oxide, not greater than 6 wt. % of the alkaline earth oxide, not greater than 5 wt. % of the alkaline earth oxide, not greater than 4.5 wt. % of the alkaline earth oxide, not greater than 4.2 wt. % of the alkaline earth oxide, not greater than 4 wt. % of the alkaline earth oxide, or not greater than 3.5 wt. % of the alkaline earth oxide for the total weight of the amorphous phase. It will be appreciated that the content of alkaline earth oxide in the amorphous phase may be any value between any of the maximum and minimum values noted above. It will be further appreciated that the content of alkaline earth oxide in the amorphous phase may be any value within a range between any of the maximum and minimum values noted above.

In an embodiment, the amorphous phase can include a particular content of calcium oxide (CaO) that may facilitate formation of the refractory object having improved properties and/or performance. According to still another particular embodiment, the amorphous phase of the zircon body may include a particular content of CaO that can be measured using scanning electron microscopy with energy dispersive X-ray spectroscopy or scanning electron microscopy with wavelength dispersive X-ray spectroscopy. For example, the amorphous phase may include a content of CaO of greater than 1.9 wt. % for a total weight of the amorphous phase, such as, at least 2.0 wt. %, at least 2.2 wt. %, at least 2.5 wt. %, at least 2.8 wt. %, at least 3 wt. %, at least 3.2 wt. %, at least 3.5 wt. %, at least 3.8 wt. %, at least 4.2 wt. %, at least 4.8 wt. %, at least 5 wt. %, at least 5.2 wt. %, at least 5.5 wt. %, at least 5.7 wt. %, at least 5.9 wt. %, at least 6.2 wt. %, at least 6.5 wt. %, at least 6.7 wt. %, at least 6.8 wt. %, at least 7 wt. %, at least 7.1 wt. %, at least 7.4 wt. %, at least 7.4 wt. %, at least 7.8 wt. %, at least 8.1 wt. %, at least 8.4 wt. %, at least 8.7 wt. %, at least 9 wt. %, or at least 9.2 wt. % of calcium oxide for the total weight of the amorphous phase. In certain instances, the amorphous phase may include an even higher content of CaO, such as at least 10 wt. % of CaO for the total weight of the amorphous phase, such as at least 13 wt. %, at least 15 wt. %, at least 18 wt. %, at least 20 wt. %, at least 22 wt. %, or even at least 25 wt. %. According to still another embodiment, the amorphous phase may include a content of CaO of not greater than 50 wt. % for a total weight of the amorphous phase, such as, not greater than 90 wt. %, not greater than 85 wt. %, not greater than 40 wt. %, not greater than 35 wt. %, not greater than 30 wt. %, not greater than 25 wt. % or even not greater than 20 wt. %. In particular instances, the amorphous phase may include a content of not greater than 14 wt. % of calcium oxide for a total weight of the amorphous phase, such as not greater than 13 wt. % of calcium oxide, not greater than 12 wt. % of calcium oxide, not greater than 11 wt. % of calcium oxide, not greater than 10 wt. % of calcium oxide, not greater than 9 wt. % of calcium oxide, not greater than 8.9 wt. % of calcium oxide, not greater than 8.8 wt. % of calcium oxide, not greater than 8.7 wt. % of calcium oxide, not greater than 8.3 wt. % of calcium oxide, not greater than 8.1 wt. % of calcium oxide, not greater than 7.7 wt. % of calcium oxide, not greater than 7.4 wt. % of calcium oxide, not greater than 7.2 wt. %, not greater than 7.0 wt. %, not greater than 6.8 wt. %, not greater than 6.5 wt. %, not greater than 6.2 wt. %, not greater than 5.9 wt. %, not greater than 5.7 wt. %, not greater than 5.5 wt. %, not greater than 5.1 wt. %, not greater than 4.9 wt. %, not greater than 4.6 wt. %, not greater than 4.3 wt. %, not greater than 4.0 wt. %, or not greater than 3.8 wt. % of calcium oxide for the total weight of the amorphous phase. It will be appreciated that the content of CaO in the amorphous phase may be any value between any of the maximum and minimum values noted above. It will be further appreciated that the content of CaO in the amorphous phase may be any value within a range between any of the maximum and minimum values noted above.

In an embodiment, the amorphous phase can include a particular content of barium oxide (BaO) that may facilitate formation of the refractory object having improved properties and/or performance. According to still another particular embodiment, the amorphous phase of the zircon body may include a particular content of BaO that can be measured using scanning electron microscopy with energy dispersive X-ray spectroscopy or scanning electron microscopy with wavelength dispersive X-ray spectroscopy. For example, the amorphous phase may include a content of BaO of greater than 0.1 wt. % for a total weight of the amorphous phase, such as, at least 0.5 wt. %, at least 0.7 wt. %, at least 0.9 wt. %, at least 1.1 wt. %, at least 1.3 wt. %, at least 1.5 wt. %, at least 1.8 wt. %, at least 2 wt. %, at least 2.2 wt. %, at least 2.8 wt. %, at least 3 wt. %, at least 3.3 wt. %, at least 3.7 wt. %, at least 3.9 wt. %, at least 4.0 wt. %, at least 4.2 wt. %, at least 4.6 wt. %, at least 5 wt. %, at least 5.1 wt. %, at least 5.8 wt. %, at least 6.3 wt. %, at least 6.5 wt. %, at least 7 wt. %, at least 8.0 wt. %, at least 9 wt. %, at least 10 wt. %, at least 10.4 wt. %, at least 10.9 wt. %, at least 11 wt. %, at least 11.4 wt. %, at least 11.6 wt. %, or at least 11.8 wt. % of barium oxide for the total weight of the amorphous phase. In certain instances, the amorphous phase may include a higher content of BaO, such as at least 13 wt. %, at least 15 wt. %, at least 18 wt. %, at least 20 wt. %, at least 22 wt. %, or even at least 25 wt. % of BaO for the total weight of the amorphous phase. According to still another embodiment, the amorphous phase may include a content of BaO of not greater than 50 wt. % for a total weight of the amorphous phase, such as, not greater than 90 wt. %, not greater than 85 wt. %, not greater than 40 wt. %, not greater than 35 wt. %, not greater than 30 wt. %, not greater than 25 wt. % or even not greater than 20 wt. %. In particular examples, the amorphous phase may include a content of not greater than 14 wt. % of barium oxide for a total weight of the amorphous phase, such as not greater than 13 wt. %, not greater than 12 wt. %, not greater than 11.8 wt. %, not greater than 11.4 wt. %, not greater than 10.9 wt. %, not greater than 9.8 wt. %, not greater than 9.3 wt. %, not greater than 8.9 wt. %, not greater than 8.3 wt. %, not greater than 8.1 wt. %, not greater than 7.7 wt. %, not greater than 7.4 wt. %, not greater than 7.2 wt. %, not greater than 7.0 wt. %, not greater than 6.8 wt. %, not greater than 6.5 wt. %, not greater than 6.2 wt. %, not greater than 5.9 wt. %, not greater than 5.7 wt. %, not greater than 5.5 wt. %, not greater than 5.1 wt. %, not greater than 4.9 wt. %, not greater than 4.6 wt. %, not greater than 4.3 wt. %, not greater than 4.1 wt. %, not greater than 3.9 wt. %, not greater than 3.6 wt. %, not greater than 3.2 wt. %, not greater than 2.9 wt. %, not greater than 2.5 wt. %, not greater than 2.3 wt. %, not greater than 2.0 wt. %, not greater than 1.5 wt. %, or not greater than 1.1 wt. % of barium oxide for the total weight of the amorphous phase. It will be appreciated that the content of BaO in the amorphous phase may be any value between any of the maximum and minimum values noted above. It will be further appreciated that the content of BaO in the amorphous phase may be any value within a range between any of the maximum and minimum values noted above.

In an embodiment, the amorphous phase can include a particular content of magnesium oxide (MgO) that may facilitate formation of the refractory object having improved properties and/or performance. According to still another particular embodiment, the amorphous phase of the zircon body may include a particular content of MgO that can be measured using scanning electron microscopy with energy dispersive X-ray spectroscopy or scanning electron microscopy with wavelength dispersive X-ray spectroscopy. For example, the amorphous phase may include a content of MgO of at least 0.01 wt. % for a total weight of the amorphous phase, such as, at least 0.05 wt. %, at least 0.1 wt. %, at least 0.2 wt. %, at least 0.5 wt. %, at least 0.7 wt. %, or at least 0.9 wt. % for the total weight of the amorphous phase. According to still another embodiment, the amorphous phase may include a content of MgO of less than 4.5 wt. % for a total weight of the amorphous phase, such as, not greater than 4 wt. %, not greater than 3.5 wt. %, not greater than 3 wt. %, not greater than 2.5 wt. %, not greater than 2 wt. %, not greater than 1.5 wt. %, not greater than 1 wt. %, not greater than 0.8 wt. %, not greater than 0.6 wt. %, not greater than 0.4%, not greater than 0.3 wt. %, not greater than 0.25 wt. %, not greater than 0.2 wt. %, not greater than 0.1 wt. %, or even not greater than 0.05 wt. % for the total weight of the amorphous phase. In particular examples, the amorphous phase may be essentially free of MgO. It will be appreciated that the content of MgO in the amorphous phase may be any value between any of the maximum and minimum values noted above. It will be further appreciated that the content of MgO in the amorphous phase may be any value within a range between any of the maximum and minimum values noted above.

In an embodiment, the amorphous phase can include a particular content of strontium oxide (SrO) that may facilitate formation of the refractory object having improved properties and/or performance. According to still another particular embodiment, the amorphous phase of the zircon body may include a particular content of SrO that can be measured using scanning electron microscopy with energy dispersive X-ray spectroscopy or scanning electron microscopy with wavelength dispersive X-ray spectroscopy. For example, the amorphous phase may include a content of SrO of greater than 0.1 wt. % for a total weight of the amorphous phase, such as, at least 0.5 wt. %, at least 0.7 wt. %, at least 0.9 wt. %, at least 1.1 wt. %, at least 1.3 wt. %, at least 1.5 wt. %, at least 1.8 wt. %, at least 2 wt. %, at least 2.2 wt. %, at least 2.8 wt. %, at least 3 wt. %, at least 3.3 wt. %, at least 3.7 wt. %, at least 4.2 wt. %, at least 4.6 wt. %, at least 5 wt. %, at least 5.1 wt. %, at least 5.8 wt. %, at least 6.3 wt. %, at least 6.5 wt. %, at least 7 wt. %, at least 8.0 wt. %, at least 9 wt. %, at least 9.3 wt. %, at least 9.6 wt. %, at least 10 wt. %, or at least 10.4 wt. % of strontium oxide for the total weight of the amorphous phase. In certain instances, the amorphous phase may include an even higher content of SrO, such as at least 13 wt. % of SrO for the total weight of the amorphous phase, at least 15 wt. %, at least 18 wt. %, at least 20 wt. %, at least 22 wt. %, or even at least 25 wt. % of SrO for the total weight of the amorphous phase. According to still another embodiment, the amorphous phase may include a content of SrO of not greater than 50 wt. % for a total weight of the amorphous phase, such as, not greater than 90 wt. %, not greater than 85 wt. %, not greater than 40 wt. %, not greater than 35 wt. %, not greater than 30 wt. %, not greater than 25 wt. % or even not greater than 20 wt. %. In a particular example, the amorphous phase may include a content of not greater than 14 wt. % of strontium oxide for a total weight of the amorphous phase, such as not greater than 13 wt. %, not greater than 12 wt. %, not greater than 11 wt. %, not greater than 10.4 wt. %, not greater than 10.0 wt. %, not greater than 9 wt. %, not greater than 8.9 wt. %, not greater than 8.8 wt. % of strontium oxide, not greater than 8.7 wt. %, not greater than 8.3 wt. %, not greater than 8.1 wt. %, not greater than 7.7 wt. %, not greater than 7.4 wt. %, not greater than 7.2 wt. %, not greater than 7.0 wt. %, not greater than 6.8 wt. %, not greater than 6.5 wt. %, not greater than 6.2 wt. %, not greater than 5.9 wt. %, not greater than 5.7 wt. %, not greater than 5.5 wt. %, not greater than 5.1 wt. %, not greater than 4.9 wt. %, not greater than 4.6 wt. %, not greater than 4.3 wt. %, not greater than 4.0 wt. %, not greater than 3.5 wt. %, not greater than 3.1 wt. %, not greater than 2.9 wt. %, not greater than 2.5 wt. %, not greater than 2.3 wt. %, not greater than 2.0 wt. %, not greater than 1.5 wt. %, or not greater than 1.1 wt. % of strontium oxide for the total weight of the amorphous phase. It will be appreciated that the content of SrO in the amorphous phase may be any value between any of the maximum and minimum values noted above. It will be further appreciated that the content of SrO in the amorphous phase may be any value within a range between any of the maximum and minimum values noted above.

In another embodiment, the amorphous phase may include a particular content of tantalum oxide ($Ta_2O_5$) that may facilitate improved formation of the zircon body and improved properties and/or performance of the zircon body. For example, the amorphous phase may include a content of not greater than 12 wt. % of tantalum oxides for a total weight of the amorphous phase, such as not greater than 11.7 wt. % of tantalum oxides, not greater than 11.5 wt. % of tantalum oxides, not greater than 11.3 wt. % of tantalum oxides, not greater than 11.1 wt. % of tantalum oxides, not greater than 10.9 wt. % of tantalum oxides, not greater than 10.6 wt. % of tantalum oxides, not greater than 10.3 wt. % of tantalum oxides, not greater than 10.0 wt. % of tantalum oxides, not greater than 9.6 wt. % of tantalum oxides, not greater than 9.3 wt. % of tantalum oxides, not greater than 9.1 wt. % of tantalum oxides, not greater than 8.8 wt. % of tantalum oxides, not greater than 8.5 wt. % of tantalum oxides, not greater than 8.2 wt. % of tantalum oxides, not greater than 7.9 wt. % of tantalum oxides, not greater than 7.5 wt. % of tantalum oxides, not greater than 7.1 wt. % of tantalum oxides, not greater than 6.8 wt % of tantalum oxides, not greater than 6.5 wt. % of tantalum oxides, or not greater than 6.3 wt. % of tantalum oxides for the total weight of the amorphous phase. In another example, the amorphous phase may include a content of at least 6.0 wt. % of tantalum oxides for a total weight of the amorphous phase, such as, at least 6.3 wt. % of the alkaline earth oxide, at least 6.5 wt. % of tantalum oxides, at least 6.8 wt. % of the alkaline earth oxide, at least 7.0 wt. % of tantalum oxides, at least 7.3 wt. % of tantalum oxides, at least 7.5 wt. % of the alkaline earth oxide, at least 7.7 wt. % of the alkaline earth oxide, at least 7.9 wt. % of the alkaline earth oxide, at least 8.3 wt. % of tantalum oxides, at least 8.5 wt. % of tantalum oxides, at least 8.7 wt. % tantalum oxides, at least 9.0 wt. % of tantalum oxides, at least 9.3 wt. % of tantalum oxides, at least 9.5 wt. % of tantalum oxides, at least 9.8 wt. % of tantalum oxides, at least 10.0 wt. % of tantalum oxides, at least 10.3 wt. % of tantalum oxides, at least 10.5 wt. % of tantalum oxides, at least 10.7 wt. % of tantalum oxides, at least 11.0 wt. % of tantalum oxides, or even at least 11.1 wt. % of tantalum oxides for the total weight of the amorphous phase. It will be appreciated that the total content of tantalum oxides in wt. % for the total weight of the amorphous phase may be any value between any of the minimum and maximum values noted above. It will be further appreciated that the total content of tantalum oxides in wt. % for the total weigh of the amorphous phase may be within a range including any of the minimum and maximum values noted above. For example, the amorphous phase may include tantalum oxides in a content from 6.0 wt. % to 12.0 wt. % or from 6.3 wt. % to 11.1 wt. % for a total weight of the amorphous phase.

According to still other embodiments, the zircon grains in the zircon body may have a particular average grain size. For example, the zircon grains may have an average grain size of at least 3 μm, such as, at least 4 μm, at least 5 μm, at least 6 μm, at least 7 μm, at least 8 μm, at least 9 μm, at least 10 μm, at least 12 μm or even at least 14 μm. According to still other embodiments, the zircon grains may have an average grain size of not greater than 44 μm, not greater than 30 μm, not greater than 20 μm, not greater than 15 μm or even not greater than 10 μm. It will be appreciated that zircon grains in the zircon body may have an average grain size of any value between any of the maximum and minimum values noted above. It will be further appreciated the zircon grains in the zircon body may have an average grain size within a range between any of the maximum and minimum values noted above.

According to still another embodiment, the zircon body may include a particular content of apparent porosity. Apparent porosity may be measured using ASTM C20. For example, the zircon body may include an apparent porosity of at least 0.1 vol. % for the total volume of the zircon body, such as, at least 0.5 vol. %, at least 1.0 vol. %, at least 1.5 vol. %, at least 2.0 vol. %, at least 2.5 vol. %, at least 3.0 vol. %, at least 3.5 vol. %, at least 4.0 vol. %, at least 4.5 vol. %, at least 5.0 vol. %, at least 6 vol. %, at least 7 vol. %, at least 8 vol. %, at least 9 vol. %, at least 10 vol. %, at least 11 vol. %, at least 12 vol. %, at least 13 vol. %, at least or even at least 14 vol. %. According to still other embodiments, the zircon body may include an apparent porosity of not greater than 15 vol. % for a total volume of the zircon body, such as, not greater than 14 vol. %, not greater than 13 vol. %, not greater than 12 vol. %, not greater than 11 vol. %, not greater than 10 vol. %, not greater than 9 vol. %, not greater than 8 vol. %, not greater than 7 vol. %, not greater than 6 vol. %, not greater than 5 vol. %, not greater than 4.5 vol. %, not greater than 4.0 vol. %, not greater than 3.5 vol. %, not greater than 3.0 vol. %, not greater than 2.5 vol. %, not greater than 2.0 vol. %, not greater than 1.5 vol. %, not greater than 1.0 vol. % and not greater than 0.5 vol. %. It will be appreciated that the zircon body may have an apparent porosity of any value between any of the maximum and minimum values noted above. It will be further appreciated that the zircon body may have an apparent porosity of any value within a range between any of the maximum and minimum values noted above.

Another particular embodiment of a refractory object formed as described herein may include a zircon body that may include zircon grains and the zircon body may have an outer portion and an interior portion. The intersection of the outer portion and the inner portion may be measured at a depth of 5000 μm from an outer surface of the body. The outer portion of the body may have an apparent porosity measured in volume percent ($P_{op}$) and the interior portion of the body may have an apparent porosity measured in volume percent ($P_{ip}$).

Apparent porosity may be measured using ASTM C20. In certain embodiments, $P_{op}$ and $P_{ip}$ may be substantially similar. For example, $P_{op}$ and $P_{ip}$ may have a difference of not greater than 25%, such as, not greater than 20%, not greater than 15%, not greater than 10%, not greater than 5%, not greater than 4%, not greater than 3% or not greater than 2% volume. In other embodiments, $P_{op}$ and $P_{ip}$ may have a difference of at least 1%, such as, at least 2%, at least 3%, at least 4%, at least 5% or at least 9% volume. It will be appreciated that the difference in apparent porosity between $P_{op}$ and $P_{ip}$ may be any value between any of the maximum and minimum values noted above. It will be further appreciated that the difference in apparent porosity between $P_{op}$ and $P_{ip}$ may be any value within a range between any of the maximum and minimum values noted above.

According to still other embodiments, the zircon body may have a particular ratio of the apparent porosity of the outer portion of the body ($P_{op}$) to apparent porosity of the inner portion of the body ($P_{ip}$). The ratio may be expressed mathematically as $P_{op}/P_{ip}$. $P_{op}$ can represent the apparent porosity of the outer portion of the zircon body measured in volume percent. $P_{ip}$ can represent the apparent porosity of the interior portion of the body measured in volume percent. In certain embodiments, the body may include an apparent porosity ratio $P_{op}/P_{ip}$ of not greater than 1.9, such as, not greater than 1.8, not greater than 1.7, not greater than 1.6, not greater than 1.5, not greater than 1.4, not greater than 1.3, not greater than 1.2 or even not greater than 1.1. In other embodiments, the body may include an apparent porosity ratio $P_{op}/P_{ip}$ of about 1. In still other embodiments, the body may include an apparent porosity ratio $P_{op}/P_{ip}$ of at least 0.8, such as, at least 0.85, at least 0.9 or even at least 0.95. It will be appreciated that the porosity ratio $P_{op}/P_{ip}$ may be any value between any of the maximum and minimum values noted above. It will be further appreciated that the porosity ratio $P_{op}/P_{ip}$ may be any value within a range between any of the maximum and minimum values noted above.

According to still other embodiment, a zircon body formed according to methods described herein may have a particular density. Density (D) may be determined using apparent specific gravity according to ASTM C20. In one embodiment, the zircon body may have a density or at least 3.7 g/cm³, such as, 3.8 g/cm³, 3.9 g/cm³, 4.0 g/cm³, 4.1 g/cm³, at least 4.2 g/cm³, at least 4.3 g/cm³ or even at least 4.4 g/cm³. In still other instances, the zircon body may have a density of not greater than 4.5 g/cm³, such as, not greater than 4.4 g/cm³, not greater than 4.3 g/cm³, not greater than 4.2 g/cm³, not greater than 4.1 g/cm³, not greater than 4.0 g/cm³, not greater than 3.9 g/cm³, not greater than 3.8 g/cm³ or even not greater than 3.7 g/cm³. It will be appreciated that the density may be any value between any of the maximum and minimum values noted above. It will be further appreciated that the density may be any value within a range between any of the minimum and maximum values noted above.

According to still other embodiment, a zircon body formed according to methods described herein may have particular creep deformation rate for a particular temperature. Creep deformation rate may be measured using an isothermal four point creep test.

In a four point isothermal creep test, a four point bending test configuration is used where two outer supports are placed under a sample and two inner loading members apply force on top of the sample. A distance L between the outer supports may be 80 mm and a distance l between the inner loading members may be 40 mm. The sample bar may have a height "a" of 8 mm, a width "b" of 9 mm and a length of 100 mm. During testing, the sample bar may be placed on the supporting members and the loading members may apply a stress of 2 MPa on the sample bar. Testing may occur in a heating chamber. The temperature of the heating chamber during testing may be maintained at a set testing temperature, such as, for example, at a temperature of 1350° C., 1325° C., 1300° C. or 1275° C. for a total testing time of between 12 to 48 hours. The instantaneous deflection of the sample in millimeters (mm) may be measured during the test using a LVDT in contact with the bottom surface of the sample. A reference displacement is subtracted from an instantaneous displacement to provide a particular sample displacement during the test. Sample displacement may then be used to calculate the creep deformation rate per hour (i.e., creep deformation rate). The deformation rate $R_{def}$ is derived from the particular sample displacement rate "$R_{disp}$" by the formula:

$$R_{def} = R_{disp} \cdot 12 \cdot a/(3 \cdot L^2 - (L-1))^2.$$

According to a particular embodiment, zircon bodies formed according to methods described herein may have a particular creep deformation rate as measured using a four point bending test at a temperature of 1350° C. under an applied stress of 2 MPa. For example, the zircon body may have a creep deformation rate as measured using a four point bending test at a temperature of 1350° C. under an applied stress of 2 MPa of less than 3.0 E-5 h$^{-1}$ such as, not greater than 2.5 E-5 h$^{-1}$, not greater than 2.2 E-5 h$^{-1}$, not greater than 1.8 E-5 h$^{-1}$ not greater than 1.5 E-5 h$^{-1}$, not greater than 1.2 E-5 h$^{-1}$, not greater than 1 E-5 h$^{-1}$, not greater than 9.5 E-6 h$^{-1}$, not greater than 9 E-6 h$^{-1}$, not greater than 8 E-6 h$^{-1}$, or not greater than 7 E-6 h$^{-1}$. In another example, the zircon body may have a creep deformation rate as measured using a four point bending test at a temperature of 1350° C. under an applied stress of 2 MPa of at least 0.5 E-6 h$^{-1}$, at least 1 E-6 h$^{-1}$, or at least 1.5 E-6 h$^{-1}$. In a further instance, the zircon body may have a creep deformation rate in a range including any of the minimum and maximum values noted herein, as measured using a four point bending test at a temperature of 1350° C. under an applied stress of 2 MPa.

According to another embodiment, zircon bodies formed according to methods described herein may have a particular creep deformation rate as measured using a four point bending test at a temperature of 1325° C. under an applied stress of 2 MPa. For example, In another example, the zircon body may have a creep deformation rate as measured using a four point bending test at a temperature of 1325° C. under an applied stress of 2 MPa of less than about 8.8 E-6 h$^{-1}$ such as, not greater than 8.5 E-6 h$^{-1}$, not greater than 8 E-6 h$^{-1}$, not greater than 7.5 E-6 h$^{-1}$, not greater than 7 E-6 h$^{-1}$, or not greater than 6.5 E-6 h$^{-1}$, not greater than 6 E-6 h$^{-1}$, not greater than 5.5 E-6 h$^{-1}$, not greater than 5 E-6 h$^{-1}$, not greater than 4.5 E-6 h$^{-1}$, not greater than 4.3 E-6 h$^{-1}$, not greater than 4 E-6 h$^{-1}$, not greater than 3.5 E-6 h$^{-1}$, or not greater than 3 E-6 h$^{-1}$. In another example, the zircon body may have a creep deformation rate as measured using a four point bending test at a temperature of 1325° C. under an applied stress of 2 MPa of at least 0.05 E-6 h$^{-1\cdot}$, at least 0.5 E-6 h$^{-1\cdot}$, or at least 0.75 E-6 h$^{-1\cdot}$. In a further instance, the zircon body may have a creep deformation rate in a range including any of the minimum and maximum values noted herein, as measured using a four point bending test at a temperature of 1325° C. under an applied stress of 2 MPa.

According to still another embodiment, zircon bodies formed according to methods described herein may have a particular creep deformation rate as measured using a four point bending test at a temperature of 1300° C. under an applied stress of 2 MPa. For example, the zircon body may have a creep deformation rate as measured using a four point bending test at a temperature of 1300° C. under an applied stress of 2 MPa of less than 1.5 E-5 h$^{-1}$, such as less than 4.5 E-6 h$^{-1}$, not greater than 4 E-6 h$^{-1}$, not greater than 3.5 E-6 h$^{-1}$, not greater than 3 E-6 h$^{-1}$, not greater than 2.5 E-6 h$^{-1}$, not greater than 2.2 E-6 h$^{-1}$, not greater than 2 E-6 h$^{-1}$, not greater than 1.8 E-6 h$^{-1}$, not greater than 1.5 E-6 h$^{-1}$, or not greater than 1.2 E-6 h$^{-1}$. In another example, the zircon body may have a creep deformation rate as measured using a four point bending test at a temperature of 1300° C. under an applied stress of 2 MPa of at least 0.05 E-6 h$^{-1\cdot}$, at least 0.1 E-6 h$^{-1\cdot}$, at least 0.3 E-6 h$^{-1\cdot}$, or at least 0.5 E-6 h$^{-1\cdot}$. In a further instance, the zircon body may have a creep deformation rate in a range including any of the minimum and maximum values noted herein, as measured using a four point bending test at a temperature of 1300° C. under an applied stress of 2 MPa.

According to still another embodiment, zircon bodies formed according to methods described herein may have a particular creep deformation rate as measured using a four point bending test at a temperature of 1275° C. under an applied stress of 2 MPa. For example, the zircon body may have a creep deformation rate as measured using a four point bending test at a temperature of 1275° C. under an applied stress of 2 MPa of less than 4.0 E-6 h$^{-1}$, such as not greater than 3.5 E-6 h$^{-1}$. In particular examples, the zircon body may have a creep deformation rate as measured using a four point bending test at a temperature of 1275° C. under an applied stress of less than 2.7 E-6 h$^{-1}$, not greater than 2.6 E-6 h$^{-1}$, not greater than 2.5 E-6 h$^{-1}$, not greater than 2.4 E-6 h$^{-1}$, not greater than 2.53 E-6 h$^{-1}$, not greater than 2.2 E-6 h$^{-1}$, not greater than 2.1 E-6 h$^{-1}$, not greater than 1.9 E-6 h$^{-1}$, not greater than 1.7 E-6 h$^{-1}$, not greater than 1.5 E-6 h$^{-1}$, not greater than 1.3 E-6 h$^{-1}$, or not greater than 1.1 E-6 h$^{-1}$. In another example, the zircon body may have a creep deformation rate as measured using a four point bending test at a temperature of 1275° C. under an applied stress of 2 MPa of at least 0.005 E-6 h$^{-1}$, at least 0.008 E-6 h$^{1}$, at least 0.01 E-6 h$^{-1}$, at least 0.03 E-6 h$^{-1}$, at least 0.05 E-6 h$^{-1}$, at least 0.08 E-6 h$^{-1}$, or at least 0.1 E-6 h$^{-1\cdot}$. In a further instance, the zircon body may have a creep deformation rate in a range including any of the minimum and maximum values noted herein, as measured using a four point bending test at a temperature of 1275° C. under an applied stress of 2 MPa.

According to still another embodiment, zircon bodies formed according to methods described herein may have a particular blistering value as measured using a short term or a long-term blistering test conducted using a glass called LTPS glass. LTPS glass is a commercially available alkali-free boroalumino silicate glass substrate used in the production of AMLCD displays. LTPS Glass 1 and 2 glass has a density between 2.4 and 2.7 g/cc and a strain point between 650 and 800° C.

In a short-term plaque blistering test, a square or cylinder sample was prepared. The square sample may have a length and width or 1 inch and a thickness of ¼ in. The cylinder sample may have a diameter of 1 in and a thickness of ¼ in. A face of the sample may be ground down with a 30 micron surface finish, cleaned in an ultra sound bath and dried. A glass sheet (i.e., LTPS Glass 1 and 2) may be placed on the surface of the sample and the sample may be heated at 5° C. per minute to a testing temperature of 1300° C. The sample may be held at the testing temperature for 8 hours and then rapidly cooled at least 10° C. per minute to room temperature in order to avoid devitrification of the glass. The sample may then be cut in half and the cross section may be polished to 1 micron. A stereo-microscope or binocular may then be used to observe the cross-section and count the number of bubbles visible in a section of 3000 microns along the interface to a depth of 500 microns into the glass. The number of bubbles may then be divided by 1.5 provide the number of bubbles per square mm at the interface between sample and the glass.

In a long-term crucible blistering test, a crucible is core drilled from a sample block. The crucible may have a height of 40 mm and a diameter of 50 mm, with a hole in the middle of the crucible having a height of 30 mm and a diameter of 30 mm. Once prepared, the crucible may be cleaned using DI water in an ultrasonic bath to eliminate any possible residues from machining and then dried. Once dried, the crucible may be filled with 20 g of broken pieces of glass (i.e., LTPS 1 and 2 glass) and then heated up to the testing temperature and soaked for an extended period of time (72 hours, 120 hours, or 360 hours). After the soak is completed the crucible is cooled down to room temperature. The crucible is then cut vertically to expose the glass and blistering intensity is observed. In a long-term crucible blistering test, the materials are tested at 1300° C. in LTPS 1 and 2 glass for 360 hours. A stereo-microscope or binocular may then be used to observe the cross-section and count the number of bubbles visible in a section of 3000 microns along the interface to a depth of 500 microns into the glass. The number of bubbles may then be divided by 1.5 provide the number of bubbles per square mm at the interface between sample and the glass.

According to particular embodiments, zircon bodies formed according to methods described herein may have a particular blistering value as measured using a short-term plaque blistering test on LTPS 1 and 2 glass.

According to still another embodiment, zircon bodies formed according to methods described herein may have a particular blistering value as measured using a long-term crucible blistering test measured on LTPS 1 and 2 glass after 360 hours of exposure to a temperature of 1300° C. For example, the blistering value as measured using a long-term crucible blistering test on LTPS 1 and 2 glass after 360 hours may be not greater than 1 bubble per mm$^2$.

Notably, blistering values in refractory objects that include zircon formed according to embodiments described herein has been determined to be lower as compared to conventional zircon-based materials formed according to conventional methods.

Many different aspects and embodiments are possible. Some of these aspects and embodiments are described below. After reading this specification, those skilled in the art will appreciate that these aspects and embodiments are only illustrative and do not limit the scope of the present invention. Embodiments may be in accordance with any one or more of the embodiments as listed below.

EMBODIMENTS

Embodiment 1. A refractory object comprising: a zircon body, wherein the zircon body comprises a first crystalline phase comprising an alkaline earth metal element.

Embodiment 2. A refractory object comprising: a zircon body comprising a creep deformation rate of not greater than about 1.8 E-5 $h^{-1}$ at a temperature of 1350° C. and a stress of 2 MPa.

Embodiment 3. A refractory object comprising: a zircon body comprising a creep deformation rate of less than about 2.7 E-6 $h^{-1}$ at a temperature of 1275° C. and a stress of 2 MPa.

Embodiment 4. A refractory object comprising: a zircon body comprising a creep deformation rate of less than about 8.8 E-6 $h^{-1}$ at a temperature of 1325° C. and a stress of 2 MPa.

Embodiment 5. A refractory object comprising: a zircon body comprising a creep deformation rate of less than about 4.5 E-6 $h^{-1}$ at a temperature of 1300° C. and a stress of 2 MPa.

Embodiment 6. The refractory object of any one of embodiments 1 to 5, wherein the zircon body comprises a first crystalline phase including an alkaline metal element including at least one of Ca, Mg, Sr, and Ba.

Embodiment 7. The refractory object of embodiment 6, wherein the first crystalline phase further comprises Al, Si, or a combination thereof.

Embodiment 8. The refractory object of any one of embodiments 1 to 5, wherein the zircon body comprises a first crystalline phase including calcium aluminosilicate, barium aluminosilicate, magnesium aluminosilicate, strontium aluminosilicate, or a combination thereof.

Embodiment 9. The refractory object of any one of embodiments 1 to 5, wherein the zircon body comprises a first crystalline phase including a feldspar-type crystal.

Embodiment 10. The refractory object of any one of embodiments 1 to 5, wherein the zircon body comprises a first crystalline phase including gehlenite ($Ca_2Al_2SiO_7$), prehnite ($Ca_2Al[AlSiO_7]$ and $Ca_2Al(AlSi_3O_{10})(OH)_2$), anorthite ($CaAl_2Si_2O_8$), celsian ($BaAl_2Si_2O_8$), or any combination thereof.

Embodiment 11. The refractory object of any one of embodiments 1 to 5, wherein the zircon body comprises at least 0.01 wt. % of a first crystalline phase including an alkaline earth metal for a total weight of the zircon body, at least 0.05 wt. %, at least 0.1 wt. %, at least 0.2 wt. %, at least 0.3 wt. %, at least 0.4 wt. %, at least 0.5 wt. %, at least 0.6 wt. %, at least 0.7 wt. %, at least 0.8 wt. %, at least 0.9 wt. %, at least 1 wt. %, at least 2 wt. %, or at least 3 wt. %, at least 4 wt. %, at least 5 wt. %, or at least 6 wt. % for a total weight of the zircon body.

Embodiment 12. The refractory object of any one of embodiments 1 to 5, wherein the zircon body comprises not greater than 20 wt. % of a first crystalline phase including an alkaline earth metal for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, not greater than 2 wt. %, or not greater than 1 wt. % for the total weight of the zircon body.

Embodiment 13. The refractory object of any one of embodiments 1 to 5, wherein the zircon body comprises a second crystalline phase comprising tantalum, iron, titanium, or any combination thereof, wherein the second crystalline phase is a tantalum-iron-titania rich crystalline phase.

Embodiment 14. The refractory object of embodiment 13, wherein the zircon body comprises at least 0.01 wt. % of the second crystalline phase for a total weight of the zircon body, at least 0.05 wt. %, at least 0.1 wt. %, at least 0.2 wt. %, at least 0.3 wt. %, at least 0.4 wt. %, at least 0.5 wt. %, at least 0.6 wt. %, at least 0.7 wt. %, at least 0.8 wt. %, at least 0.9 wt. %, at least 1 wt. %, at least 1.5 wt. %, at least 2 wt. %, at least 2.5 wt. %, at least 3 wt. %, at least 3.5 wt. %, at least 4 wt. %, at least 4.5 wt. %, or at least 5 wt. % for a total weight of the zircon body.

Embodiment 15. The refractory object of embodiment 13 or 14, wherein the zircon body comprises not greater than 20 wt. % of the second crystalline phase for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, or not greater than 2 wt. % for the total weight of the zircon body.

Embodiment 16. The refractory object of any one of embodiments 1 to 5, wherein the zircon body comprises an amorphous phase including Si, Al, Ta, an alkaline earth metal element, or any combination thereof.

Embodiment 17. The refractory object of embodiment 16, wherein the zircon body comprises at least 0.5 wt. % of the amorphous phase for a total weight of the zircon body, at least 0.8 wt. %, at least 1 wt. %, at least 1.5 wt. %, at least 1.8 wt. %, at least 2 wt. %, at least 2.5 wt. %, at least 3 wt. %, at least 4 wt. %, or at least 5 wt. % for a total weight of the zircon body.

Embodiment 18. The refractory object of embodiment 16 or 17, wherein the zircon body comprises not greater than 20 wt. % of the amorphous phase for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, not greater than 4 wt. %, not greater than 3 wt. %, or not greater than 2 wt. % for the total weight of the zircon body.

Embodiment 19. The refractory object of embodiment 16, wherein the amorphous phase comprises: from 40 wt. % to 60 wt. % of Si for a total weight of the amorphous phase or from 48 wt. % to 58 wt. % of Si; from 10 wt. % to 30 wt. % of Al for the total weight of the amorphous phase or 15 wt. % to 25 wt. % of Al; from 0.5 wt. % to 15 wt. % of an alkaline earth metal element for the total weight of the amorphous phase or from 2 wt. % to 9 wt. % of the alkaline earth metal element; and from 0.3 wt. % to 12 wt. % of Ta for the total weight of the amorphous phase or from 1 wt. % to 7 wt. % of Ta.

Embodiment 20. The refractory object of embodiment 16, wherein the first crystalline phase, the second crystalline phase, or both is within the amorphous phase.

Embodiment 21. The refractory object of any one of embodiments 1 to 5, wherein the zircon body comprises a third crystalline phase comprising mullite, wherein the third crystalline phase consists essentially of mullite.

Embodiment 22. The refractory object of embodiment 21, wherein the zircon body comprises at least 0.01 wt. % of the third crystalline phase for a total weight of the zircon body, at least 0.05 wt. %, at least 0.1 wt. %, at least 0.2 wt. %, at least 0.3 wt. %, at least 0.4 wt. %, at least 0.5 wt. %, at least 0.6 wt. %, at least 0.7 wt. %, at least 0.8 wt. %, at least 0.9 wt. %, at least 1 wt. %, at least 1.5 wt. %, at least 2 wt. %, at least 2.5 wt. %, at least 3 wt. %, at least 3.5 wt. %, at least 4 wt. %, at least 4.5 wt. %, or at least 5 wt. % for a total weight of the zircon body.

Embodiment 23. The refractory object of embodiment 21 or 22, wherein the zircon body comprises not greater than 20 wt. % of the third crystalline phase for a total weight of the zircon body, not greater than 18 wt. %, not greater than 16 wt. %, not greater than 14 wt. %, not greater than 12 wt. %, not greater than 10 wt. %, not greater than 8 wt. %, not greater than 6 wt. %, not greater than 5 wt. %, or not greater than 4 wt. % for the total weight of the zircon body.

Embodiment 24. The refractory object of any one of embodiments 1 to 5, wherein the zircon body comprises a fourth crystalline phase comprising zircon, wherein the fourth crystalline phase consists essentially of zircon.

Embodiment 25. The refractory object of embodiment 24, wherein the zircon body comprises at least 50 wt. % of the fourth crystalline phase for a total weight of the zircon body, at least 60 wt. %, at least 70 wt. %, at least 75 wt. %, at least 80 wt. %, at least 85 wt. %, at least 90 wt. %, or at least 93 wt. % for a total weight of the zircon body.

Embodiment 26. The refractory object of embodiment 24 or 25, wherein the zircon body comprises not greater than 99.5 wt. % of the fourth crystalline phase for a total weight of the zircon body, not greater than 99 wt. %, not greater than 98 wt. %, not greater than 97 wt. %, not greater than 96 wt. %, not greater than 95 wt. %, or not greater than 94 wt. % for the total weight of the zircon body.

Embodiment 27. The refractory object of any one of embodiments 1 to 5, wherein the zircon body comprises a fifth crystalline phase comprising zirconia, wherein the fifth crystalline phase consists essentially of zirconia.

Embodiment 28. The refractory object of embodiment 27, wherein the zircon body comprises at least 0.01 wt. % of the fifth crystalline phase including for a total weight of the zircon body, at least 0.03 wt. %, at least 0.05 wt. %, at least 0.1 wt. %, at least 0.2 wt. %, at least 0.3 wt. %, at least 0.4 wt. %, at least 0.5 wt. %, at least 0.6 wt. %, at least 0.7 wt. %, at least 0.8 wt. %, at least 0.9 wt. %, or at least 1 wt. % for a total weight of the zircon body.

Embodiment 29. The refractory object of embodiment 27 or 28, wherein the zircon body comprises not greater than 15 wt. % of the fifth crystalline phase for a total weight of the zircon body, not greater than 12 wt. %, not greater than 10 wt. %, not greater than 9 wt. %, not greater than 8 wt. %, not greater than 7 wt. %, not greater than 6 wt. %, not greater than 5 wt. %, not greater than 4 wt. %, not greater than 3 wt. %, or not greater than 2 wt. % for the total weight of the zircon body.

Embodiment 30. The refractory object of any one of embodiments 1 to 5, wherein the zircon body comprises alkaline earth oxide, wherein a total content of the alkaline earth oxide is at least 0.02 wt. % and not greater than 8 wt. % for a total weight of the zircon body.

Embodiment 31. The refractory object of any one of embodiments 1 to 5, wherein the zircon body comprises at least 0.1 wt. % of alumina ($Al_2O_3$) containing component for a total weight of the zircon body, at least 0.3 wt. %, at least 0.5 wt. %, at least 0.8 wt. %, or at least 1 wt. % of alumina containing component for a total weight of the zircon body.

Embodiment 32. The refractory object of any one of embodiments 1 to 5, wherein the zircon body comprises not greater than about 12 wt. % of alumina ($Al_2O_3$) containing component for a total weight of the zircon body, not greater than 10 wt. % of the $Al_2O_3$ containing component, not greater than 9 wt. %, not greater than 8 wt. %, not greater than 7 wt. %, or not greater than 6 wt. % of alumina containing component for a total weight of the zircon body.

Embodiment 33. The refractory object of any one of embodiments 1 to 5, wherein the zircon body comprises at least 0.5 wt. % of mullite for a total weight of the zircon body, at least 1 wt. %, at least 1.2 wt. %, at least 1.5 wt. %, at least 1.8 wt. %, at least 2 wt. %, at least 2.2 wt. %, at least 2.5 wt. %, at least 2.7 wt. %, or at least 3 wt. %.

Embodiment 34. The refractory object of any one of embodiments 1 to 5, wherein the zircon body comprises not greater than 10 wt. % of mullite for a total weight of the zircon body, not greater than 9 wt. %, not greater than 8 wt. %, not greater than 7 wt. %, not greater than 6 wt. %, not greater than 5 wt. %, not greater than 4 wt. %, not greater than 3.8 wt. %, not greater than 3.5 wt. %, not greater than 3.2 wt. %, or not greater than 3 wt. %.

Embodiment 35. The refractory object of any one of embodiments 1 to 5, wherein the zircon body comprises at least 70 wt. % of zircon for a total weight of the zircon body, at least 75 wt. %, at least 80 wt. %, at least 85 wt. %, at least 90 wt. %, or at least 93 wt. %.

Embodiment 36. The refractory object of any one of embodiments 1 to 5, wherein the zircon body comprises not greater than 99.5 wt. % of zircon for a total weight of the zircon body, not greater than 99 wt. %, not greater than 98 wt. %, not greater than 97 wt. %, or not greater than 95 wt. %.

Embodiment 37. The refractory object of any one of embodiments 1 to 5, wherein the zircon body comprises at least 0.05 wt. % $Ta_2O_5$ for a total weight of the zircon body, at least 0.1 wt. %, at least 0.2 wt. %, at least 0.3 wt. %, or at least 0.5 wt. %.

Embodiment 38. The refractory object of any one of embodiments 1 to 5, wherein the zircon body comprises not greater than 5 wt. % of $Ta_2O_5$ for a total weight of the zircon body, not greater than 4 wt. %, not greater than 3 wt. %, not greater than 2 wt. %, or not greater than 1 wt. %.

Embodiment 39. The refractory object of any one of embodiments 1 to 5, wherein the zircon body comprises at least 0.05 wt. % of MgO for a total weight of the zircon body, at least 0.1 wt. %, at least 0.2 wt. %, or at least 0.3 wt. %.

Embodiment 40. The refractory object of any one of embodiments 1 to 5, wherein the zircon body comprises not greater than 2 wt. % MgO, not greater than 1.8 wt. %, not greater than 1.5 wt. %, not greater than 1.2 wt. %, not greater than 1 wt. %, not greater than 0.5 wt. %, or not greater than 0.3 wt. %.

Embodiment 41. The refractory object of any one of embodiments 1 to 5, wherein the zircon body comprises at least 0.02 wt. % of CaO for a total weight of the zircon body, at least 0.05 wt. %, at least 0.08 wt. %, at least 0.1 wt. %, at least 0.2 wt. %, or at least 0.3 wt. %.

Embodiment 42. The refractory object of any one of embodiments 1 to 5, wherein the zircon body comprises not greater than 2 wt. % CaO, not greater than 1.8 wt. %, not greater than 1.5 wt. %, not greater than 1.2 wt. %, not greater than 1 wt. %, or not greater than 0.7 wt. %.

Embodiment 43. The refractory object of any one of embodiments 1 to 5, wherein the zircon body comprises at least 0.05 wt. % SrO for a total weight of the zircon body, at least 0.1 wt. %, at least 0.2 wt. %, at least 0.3 wt. %, or at least 0.5 wt. %.

Embodiment 44. The refractory object of any one of embodiments 1 to 5, wherein the zircon body comprises not greater than 5 wt. % of SrO for a total weight of the zircon body, not greater than 4 wt. %, not greater than 3 wt. %, not greater than 2 wt. %, not greater than 1 wt. %, or not greater than 0.5 wt. %.

Embodiment 45. The refractory object of any one of embodiments 1 to 5, wherein the zircon body comprises at least 0.05 wt. % BaO for a total weight of the zircon body, at least 0.1 wt. %, at least 0.2 wt. %, at least 0.3 wt. %, at least 0.5 wt. %, at least 0.8 wt. %, at least 1 wt. %, or at least 1.2 wt. %.

Embodiment 46. The refractory object of any one of embodiments 1 to 5, wherein the zircon body comprises not greater than 5 wt. % of BaO for a total weight of the zircon body, not greater than 4 wt. %, not greater than 3 wt. %, not greater than 2 wt. %, or not greater than 1.2 wt. %.

Embodiment 47. The refractory object of any one of embodiments 1 to 5, wherein the zircon body comprises a creep deformation rate of not greater than 1.8 E-5 $h^{-1}$ at a temperature of 1350° C. and a stress of 2 MPa, not greater than 1.5 E-5 $h^{-1}$, not greater than 1.2 E-5 $h^{-1}$, not greater than 1 E-5 $h^{-1}$, not greater than 9 E-6 $h^{-1}$, or not greater than 8 E-6 $h^{-1}$, at a temperature of 1350° C. and a stress of 2 MPa.

Embodiment 48. The refractory object of any one of embodiments 1 to 5, wherein the zircon body comprises a creep deformation rate of less than about 8.8 E-6 $h^{-1}$ at a temperature of 1325° C. and a stress of 2 MPa, not greater than 8.5 E-6 $h^{-1}$, not greater than 8 E-6 $h^{-1}$, not greater than 7.5 E-6 $h^{-1}$, not greater than 7 E-6 $h^{-1}$, or not greater than 6.5 E-6 $h^{-1}$, not greater than 6 E-6 $h^{-1}$, not greater than 5.5 E-6 $h^{-1}$, not greater than 5 E-6 $h^{-1}$, or not greater than 4.5 E-6 $h^{-1}$ at the temperature of 1350° C. and a stress of 2 MPa.

Embodiment 49. The refractory object of any one of embodiments 1 to 5, wherein the zircon body comprises a creep deformation rate of less than 4.5 E-6 $h^{-1}$ at a temperature of 1300° C. and a stress of 2 MPa, not greater than 4 E-6 $h^{-1}$, not greater than 3.5 E-6 $h^{-1}$, or not greater than 3 E-6 $h^{-1}$ at a temperature of 1300° C. and a stress of 2 MPa.

Embodiment 50. The refractory object of any one of embodiments 1 to 5, wherein the zircon body comprises a creep deformation rate of less than 2.7 E-6 $h^{-1}$ at a temperature of 1275° C. and a stress of 2 MPa, not greater than 2.6 E-6 $h^{-1}$, not greater than 2.5 E-6 $h^{-1}$, not greater than 2.4 E-6 $h^{-1}$, not greater than 2.53 E-6 $h^{-1}$, or not greater than 2.2 E-6 $h^{-1}$ at a temperature of 1275 C and a stress of 2 MPa.

Embodiment 51. The refractory object of any one of embodiments 1 to 5, wherein the zircon body comprises a density of not greater than about 4.5 g/cm$^3$, wherein the density is in a range from 3.5 g/cm$^3$ to 4.5 g/cm$^3$, or in a range from 3.8 g/cm$^3$ to 4.2 g/cm$^3$.

Embodiment 52. The refractory object of any one of embodiments 1 to 5, wherein the zircon body comprises an apparent porosity of not greater than about 15 vol. % for a total volume of the zircon body, wherein the apparent porosity is in a range from 1 vol. % to 15 vol. % or in a range from 3 vol. % to 12 vol. %.

Embodiment 53. The refractory object of any one of embodiments 1 to 5, wherein the zircon body comprises a ratio of $C_{ZN}/C_M$, wherein $C_{ZN}$ is a content of zircon in wt. % for a total weight of the zircon body and $C_M$ is a content of mullite in wt. % for the total weight of the zircon body, wherein the ratio is at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, or at least 33.

Embodiment 54. The refractory object of any one of embodiments 1 to 5, wherein the zircon body comprises a ratio of $C_{ZN}/C_M$, wherein $C_{ZN}$ is a content of zircon in wt. % for a total weight of the zircon body and $C_M$ is a content of mullite in wt. % for the total weight of the zircon body, wherein the ratio is not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, or not greater than 30.

Embodiment 55. The refractory object of embodiment 23, wherein the zircon body comprises a ratio of $C_{C3}/C_{C1}$, wherein $C_{C3}$ is a content of the third crystalline phase in wt. % for a total weight of the zircon body and $C_{C1}$ is a content of the first crystalline phase in wt. % for the total weight of the zircon body, wherein the ratio is at least 0.01, at least 0.05, at least 0.1, at least 0.5, at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, or at least 10.

Embodiment 56. The refractory object of embodiment 23 or 55, wherein the zircon body comprises a ratio of $C_{C3}/C_{C1}$, wherein $C_{C3}$ is a content of the third crystalline phase in wt. % for a total weight of the zircon body and $C_{C1}$ is a content of the first crystalline phase in wt. % for the total weight of the zircon body, wherein the ratio is not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, not greater than 30, not greater than 28, not greater than 25, not greater than 22, not greater than 20, not greater than 18, not greater than 15, not greater than 12, or not greater than 10.

Embodiment 57. The refractory object of embodiment 16, wherein the zircon body comprises a ratio of $C_A/C_{C1}$, wherein $C_A$ is a content of the amorphous phase in wt. % for a total weight of the zircon body and $C_{C1}$ is a content of the first crystalline phase in wt. % for the total weight of the zircon body, wherein the ratio is at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, at least 10, at least 11, at least 12, at least 13, at least 14, at least 15, at least 16, at least 17, at least 18, at least 19, at least 20, at least 22, at least 24, at least 26, at least 28, at least 30, at least 32, at least 35, at least 38, at least 40, at least 50, at least 60, or at least 70.

Embodiment 58. The refractory object of embodiment 16 or 57, wherein the zircon body comprises a ratio of $C_A/C_{C1}$, wherein $C_A$ is a content of the amorphous phase in wt. % for a total weight of the zircon body and $C_{C1}$ is a content of the first crystalline phase in wt. % for the total weight of the zircon body, wherein the ratio is not greater than 500, not greater than 400, not greater than 300, not greater than 200, not greater than 100, not greater than 90, not greater than 80, not greater than 70, not greater than 60, not greater than 50, not greater than 48, not greater than 45, not greater than 42, not greater than 40, not greater than 38, not greater than 35, not greater than 32, or not greater than 30.

Embodiment 59. The refractory object of embodiment 24, wherein the zircon body comprises a ratio of $C_{C4}/C_{C1}$, wherein $C_{C4}$ is a content of the fourth crystalline phase in wt. % for a total weight of the zircon body and $C_{C1}$ is a content of the first crystalline phase in wt. % for the total weight of the zircon body, wherein the ratio is at least 10, at least 15, at least 20, at least 25, at least 30, at least 35, at least 40, at least 45, at least 50, at least 55, at least 60, at least 65, at least 70, at least 75, at least 80, at least 85, or at least 90.

Embodiment 60. The refractory object of embodiment 24 or 59, wherein the zircon body comprises a ratio of $C_{C4}/C_{C1}$, wherein $C_{C5}$ is a content of the fourth crystalline phase in wt. % for a total weight of the zircon body and $C_{C1}$ is a content of the first crystalline phase in wt. % for the total weight of the zircon body, wherein the ratio is not greater than 9300, not greater than 7000, not greater than 5000, not greater than 3000, not greater than 1000, not greater than 800, not greater than 600, not greater than 500, not greater than 400, not greater than 300, not greater than 200, not greater than 100, not greater than 90, not greater than 80, not greater than 70, not greater than 60, not greater than 50, not greater than 40, not greater than 30, not greater than 20, or not greater than 10.

Embodiment 61. The refractory object of embodiment 27, wherein the zircon body comprises a ratio of $C_{C5}/C_{C1}$, wherein $C_{C5}$ is a content of the fifth crystalline phase in wt. % for a total weight of the zircon body and $C_{C1}$ is a content of the first crystalline phase in wt. % for the total weight of the zircon body, wherein the ratio is at least 0.01, at least 0.1, at least 0.5, at least 1, at least 2, at least 3, at least 4, or at least 5.

Embodiment 62. The refractory object of embodiment 27 or 60, wherein the zircon body comprises a ratio of $C_{C5}/C_{C1}$, wherein $C_{C5}$ is a content of the fifth crystalline phase in wt. % for a total weight of the zircon body and $C_{C1}$ is a content of the first crystalline phase in wt. % for the total weight of the zircon body, wherein the ratio is not greater than 100, not greater than 90, not greater than 80, not greater than 70, not greater than 60, not greater than 50, not greater than 40, not greater than 30, not greater than 20, not greater than 10, not greater than 9, not greater than 8, not greater than 7, not greater than 6, not greater than 5, not greater than 4, or not greater than 3.

Embodiment 63. The refractory object of embodiment 13, wherein the zircon body comprises a ratio of $C_{C2}/C_{C1}$, wherein $C_{C2}$ is a content of the second crystalline phase in wt. % for a total weight of the zircon body and $C_{C1}$ is a content of the first crystalline phase in wt. % for the total weight of the zircon body, wherein the ratio is at least 0.01, at least 0.1, at least 0.5, at least 1, at least 2, at least 3, at least 4, or at least 5.

Embodiment 64. The refractory object of embodiment 13 or 63, wherein the zircon body comprises a ratio of $C_{C2}/C_{C1}$, wherein $C_{C2}$ is a content of the second crystalline phase in wt. % for a total weight of the zircon body and $C_{C1}$ is a content of the first crystalline phase in wt. % for the total weight of the zircon body, wherein the ratio is not greater than 100, not greater than 90, not greater than 80, not greater than 70, not greater than 60, not greater than 50, not greater than 40, not greater than 30, not greater than 20, not greater than 10, not greater than 9, not greater than 8, not greater than 7, not greater than 6, or not greater than 5.

Embodiment 65. A method of forming a refractory object comprising: heating a green body to form the refractory object including a zircon body, wherein heating comprises a cooling rate less than 2° C./h.

Embodiment 66. A method of forming a refractory object comprising: forming a green body; heating the green body at a first temperature for a first period of time; and heating the green body at a second temperature lower than the first temperature for a second period of time to form the refractory object including a zircon body.

Embodiment 67. The method of embodiment 65 or 66, further comprising cooling the green body from a first temperature to a second temperature at a cooling rate less than 2° C./h, not greater than 0.8° C./h, not greater than 0.7° C./h, not greater than 0.6° C./h, not greater than 0.5° C./h, not greater than 0.4° C./h, not greater than 0.3° C./h, not greater than 0.2° C./h, or not greater than 0.1° C./h; and heating the green body at the second temperature.

Embodiment 68. The method of embodiment 67, wherein the cooling rate is at least 0.01° C./h, at least 0.02° C./h, at least 0.03° C./h, at least 0.04° C./h, at least 0.05° C./h, at least 0.06° C./h, at least 0.07° C./h, at least 0.08° C./h, at least 0.09° C./h, or at least 0.1° C./h.

Embodiment 69. The method of embodiment 66 or 67, wherein the first temperature comprises a maximum heating temperature of at least 1500° C., at least 1550° C., or at least 1600° C.

Embodiment 70. The method of embodiment 66 or 67, wherein the first temperature comprises a maximum heating temperature of not greater than 1700° C., not greater than 1650° C., or not greater than 1625° C.

Embodiment 71. The method of embodiment 65 or 66, further comprising heating at a first temperature for a first period of time of at least 2 hours, at least 4 hours, at least 6 hours, at least 8 hours, or at least 10 hours.

Embodiment 72. The method of embodiment 65 or 66, further comprising heating at a first temperature for a first period of time of not greater than 5 days, not greater than 4 days, not greater than 3 days, not greater than 2 days, not greater than 24 hours, not greater than 20 hours, not greater than 18 hours, not greater than 16 hours, not greater than 14 hours, or not greater than 12 hours.

Embodiment 73. The method of embodiment 65 or 66, further comprising heating at a second temperature for a second period of time of at least 10 hours, at least 14 hours, at least 18 hours, at least 20 hours, at least 24 hours, at least 30 hours, at least 36 hours, or at least 2 days.

Embodiment 74. The method of embodiment 65 or 66, further comprising heating at a second temperature for a second period of time of not greater than 6 days, not greater than 5 days, not greater than 4 days, not greater than 3 days, not greater than 60 hours, not greater than 50 hours, not greater than 48 hours, not greater than 44 hours, not greater than 40 hours, not greater than 36 hours, or not greater than 30 hours.

Embodiment 75. The method of embodiment 66 or 67, wherein the second temperature comprises a sintering temperature, wherein the sintering temperature is at least 1250° C., at least 1300° C., at least 1350° C., at least 1400° C., or at least 1425° C.

Embodiment 76. The method of embodiment 66 or 67, wherein the second temperature comprises a sintering temperature, wherein the sintering temperature is not greater than 1525° C., not greater than 1500° C., not greater than 1475° C., or not greater than 1450° C.

Embodiment 77. The method of embodiment 66 or 67, further comprising cooling from the second temperature to an ambient temperature at a cooling rate of not greater than 5° C./h, not greater than 4° C./h, not greater than 3° C./h, not greater than 2° C./h, not greater than 1° C./h, not greater than 0.9° C./h, or not greater than 0.8° C./h.

Embodiment 78. The method of embodiment 66 or 67, further comprising cooling from the second temperature to an ambient temperature at a cooling rate of at least 0.03° C./h, at least 0.04° C./h, at least 0.05° C./h, at least 0.06° C./h, at least 0.07° C./h, at least 0.08° C./h, at least 0.09° C./h, at least 0.1° C./h, at least 0.2° C./h, at least 0.3° C./h, at least 0.4° C./h, at least 0.5° C./h, at least 0.6° C./h, at least 0.7° C./h, at least 0.8° C./h, at least 0.9° C./h, or at least 1° C./h.

EXAMPLES

Example 1

Sample S1 in the form of a block was made. The raw materials including 0.3 wt. % CaO, 2 wt. % $Al_2O_3$, 3 wt. % mullite, 1 wt. % $Ta_2O_5$ in balance with $ZrSiO_4$ (93.7 wt. %) were mixed in a slurry with addition of binder and dispersant. The well-mixed homogenous slurry was spray-dried. The spray dried granules were formed to shape and isostatically pressed under a pressure between 100 MPa and 180 MPa. The block was sintered as follows.

The block was heated at a maximum temperature in a range from 1605° C. to 1620° C. for 10 hours, cooled down to 1350-1500° C. at the cooling rate of 0.01-0.5° C./min, and allowed to dwell at 1350-1500° C. for 24 hours. The block was cooled down to room temperature at the cooling rate of 0.01-1° C./min.

The microstructure of the body of the block was analyzed using scanning electron microscopy, and the images are included in FIGS. 4 and 5. In the amorphous phase 405, Ta—Ti—Fe rich crystalline phases (tapiolite-type) 403 and Ca—Al—Si rich crystals 407, identified as gehlenite ($Ca_2Al_2SiO_7$) or prehnite ($Ca_2Al_2Si_3O_{12}H_2$) by EBSD are present.

Elemental mapping was used to analyze the microstructure. Table 1 includes elemental concentrations of certain elements in the glass phase 405 and mullite phase 411. The concentration is relative to the total weight of the respective phase.

TABLE 1

|    | Amorphous Phase (wt. %) | Mullite Phase (wt. %) |
|----|-------------------------|----------------------|
| Si | 53.1                    | 19.9                 |
| Al | 19.3                    | 67.7                 |
| Ca | 6.1                     | 0.0                  |
| Ta | 4.9                     | 0.8                  |

Example 2

Samples C2 and C3 were formed in form of blocks. The raw materials for forming Sample C2 included 98 wt. % of zircon sand, tantalum oxide (sintering aid, 1 wt. %), silica of 1 wt. %. The zircon sands included impurities including alumina of up to 0.5 wt. %, CaO of 0.08 wt. %, and MgO of less than 0.06 wt. % per ICP analysis. The raw materials for forming Sample C3 included zircon sand (94 wt. %, in balance with the additives), tantalum oxide (sintering aid, 1 wt. %), mullite (3 wt. %), and free Alumina (2 wt. %). The zircon sands included 0.02-0.06 wt. % of CaO as an impurity.

Figure 6:
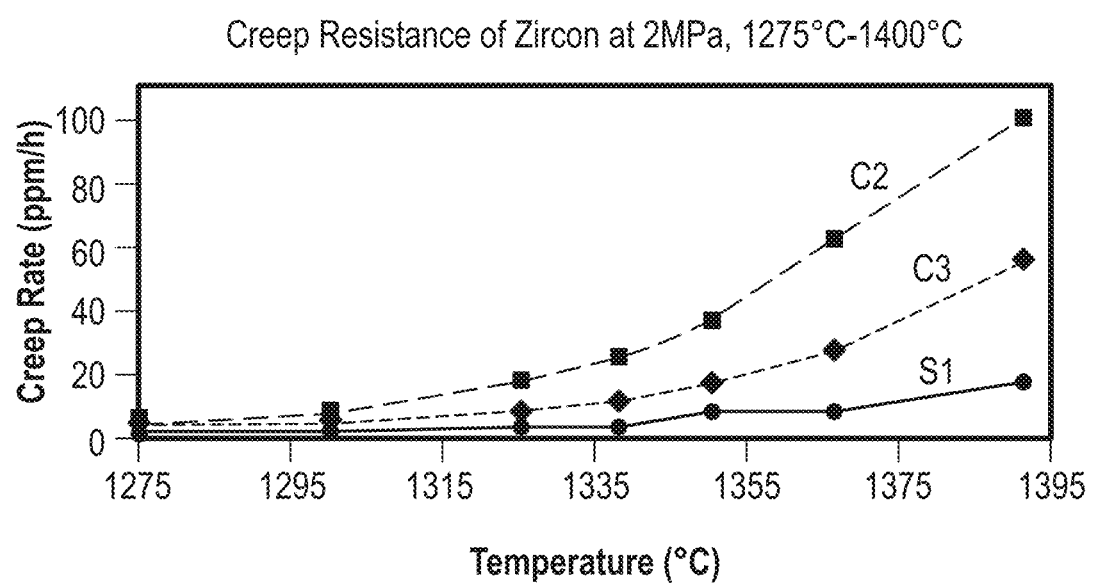
FIG. 6 includes a plot of creep deformation rates vs. temperatures of different samples.

The mixtures of raw materials were mixed, shaped, and sintered as described in embodiments herein. Samples S1, C2, and C3 were tested for creep deformation rates in accordance with embodiments described herein. FIG. 6 includes a plot of creep deformation rates vs. temperatures of the samples. As noted in the Table 2 below and illustrated in FIG. 6, Sample S1 demonstrated significantly improved creep deformation rate over Samples C1 and C2 over the tested temperatures.

TABLE 2

|  |  |  | Temperatures (° C.) | | | |
|---|---|---|---|---|---|---|
|  |  |  | 1275 | 1300 | 1325 | 1350 |
| Creep deformation rate at 2MPa (PPm/h) | C2 | Average | 2.7 | 4.5 | 8.8 | 18.2 |
|  |  | Std. Dev. | 0.4 | 0.7 | 0.2 | 0.5 |
|  | S1 | Average | 2.2 | 3.0 | 4.3 | 7.9 |
|  |  | Std. Dev. | 0.8 | 1.0 | 1.4 | 1.2 |

Example 3

Samples S3 and S4 were formed in the form of blocks in the same manner as described with respect to Sample S1, using the similar raw materials except 0.15 wt. % of CaO were added for Sample S3 and 0.6 wt. % of CaO were added for Sample S4. The contents of CaO for S3 and S4 are relative for the total weight of the respective raw materials.

Figure 7:
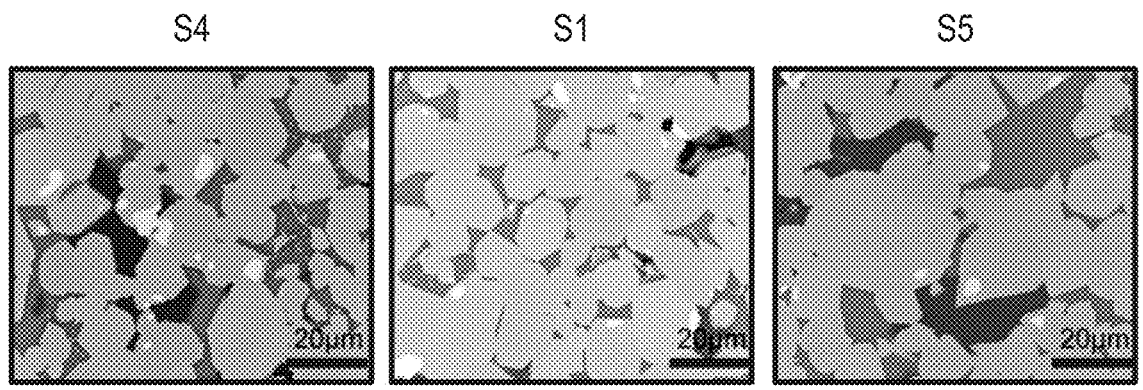
FIG. 7 includes images of microstructures of bodies of different samples formed according to embodiments herein.
Figure 8:
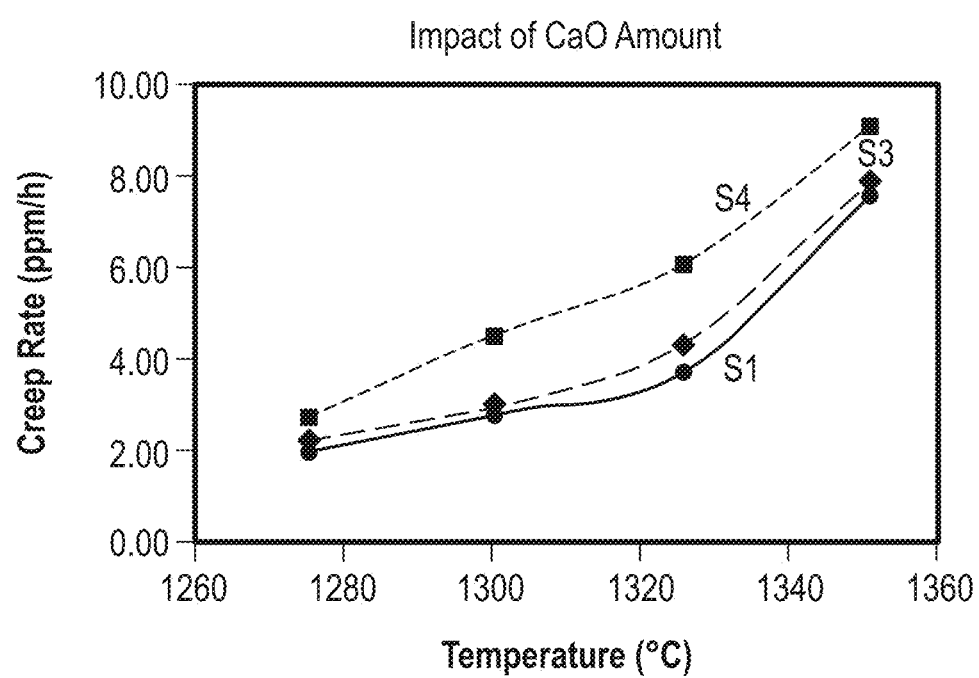
FIG. 8 includes a plot of creep deformation rates vs. temperatures of different samples.

FIG. 7 includes the images of the microstructures of the blocks of S 1, S3, and S4. As illustrated, more crystalline phases were present in Samples S1 and S3 compared to Sample S4. The samples were tested for creep deformation rate as described in embodiments herein. A plot of the creep deformation rates and tested temperatures of the samples is included in FIG. 8. S1 and S3 demonstrated similar creep deformation rates over the tested temperatures and improved creep deformation rates over Sample S4.

Example 4

Sample S6 was formed in the form of blocks in the same manner as described with respect to Sample S1, using the similar raw materials except 1 mol % of BaO for the total weight of the raw materials was added instead of CaO. Samples CS3, S1, and S6 were tested for creep deformation rate as described in embodiments herein. A plot of the creep deformation rates and tested temperatures of the samples is included in FIG. 9. S1 and S6 demonstrated improved creep deformation rates over the tested temperatures over Sample CS3.

Figures 9, 10:
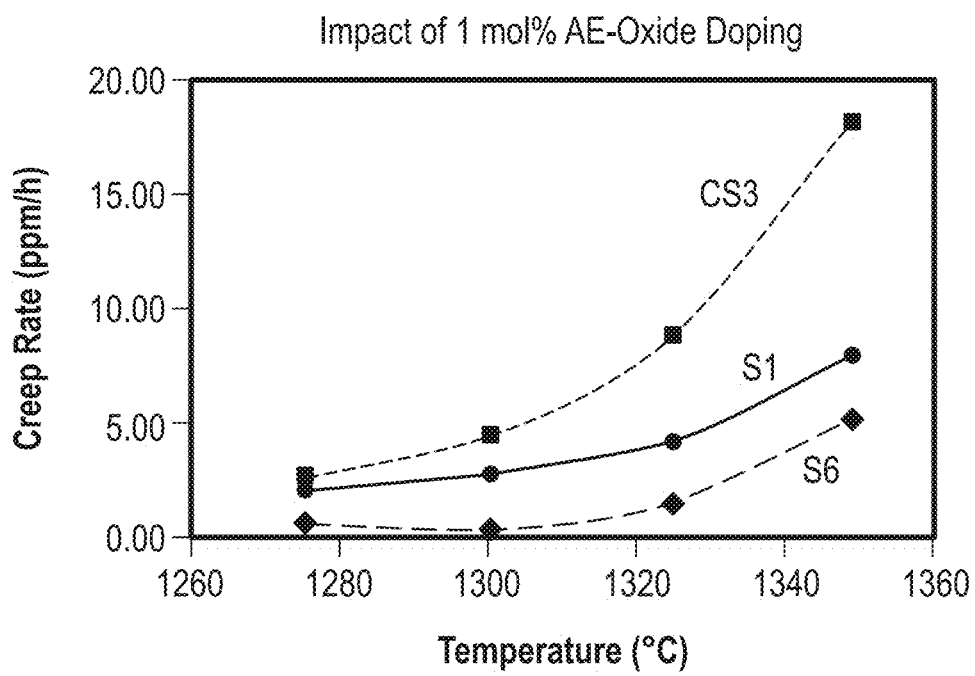
FIG. 9 includes a plot of creep deformation rates vs. temperatures of additional samples.
FIG. 10 includes cross-sectional images of interface between the surface of zircon material and glass layer after a blistering test is conducted.

Samples CS2, CS3, S1, and S6 were tested for blistering effect as described in embodiments herein. As illustrated in FIG. 10, at the interfaces between glass and zircon materials of Samples S1 and S6, significantly reduced number of bubbles can be observed compared to Samples CS2 and CS3.

Example 5

Additional samples were formed in the form of blocks in the same manner as described with respect to Sample S1 using the similar raw materials except different dopants were added in different contents. Samples S7, S8, S9, and S10 were formed including 0.125 mol %, 0.25 mol %, 0.5 mol %, and 1.0 mol % of BaO, respectively, for the total weight of the raw materials. Samples S11, S12, and S13 were formed including 0.125 mol %, 0.5 mol %, and 1.0 mol % of SrO, respectively, for the total weight of the raw materials. Samples S14, S15, S16, and S17 were formed including 0.125 mol %, 0.5 mol %, 1.0 mol %, and 2.0 mol % of CaO, respectively, for the total weight of the raw materials.

Figure 11:
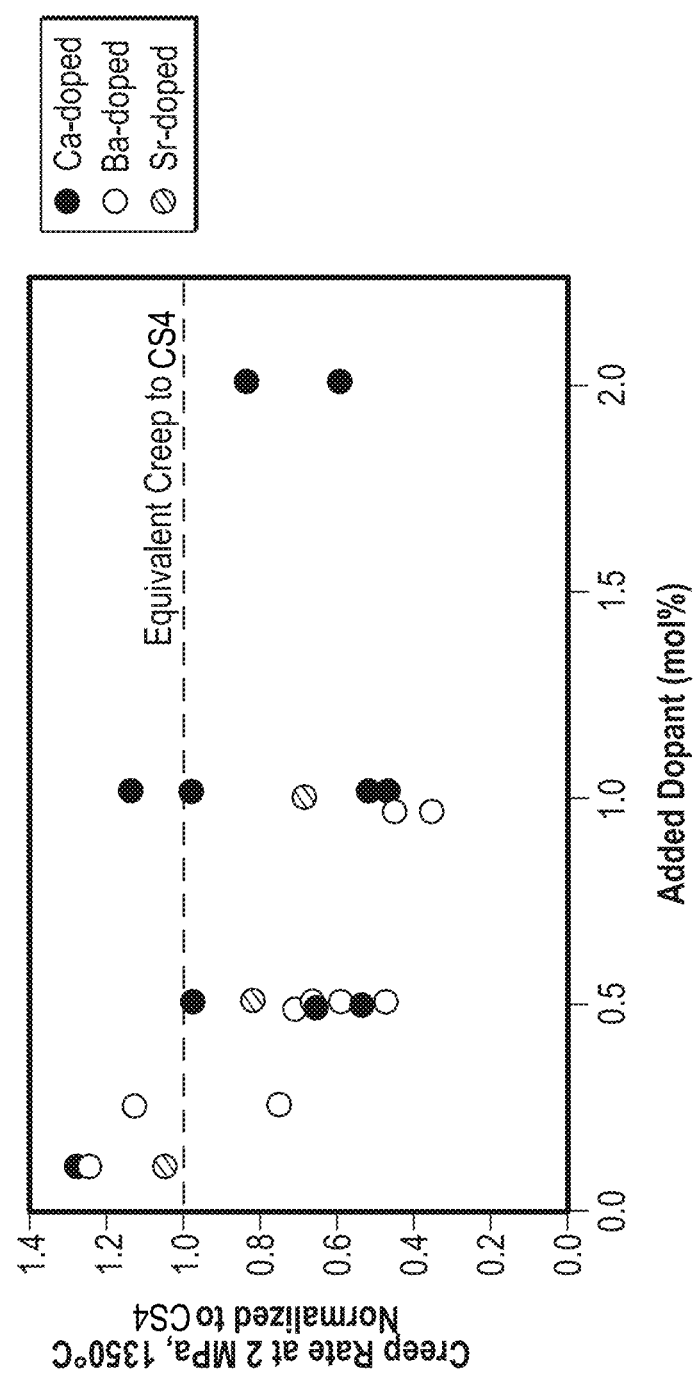
FIG. 11 includes a plot of normalized creep deformation rates vs. dopant concentrations of different samples.

Samples S7 to S17 and a comparison sample CS3 were tested for creep deformation rate as described in embodiments herein. The relative values of creep deformation rates of Samples S7 to S17 vs. dopant concentrations are illustrated in FIG. 11. The normalized creep deformation rates are determined by normalizing the creep deformation rate of a representative sample against the creep deformation rate of the comparison sample using the formula, $RCR_S = CR_S/CR_C$, wherein $RCR_S$ represents the normalized creep deformation rate of a representative sample (e.g., any one of S7 to S17), $CR_S$ represents the creep deformation rate of the representative sample, and $CR_C$ represents the creep deformation rate of the comparison sample (e.g., CS3). The relative value of the creep deformation rate of CS3 is 1 and illustrated by a horizontal dotted line in FIG. 11.

As illustrated, Samples S9, S10, S12, S13, and S15 to S17 demonstrate improved creep resistance compared to CS3. BaO-doped samples appear to have further improved creep resistance compared to samples doped with CaO or SrO at the same concentrations. For instance, on average, the normalized creep deformation rate of Sample S9 is lower compared to Sample S12 and S15; and the normalized creep deformation rate of Sample S10 is lower than S13 and S16.

Example 6

Samples S20 to S22 were formed in the form of blocks in the same manner as described with respect to Sample S1 using the similar raw materials except that dopants noted in Table 3 were added in the specified concentrations in lieu of CaO. The samples were tested for creep deformation rates as described in embodiments herein, and the results are included in Table 3.

TABLE 3

| Sample | S8 | S9 | S20 | S21 | S22 |
|---|---|---|---|---|---|
| Dopant (Concentration) | BaO (0.21 wt. %) | BaO (0.42 wt. %) | BaO (0.21 wt. %) + MgO (0.08 wt. %) | BaO (0.21 wt. %) + CaO (0.1 wt. %) | BaO (0.21 wt. %) + SrO (0.1 wt. %) |
| Creep rate (tested at 2MPa, 1350° C.) (ppm/K) | 17.2 | 10.9 | 20.7 | 20.2 | 20.2 |

Sample S9 including 0.42 wt. % of BaO demonstrated an improved creep deformation rate at the tested condition compared to S8 including 0.21 wt. % of BaO. It is worth noting that S9 had improved creep resistance over S20 to S22 that are doped with a total concentration of 0.42 wt. % of BaO and CaO, BaO and CaO, and BaO and SrO respectively.

Example 7

Samples S23 to S38 were formed in the form of blocks in the same manner as described with respect to Sample S1 using the similar raw materials except that dopants noted in Table 4 were added in the specified concentrations in lieu of CaO. Sample CS4 was formed in the similar manner except alkaline earth oxide dopant was not used. The amorphous phases of samples were analyzed by using microprobe analysis and the contents of the components (in wt. %) in the amorphous phase determined by using Wavelength-Dispersive X-Ray Spectroscopy are included in Tables 4 to 5 below.

The Samples were tested for creep resistance according to embodiments herein, and the test results are included in Tables 4 to 6. Samples S24 to S35 demonstrated improved creep rates in some or all of the tested temperatures. Samples S23 and S39 did not demonstrate improvement in creep rates.

TABLE 4

| | CS4 | S23 (0.21 wt. % MgO) | S24 (0.07 wt % CaO) | S25 (0.18 wt. % CaO) | S26 (0.29 wt. % CaO) | S27 (0.50 wt. % CaO) | S28 (0.04 wt. % SrO) | S29 (0.28 wt. % SrO) | S30 (0.47 wt. % SrO) |
|---|---|---|---|---|---|---|---|---|---|
| $SiO_2$ | 64.1 | 66.07 | 65.78 | 60.52 | 58.49 | 55.02 | 66.67 | 55.92 | 55.18 |
| $Na_2O$ | 2.1 | 1.68 | 0.96 | 1.41 | 1.34 | 1.23 | 0.51 | 1.51 | 1.21 |
| $Al_2O_3$ | 19 | 17.62 | 18.92 | 17.31 | 19.65 | 22.38 | 17.59 | 18.27 | 20.30 |
| $ZrO_2$ | 0.0 | 0.00 | 0.53 | 0.82 | 0.25 | 0.00 | 0.72 | 1.00 | 0.50 |
| CaO | 1.9 | 1.09 | 3.40 | 5.30 | 6.76 | 8.56 | 1.54 | 1.31 | 0.90 |
| MgO | 1.1 | 4.50 | 0.85 | 0.66 | 0.62 | 0.51 | 0.72 | 0.60 | 0.50 |
| $K_2O$ | 0.0 | 0.00 | 0.21 | 0.10 | 0.05 | 0.00 | 0.21 | 0.20 | 0.10 |
| $Fe_2O_3$ | 0.1 | 0.12 | 0.11 | 0.18 | 0.13 | 0.24 | 0.10 | 0.20 | 0.10 |
| $TiO_2$ | 0.6 | 0.60 | 0.53 | 0.80 | 0.74 | 1.04 | 0.51 | 0.50 | 0.60 |
| $P_2O_5$ | 1.1 | 1.34 | 1.38 | 1.01 | 1.06 | 1.04 | 1.23 | 1.10 | 0.90 |
| SrO | 0.0 | 0.00 | 0.00 | 0.00 | 0.00 | 0.00 | 1.13 | 9.34 | 10.45 |
| BaO | 0.0 | 0.00 | 0.00 | 0.00 | 0.00 | 0.00 | 0.10 | 0.00 | 0.10 |
| $Ta_2O_5$ | 9.3 | 6.23 | 6.80 | 11.25 | 10.26 | 9.57 | 8.33 | 9.54 | 8.54 |
| $Y_2O_3$ | 0.7 | 0.75 | 0.53 | 0.65 | 0.64 | 0.41 | 0.62 | 0.50 | 0.60 |
| Creep Rate, ppm/h (2MPa 1275° C.) | 2.9 | 4.9 | 2.2 | 2.6 | 2.5 | 2.8 | 1.9 | 3.2 | 4.0 |
| Creep Rate, ppm/h (2MPa 1300° C.) | 5.5 | 9.5 | 4.5 | 4.4 | 4.5 | 4.6 | 3.3 | 5.5 | 1.2 |
| Creep Rate, ppm/h (2MPa 1325° C.) | 11.4 | 19.6 | 12.4 | 8.5 | 7.3 | 6.1 | 9.5 | 9.4 | 6.5 |
| Creep Rate, ppm/h (2MPa 1350° C.) | 23.1 | 38.5 | 20.4 | 15.0 | 11.6 | 9.2 | 16.8 | 18.7 | 11.0 |

TABLE 5

| | S31 (0.09 wt. % BaO) | S33 (0.42 wt. % BaO) | S34 (0.78 wt. % BaO) | S36 (0.21 wt. % BaO + 0.08 wt. % MgO) | S37 (0.21 wt. % BaO + 0.1 wt. % CaO) | S38 (0.21 wt. % BaO + 0.1 wt. % SrO) |
|---|---|---|---|---|---|---|
| $SiO_2$ | 64.44 | 55.33 | 57.78 | 58.04 | 58.39 | 58.23 |
| $Na_2O$ | 0.62 | 1.18 | 1.17 | 1.60 | 1.36 | 1.44 |
| $Al_2O_3$ | 16.44 | 18.19 | 17.89 | 17.78 | 16.88 | 16.55 |
| $ZrO_2$ | 0.82 | 0.75 | 0.00 | 1.00 | 0.78 | 0.96 |
| CaO | 1.64 | 1.08 | 0.60 | 1.50 | 3.10 | 1.06 |
| MgO | 0.82 | 0.66 | 0.45 | 1.80 | 0.58 | 0.58 |
| $K_2O$ | 0.21 | 0.10 | 0.00 | 0.20 | 0.19 | 0.19 |
| $Fe_2O_3$ | 0.10 | 0.16 | 0.19 | 0.10 | 0.10 | 0.10 |
| $TiO_2$ | 0.62 | 0.62 | 0.93 | 0.50 | 0.58 | 0.58 |
| $P_2O_5$ | 1.23 | 0.92 | 0.75 | 1.20 | 1.07 | 0.96 |
| SrO | 0.10 | 0.00 | 0.00 | 0.00 | 0.00 | 3.56 |
| BaO | 4.01 | 11.34 | 11.63 | 8.09 | 6.60 | 5.97 |
| $Ya_2O_5$ | 8.32 | 9.04 | 8.22 | 7.49 | 9.70 | 9.24 |
| $Y_2O_3$ | 0.62 | 0.62 | 0.38 | 0.70 | 0.68 | 0.58 |
| Creep Rate, ppm/h (2MPa 1275° C.) | 3.9 | 1.9 | 1.1 | 4.0 | 3.7 | 2.9 |
| Creep Rate, ppm/h (2MPa 1300° C.) | 4.5 | 3.4 | 1.5 | 3.6 | 4.1 | 5.1 |
| Creep Rate, ppm/h (2MPa 1325° C.) | 9.7 | 6.9 | 3.0 | 8.9 | 9.4 | 10.6 |
| Creep Rate, ppm/h (2MPa 1350° C.) | 19.9 | 11.6 | 6.8 | 20.7 | 20.2 | 20.2 |

TABLE 6

| | S32 (0.21 wt. % BaO) | S35 (1.53 wt. % BaO) | S39 (0.38 wt. % MgO) |
|---|---|---|---|
| Creep Rate, ppm/h (2MPa 1275° C.) | 2.9 | 1.9 | 14.7 |
| Creep Rate, ppm/h (2MPa 1300° C.) | 5.6 | 2.5 | 30.2 |

TABLE 6-continued

|  | S32 (0.21 wt. % BaO) | S35 (1.53 wt. % BaO) | S39 (0.38 wt. % MgO) |
|---|---|---|---|
| Creep Rate, ppm/h (2MPa 1325° C.) | 12.2 | 4.3 | 72.3 |
| Creep Rate, ppm/h (2MPa 1350° C.) | 21.5 | 7.7 | 156.1 |

Tables 7 and 8 includes the compositions of the samples analyzed by performing ICP on at least 0.25 g of powdered sample obtained from crushed zircon body of each sample (also referred to as bulk ICP).

TABLE 7

|  | CS4 | S23 | S39 | S24 | S25 | S26 | S27 | S28 | S29 | S30 |
|---|---|---|---|---|---|---|---|---|---|---|
| $Al_2O_3$ | 4.28 | 4.18 | 4.30 | 4.14 | 4.43 | 4.29 | 4.68 | 4.29 | 4.30 | 4.45 |
| CaO | 0.04 | 0.04 | 0.05 | 0.07 | 0.18 | 0.29 | 0.50 | 0.06 | 0.05 | 0.05 |
| SrO | 0 | 0.00 | 0.00 | 0.00 | 0.00 | 0.00 | 0.00 | 0.04 | 0.28 | 0.47 |
| BaO | 0 | 0.00 | 0.00 | 0.00 | 0.00 | 0.00 | 0.00 | 0.00 | 0.00 | 0.01 |
| $Ta_2O_5$ | 0.89 | 0.82 | 0.83 | 0.85 | 0.84 | 0.87 | 0.91 | 0.89 | 1.00 | 0.89 |
| $TiO_2$ | 0.1 | 0.09 | 0.09 | 0.09 | 0.10 | 0.09 | 0.10 | 0.10 | 0.10 | 0.10 |
| $Fe_2O_3$ | 0.03 | 0.02 | <0.01 | 0.03 | 0.02 | 0.03 | 0.02 | 0.02 | 0.04 | 0.03 |
| $P_2O_5$ | 0.26 | 0.21 | 0.21 | 0.25 | 0.22 | 0.26 | 0.26 | 0.27 | 0.28 | 0.26 |
| MgO | 0.03 | 0.21 | 0.38 | 0.03 | 0.03 | 0.03 | 0.01 | 0.03 | 0.03 | 0.03 |
| $SiO_2$ | 30.8 | 30.00 | 30.30 | 29.70 | 30.65 | 30.90 | 32.10 | 31.30 | 31.90 | 30.50 |
| $ZrO_2$ | 62.16 | 63.06 | 62.45 | 63.42 | 62.11 | 61.63 | 59.88 | 61.57 | 60.60 | 61.66 |

TABLE 8

|  | S31 | S32 | S33 | S34 | S35 | S36 | S37 | S38 |
|---|---|---|---|---|---|---|---|---|
| $Al_2O_3$ | 4.37 | 4.20 | 4.50 | 4.28 | 4.25 | 4.30 | 4.30 | 4.20 |
| CaO | 0.05 | 0.05 | 0.06 | 0.06 | 0.06 | 0.05 | 0.10 | 0.05 |
| SrO | 0.01 | 0.00 | 0.00 | 0.00 | 0.00 | 0.00 | 0.00 | 0.10 |
| BaO | 0.09 | 0.21 | 0.42 | 0.78 | 1.53 | 0.21 | 0.21 | 0.21 |
| $Ta_2O_5$ | 0.90 | 0.97 | 0.98 | 0.89 | 0.89 | 0.98 | 0.97 | 0.96 |
| $TiO_2$ | 0.10 | 0.10 | 0.11 | 0.10 | 0.10 | 0.10 | 0.10 | 0.10 |
| $Fe_2O_3$ | 0.02 | 0.02 | 0.03 | 0.03 | 0.02 | 0.02 | 0.02 | 0.04 |
| $P_2O_5$ | 0.27 | 0.28 | 0.28 | 0.24 | 0.24 | 0.27 | 0.27 | 0.27 |
| MgO | 0.03 | 0.03 | 0.04 | 0.03 | 0.04 | 0.08 | 0.03 | 0.03 |
| $SiO_2$ | 31.20 | 31.00 | 33.95 | 32.40 | 32.10 | 31.30 | 30.80 | 30.80 |
| $ZrO_2$ | 61.49 | 61.70 | 57.92 | 59.66 | 59.30 | 61.30 | 61.80 | 61.80 |

The present application represents a departure from the state of the art. Notably, the embodiments herein demonstrate improved and unexpected performance over zircon components formed according to conventional methods. While not wishing to be bound to a particular theory, it is suggested that the combination of certain contents of materials in the raw zircon material mixture and in the formed zircon body material, including for example, contents of alumina containing compositions, contents of alkaline earth oxide, presence of certain crystalline phase, content of certain crystalline phase, contents of $SiO_2$, content of sintering aids and ratios of these components to each other facilitate the formation a refractory object or component having a unique combination of features, including but not limited to, low creep deformation rates at high temperatures, low blistering values, crystalline phase including alkaline earth aluminosilicate, and content of alkaline earth aluminosilicate in the finally formed zircon body. It is notable, in particular, an unexpected synergetic effect of alumina or alumina containing component and alkaline earth oxide facilitates improved low creep deformation rate and low blistering values of the zircon body.

Note that not all of the activities described above in the general description or the examples are required, that a portion of a specific activity may not be required, and that one or more further activities may be performed in addition to those described. Still further, the orders in which activities are listed are not necessarily the order in which they are performed. Any values of properties or characteristics of the embodiments herein can represent average or median values derived from a statistically relevant sample size. Unless otherwise stated, it will be appreciated that compositions are based on a total of 100% and the total content of the components does not exceed 100%.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A refractory object comprising:
    a zircon body comprising a creep deformation rate of:
        not greater than about 1.8 E-5 $h^{-1}$ at a temperature of 1350° C. and a stress of 2 MPa;
        less than about 2.7 E-6 $h^{-1}$ at a temperature of 1275° C. and a stress of 2 MPa;
        less than about 8.8 E-6 $h^{-1}$ at a temperature of 1325° C. and a stress of 2 MPa;
        less than about 4.5 E-6 $h^{-1}$ at a temperature of 1300° C. and a stress of 2 MPa; or
        any combination thereof,
    wherein the zircon body comprises a crystalline phase comprising mullite, silimanite, andalusite, or any combination thereof, wherein the crystalline phase is at least 0.01 wt % and not greater than 20 wt. % of for a total weight of the zircon body.

2. The refractory object of claim 1, wherein the zircon body comprises a dopant including an alkaline earth metal element including at least one of Ca, Sr, and Ba.

3. The refractory object of claim 1, wherein the zircon body comprises an amorphous phase of at least 0.5 wt. % and not greater than 20 wt. % for a total weight of the zircon body.

4. The refractory object of claim 1, wherein the zircon body comprises an amorphous phase comprising a total content of greater than 3 wt. % of an alkaline earth oxide for a total weight of the amorphous phase.

5. The refractory object of claim 4, wherein the amorphous phase comprises for the total weight of the amorphous phase:
    from 40 wt. % to 80 wt. % of silica;
    from 10 wt. % to 30 wt. % of alumina; and
    from 0.3 wt. % to 12 wt. % of $Ta_2O_5$.

6. The refractory object of claim 1, wherein the zircon body comprises a crystalline phase comprising zircon, wherein the crystalline phase is at least 80 wt. % of for a total weight of the zircon body.

7. The refractory object of claim 1, wherein the zircon body comprises alkaline earth oxide for a total weight of the zircon body, at least 0.1 wt. % of CaO, at least 0.1 wt % of SrO, at least 0.4 wt. % of BaO, or any combination thereof.

8. The refractory object of claim 7, wherein the zircon body comprises at least 0.5 wt. %, and not greater than about 12 wt. % of alumina ($Al_2O_3$) for a total weight of the zircon body.

9. The refractory object of claim 1, wherein the zircon body comprises a crystalline phase comprising tantalum, iron, titanium, or any combination thereof.

10. The refractory object of claim 3, wherein the amorphous phase comprises Si, Al, Ta, an alkaline earth metal element, or any combination thereof.

11. The refractory object of claim 1, wherein the zircon body comprises at least 2 wt. % and not greater than 11 wt. % of the amorphous phase for a total weight of the zircon body.

12. The refractory object of claim 1, wherein the zircon body comprises at least 0.1 wt. % of BaO for a total weight of the zircon body.

13. The refractory object of claim 12, wherein the zircon body comprises not greater than 5 wt. % of BaO for a total weight of the zircon body.

14. A refractory object, comprising a zircon body comprising:
    at least 75 wt. % of zircon for a total weight of the zircon body; and
    at least 0.5 wt. % and not greater than 20 wt. % of an amorphous phase for the total weight of the zircon body, wherein the amorphous phase comprises a total content of greater than 3 wt. % of an alkaline earth oxide for a total weight of the amorphous phase.

15. The refractory object of claim 14, wherein the zircon body comprises at least 2 wt. % and not greater than 15 wt. % of the amorphous phase for a total weight of the zircon body.

16. The refractory object of claim 14, wherein the amorphous phase comprises for a total weight of the amorphous phase:
    from 50 wt. % to 70 wt. % of silica;
    from 14 wt. % to 28 wt. % of alumina; and
    from 4 wt. % to 12 wt. % of $Ta_2O_5$.

17. The refractory object of claim 14, wherein the amorphous phase comprises CaO, BaO, SrO, or any combination thereof.

18. The refractory object of claim 14, wherein the amorphous phase comprises for a total weight of the amorphous phase:
    at least 4 wt. % of CaO;
    at least 2 wt. % of SrO;
    at least 2 wt. % of BaO; or
    any combination thereof.

19. The refractory object of claim 14, wherein the amorphous phase comprises for a total weight of the amorphous phase of at least 2 wt. % of SrO.

20. The refractory object of claim 14, wherein the zircon body comprises alkaline earth oxide for a total weight of the zircon body, at least 0.1 wt. % of CaO, at least 0.1 wt % of SrO, at least 0.1 wt. % of BaO, or any combination thereof.

* * * * *